US012156315B2

(12) United States Patent
Hoffman et al.

(10) Patent No.: US 12,156,315 B2
(45) Date of Patent: Nov. 26, 2024

(54) DYNAMIC DIM-TO-WARM WITH COLOR-TUNABLE FIXTURES

(71) Applicant: Wangs Alliance Corporation, Port Washington, NY (US)

(72) Inventors: Jonathan Ian Hoffman, Bay Shore, NY (US); Dimauro Andrade Edwards, Jamaica, NY (US); Michael Sabolcik, Leander, TX (US); Suman Minnaganti, Austin, TX (US)

(73) Assignee: Wangs Alliance Corporation, Port Washington, NY (US)

( * ) Notice: Subject to any disclaimer, the term of this patent is extended or adjusted under 35 U.S.C. 154(b) by 0 days.

(21) Appl. No.: 18/243,307

(22) Filed: Sep. 7, 2023

(65) Prior Publication Data

US 2024/0224402 A1 Jul. 4, 2024

Related U.S. Application Data

(60) Provisional application No. 63/477,436, filed on Dec. 28, 2022.

(51) Int. Cl.

| | |
|---|---|
| ***H05B 47/17*** | (2020.01) |
| ***H05B 45/10*** | (2020.01) |
| ***H05B 45/20*** | (2020.01) |
| ***H05B 47/155*** | (2020.01) |
| ***H05B 47/175*** | (2020.01) |

(52) U.S. Cl.

CPC ............. *H05B 47/17* (2020.01); *H05B 45/10* (2020.01); *H05B 45/20* (2020.01); *H05B 47/155* (2020.01); *H05B 47/175* (2020.01)

(58) Field of Classification Search

CPC .... H05B 47/17; H05B 47/155; H05B 47/175; H05B 45/10; H05B 45/20

See application file for complete search history.

(56) References Cited

U.S. PATENT DOCUMENTS

| | | | | |
|---|---|---|---|---|
| 6,459,919 | B1 | 10/2002 | Lys et al. | |
| 9,629,217 | B2 * | 4/2017 | Kim | H05B 47/105 |
| 9,854,654 | B2 * | 12/2017 | Gan | H05B 47/16 |
| 10,880,968 | B1 * | 12/2020 | Zhou | H05B 45/20 |
| 10,939,523 | B2 * | 3/2021 | Hanslip | H05B 47/19 |

(Continued)

FOREIGN PATENT DOCUMENTS

| | | |
|---|---|---|
| CN | 104010420 | 8/2014 |
| CN | 207049647 | 2/2018 |

(Continued)

*Primary Examiner* — Raymond R Chai

(74) *Attorney, Agent, or Firm* — Weiss & Arons LLP

(57) ABSTRACT

Apparatus, methods and systems for lighting may be provided. Apparatus may include a fixture. The fixture may include a first light-emitting diode ("LED"). The first LED may emit light of a first color. The fixture may include a second LED. The second LED may emit light of a second color. The apparatus may include a light driver circuit. The light driver circuit may operate the fixture in a tunable color mode. The light driver circuit may operate the fixture in a dim-to-warm mode. The light driver circuit may switch between the tunable color mode and the dim-to-warm mode. The light driver circuit may switch between the tunable color mode and the dim-to-warm mode in response to a signal corresponding to a user mode-selection.

30 Claims, 62 Drawing Sheets

(56) References Cited

U.S. PATENT DOCUMENTS

| | | | | |
|---|---|---|---|---|
| 11,106,251 | B2 * | 8/2021 | Zolotykh | H05B 47/1985 |
| 11,864,290 | B1 | 1/2024 | Puvanakijjakorn et al. | |
| 11,892,148 | B2 | 2/2024 | Vancorenland et al. | |
| 11,906,114 | B2 * | 2/2024 | Halliwell | F21K 9/237 |
| 2005/0047134 | A1 | 3/2005 | Mueller et al. | |
| 2007/0103086 | A1 | 5/2007 | Neudorf et al. | |
| 2007/0222399 | A1 | 9/2007 | Bondy et al. | |
| 2010/0090613 | A1 | 4/2010 | Spartano | |
| 2011/0115399 | A1 | 5/2011 | Sadwick et al. | |
| 2014/0239841 | A1 | 8/2014 | Gilman et al. | |
| 2016/0021716 | A1 * | 1/2016 | Kim | H05B 47/105 315/129 |
| 2016/0234899 | A1 | 8/2016 | Reed et al. | |
| 2016/0366746 | A1 | 12/2016 | Van de Ven et al. | |
| 2017/0011670 | A1 | 1/2017 | Van de Ven et al. | |
| 2017/0064790 | A1 | 3/2017 | Clark et al. | |
| 2017/0108235 | A1 * | 4/2017 | Guan | H05B 47/105 |
| 2017/0164439 | A1 | 6/2017 | Reed | |
| 2017/0265260 | A1 | 9/2017 | Briggs et al. | |
| 2018/0013986 | A1 | 1/2018 | Chien | |
| 2018/0070419 | A1 | 3/2018 | Girard et al. | |
| 2019/0069381 | A1 | 2/2019 | Cho et al. | |
| 2019/0098723 | A1 | 3/2019 | Sadwick et al. | |
| 2019/0098734 | A1 | 3/2019 | Dolan | |
| 2019/0104577 | A1 | 4/2019 | Miller et al. | |
| 2019/0313503 | A1 | 10/2019 | Woytowitz | |
| 2019/0320515 | A1 | 10/2019 | Sadwick | |
| 2020/0100334 | A1 | 3/2020 | Han | |
| 2021/0136886 | A1 | 5/2021 | Reed | |
| 2021/0360755 | A1 * | 11/2021 | Upton | H05B 47/11 |
| 2022/0120423 | A1 * | 4/2022 | Jeswani | F21V 23/0435 |
| 2022/0201820 | A1 | 6/2022 | Kumar et al. | |
| 2022/0279634 | A1 * | 9/2022 | Upton | H05B 47/16 |
| 2023/0007744 | A1 * | 1/2023 | Chaturvedi | G06F 3/04847 |
| 2023/0031367 | A1 * | 2/2023 | Li | H05B 45/20 |
| 2023/0235860 | A1 * | 7/2023 | Halliwell | F21V 23/04 315/294 |
| 2023/0319960 | A1 * | 10/2023 | Casey | H05B 47/1965 315/129 |
| 2023/0345596 | A1 | 10/2023 | Slivka | |
| 2023/0345600 | A1 * | 10/2023 | Shearer | H05B 45/22 |
| 2023/0397309 | A1 * | 12/2023 | Casey | H05B 47/155 |
| 2024/0163992 | A1 | 5/2024 | Puvanakijjakorn et al. | |

FOREIGN PATENT DOCUMENTS

| | | |
|---|---|---|
| CN | 107427687 | 11/2019 |
| CN | 116847502 | 10/2023 |
| CN | 221058470 | 5/2024 |
| DE | 102012101327 | 8/2012 |
| DE | 102014206434 | 10/2015 |

* cited by examiner

DYNAMIC DIM-TO-WARM WITH COLOR-TUNABLE FIXTURES

CROSS-REFERENCE TO RELATED APPLICATIONS

This is a non-provisional of U.S. Provisional Application No. 63/477,436, filed on Dec. 28, 2022, which is hereby incorporated by reference in its entirety.

BACKGROUND

LED lighting is often controlled by dimmers. As lighting power is reduced, an overall correlated color temperature ("CCT") of the lighting may change. The CCT may be based on a ratio of power distributed to high CCT lighting elements and low CCT lighting elements. Different ratios may provide different overall CCT of the lighting. Different users may have different preferences for the CCTs at different lighting power levels. In particular, different users may have different preferences for the overall CCT at dimmed lighting levels.

It would therefore be desirable to provide apparatus and methods for providing different CCT at dimmed lighting levels.

Figure 1:
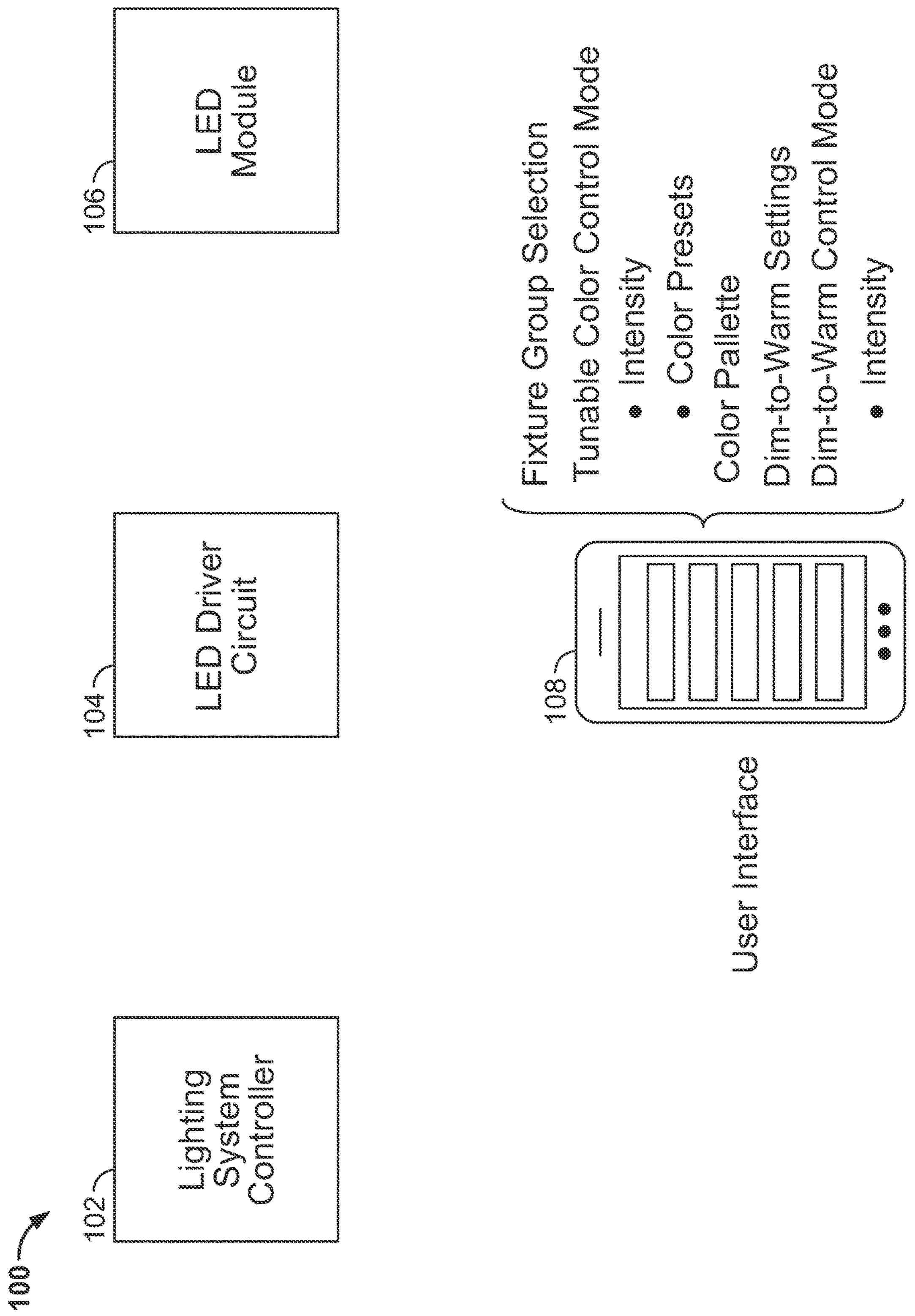
FIG. 1 shows schematically illustrative apparatus in accordance with principles of the invention.

The leftmost digit (e.g., "L") of a three-digit reference numeral (e.g., "LRR"), and the two leftmost digits (e.g., "LL") of a four-digit reference numeral (e.g., "LLRR"), generally identify the first figure in which a part is called-out.

DESCRIPTION

Apparatus and methods for lighting are provided.

The apparatus may include a fixture. The fixture may include a lighting module. The fixture may include a first light-emitting diode ("LED") configured to emit light of a first color. The fixture may include a second LED configured to emit light of a second color. The fixture may include a third LED configured to emit light of a third color. The fixture may include a fourth LED configured to emit light of a fourth color. The fixture may include a fifth LED configured to emit light of a fifth color. The fixture may include any suitable number of LEDs, each configured to emit light of different colors.

The fixture may emit light having a mixture of two of the colors. The fixture may emit light having a mixture of any suitable number of colors. The lighting fixture may emit light having a mixture of the different of colors of the LEDs included in the fixture. One or more of the colors may be white. The white color may have a correlated color temperature ("CCT"). When two or more of the colors are white, the two whites may have different CCTs. One of the whites may be a cool white. One of the whites may be a warm white. One or more of the colors may be red. One or more of the colors may be green. One or more of the colors may be blue. One or more of the colors may be any suitable light color.

Table 1 lists Illustrative ranges that may include nominal CCT values for one or more of the LEDs.

TABLE 1

| Illustrative ranges that may include nominal CCT values for one or more of the LEDs, Illustrative ranges (° K) | |
|---|---|
| Lower | Upper |
| <1800 | 1800 |
| 1800 | 1900 |
| 1900 | 2000 |
| 2000 | 2100 |
| 2100 | 2200 |
| 2200 | 2300 |
| 2300 | 2400 |
| 2400 | 2500 |
| 2500 | 2600 |
| 2600 | 2700 |
| 2700 | 2800 |
| 2800 | 2900 |
| 2900 | 3000 |
| 3000 | 3100 |
| 3100 | 3200 |
| 3200 | 3300 |
| 3300 | 3400 |
| 3400 | 3500 |
| 3500 | 3600 |
| 3600 | 3700 |
| 3700 | 3800 |
| 3800 | 3900 |
| 3900 | 4000 |
| 4000 | 4100 |
| 4100 | 4200 |
| 4200 | 4300 |
| 4300 | 4400 |
| 4400 | 4500 |
| 4500 | 4600 |
| 4600 | 4700 |
| 4700 | 4800 |
| 4800 | 4900 |
| 4900 | 5000 |
| 5000 | >5000 |
| Other suitable lower limits | Other suitable upper limits |

The fixture may include a base. The base may include contacts. The contacts may receive DC power. The DC power may be received from a fixture support. The DC power may power the fixture. The contacts may receive signals. The signals may be received from the fixture support. The base of the fixture may dock at the fixture support. The base of the fixture may be releasable from the fixture support.

The fixture may include a microcontroller. The microcontroller may be disposed in the base. The microcontroller may cause the first and second LEDs to operate in correspondence with a user-selectable tunable color mode. The microcontroller may cause the first and second LEDs to operate in correspondence with a user-selectable dim-to-warm mode. The microcontroller may cause any of the different LEDs included in the fixture to operate in correspondence with the user-selectable tunable color mode. The microcontroller may cause any of the different LEDs included in the fixture to operate in correspondence with the user-selectable dim-to-warm mode. The microcontroller may operate in correspondence with the tunable color mode in response to a signal. The microcontroller may operate in correspondence with the dim-to-warm mode in response to the signal. The signal may be a communication signal. The signal may indicate in which mode to operate the LEDs.

The microcontroller may receive the signal. The signal may include an indicator of a user-selected mode. The user-selected mode may include the tunable color mode. The user-selected mode may include the dim-to-warm mode. The user-selected mode may include any suitable user-selectable mode. The microcontroller may cause the LEDs in the fixture to emit light. The light emitted by the LEDs included the fixture may correspond to two or more inputs from the first signal when the indicator corresponds to the tunable color mode. The light emitted by the LEDs included in the fixture may correspond to one or more inputs from the first signal and a preselected user parameter when the indicator corresponds to the dim-to-warm mode. The parameter may be a low-intensity CCT partition set-point of a dimming correlation. The parameter may be a high-intensity CCT partition set-point of a dimming correlation. The parameter may fix a CCT partition. The CCT partition may correspond to a light level between the low-intensity CCT partition set-point and the high-intensity CCT partition set-point.

The apparatus may include a central processing unit ("CPU"). The preselected user parameter may be a dim-to-warm correlation. The preselected user parameter may be stored in the CPU. The preselected user parameter may be stored in the microcontroller. The preselected user parameter may be stored in any other suitable memory location. The preselected user parameter may be included in a plurality of preselected user parameters. The plurality of preselected user parameters may be stored in the CPU. The plurality of preselected user parameters may be stored in the microcontroller. The plurality of preselected user parameters may be stored at any other suitable memory location. A user may select a preselected user parameter from the plurality of preselected user parameters. The first signal may include corresponding dim-to-warm correlation values of the preselected user parameter.

The two inputs from the tunable color mode may include a first datum and a second datum. The first datum may correspond to a dimming level. The second datum may correspond to a CCT level.

The one input from the dim-to-warm mode may include a third datum. The third datum may correspond to a dimming level. The third datum may be the same as the first datum.

The microcontroller may receive a data packet. The microcontroller may receive a plurality of data packets. Each data packet may include a mode indicator. The mode indicator may indicate if a mode includes one input. The indication of one input may correspond to the dim-to-warm mode. The one input may be a user-selected brightness/dimming level. The microcontroller may use the one input with the preselected parameter to cause the LEDs to emit a light in the dim-to-warm mode.

The mode indicator may indicate if a mode includes two inputs. The indication of two inputs may correspond to the tunable color mode. One of the two inputs may include a user-selected CCT level. One of the two inputs may include a user-selected brightness/dimming level. The microcontroller may cause the LEDs to emit a light corresponding to the selected CCT and brightness/dimming level. The microcontroller may cause the LEDs to emit a light in the tunable color mode.

The signal may be initiated by a user command. The user command may include a control message indicating which mode was selected. The control message may include the mode indicator. The mode may be the tunable color mode. The tunable color mode may include a red, green, blue ("RGB") color mode. The tunable color mode may include a hue saturation value ("HSV") color mode. The tunable color mode may include a full color spectrum mode. The tunable color mode may include a tunable white mode. The tunable color mode may include any suitable color mode. The mode may be the dim-to-warm mode. The mode may include any suitable mode for controlling LED properties.

Table 2 lists illustrative user commands.

TABLE 2

| Illustrative user commands. Illustrative user commands |
|---|
| Voltage level |
| Increase intensity |
| Decrease intensity |
| Increase CCT |
| Decrease CCT |
| Power ON |
| Power OFF |
| Select layout |
| Track circadian lighting (automatically adjust fixture parameter to match circadian cycles) |
| Complement ambient lighting (Light harvesting automation) |
| Automatically adjust fixture parameter based on occupancy of a space (select occupied, unoccupied scenes) |
| Automatically adjust fixture parameter based on occupancy of a space (select occupied, unoccupied scenes) |
| Motion activation ON |
| Motion activation OFF |
| Motion deactivation ON |
| Motion deactivation OFF |
| Select hue for fixture |
| Select hue for group |
| Select power setting |
| Select ambient temperature setting for automatic ON |
| Select ambient temperature setting for automatic OFF |
| Adjust vertical displacement of an LED |
| Illustrative user commands |
| Adjust horizontal displacement of an LED (e.g., move left/right 5 degrees.) |
| Adjust tilt angle of an LED. |
| Adjust pan angle of an LED (e.g., pan to a different heading) |
| Adjust light beam spread angle |
| Other suitable user commands |

Table 3 lists illustrative control messages.

TABLE 3

| Illustrative control messages. Illustrative control messages |
|---|
| Voltage level |
| Increase intensity |
| Decrease intensity |
| Increase CCT |
| Decrease CCT |
| Power ON |
| Power OFF |
| Select layout |
| Track circadian lighting |
| Complement ambient lighting |
| Motion activation ON |
| Motion activation OFF |
| Motion deactivation ON |
| Motion deactivation OFF |
| Select hue for fixture |
| Select hue for group |
| Select power setting |
| Select ambient temperature setting for automatic ON |
| Select ambient temperature setting for automatic OFF |
| Adjust vertical displacement of an LED |
| Adjust horizontal displacement of an LED. |
| Adjust tilt angle of an LED. |
| Adjust pan angle of an LED. |
| Adjust light beam spread angle |
| Other suitable control messages |

The microcontroller may switch between the tunable color mode and the dim-to-warm mode. The microcontroller may receive the signal corresponding to a user mode-selection. A user may select a mode. The user may select a mode via a user interface. The user interface may include an application. The application may be a software application.

The application may be a hardware application. The user may select a mode via a wall switch. The user may select a mode via any suitable switch and/or controller.

The user-selected mode may be transmitted from the user interface to the CPU. The user-selected mode may be transmitted from the wall switch to the CPU. The user-selected mode may be transmitted from any suitable switch/controller to the CPU. The CPU may transmit the signal to the microcontroller. The signal may be transmitted through the data packet. The CPU may transmit the data packet to the microcontroller via a signal protocol.

Table 4 lists illustrative signal protocols.

TABLE 4

| Illustrative signal protocols. Illustrative signal protocols |
|---|
| IEEE 802.11 |
| IEEE 802.15.1 |
| IEEE 802.3 |
| ANSI E1.11 - 2008 (R2018) Entertainment Technology-USITT DMX512-AAsynchronous Serial Digital Data Transmission Standard for Controlling Lighting Equipment and Accessories |
| IEC 62386 |
| TCP/IP |
| Other suitable signal protocols |

The CPU may define a parameter of the wall switch. The CPU may define the parameter of the wall switch based on a user-selected mode. The CPU may define the parameter of the wall switch based on a user-selected CCT partition set-point. The CPU may define the parameter of the wall switch based on a user-selected correlation curve. The CPU may define the parameter of the wall switch based on any suitable user-selected parameter values.

The user interface may include a tunable color mode interface. The user interface may include a dim-to-warm mode interface. Selection of a mode by the user on the user interface may send a signal to the microcontroller. The microcontroller may switch between the tunable color mode and dim-to-warm mode in response to the signal indicating the user-mode selection.

The apparatus may include direct lighting. The fixture may be configured as a downlight. The fixture may be configured as any suitable direct lighting fixture.

In the tunable color mode, the microcontroller may provide, via at least the first and second LEDs, a color that corresponds to a user color command. A user may select a desired color of the light. The user-selected color may be transmitted to the microcontroller via the user color command. The microcontroller may provide the user-selected color by combining at least the color of the first LED and the color of the second LED. The microcontroller may provide a user-selected color by creating a combination of any of the different colors of the LEDs included in the fixture. The combination may be a combination that includes the color of the first LED. The combination may be a combination that includes the color of the second LED. The combination may be a combination that includes one color from the different LEDs included in the fixture. The combination may correspond to a black-body curve.

In the tunable color mode, the microcontroller may provide, via the fixture, light at an intensity corresponding to a user intensity/dimming level command. A user may select a desired intensity/dimming level of the light. The user-selected intensity/dimming level may be transmitted to the microcontroller via the user-intensity/dimming level command. The microcontroller may provide the user-selected intensity/dimming level by increasing or decreasing the intensity/dimming level of the light emitted by the LEDs included in the fixture.

The apparatus may include a preset mode. The preset mode may include preset color commands. Preset color commands may include predefined color combinations. The microcontroller may store the preset color commands. The microcontroller may operate the fixture to emit a selected preset combination in response to the user preset color command. A user may select a preset color command from the preset color commands. The microcontroller may operate at least the first and second LEDs to emit the combination in response to the selected preset color command. The microcontroller may provide the predefined color combination included in the preset color command by creating the stored combination from one or more of the different LEDs included in the fixture.

A preset mode may include a preset intensity/dimming level command. The preset intensity/dimming level command may include one or more predefined intensities/dimming levels. The microcontroller may store the one or more predefined intensities/dimming levels. The microcontroller may operate the fixture to emit a light intensity corresponding to a selected preset intensity/dimming level command. A preset mode may include any other suitable preset mode.

The apparatus may include a color identifier. The microcontroller may translate the color identifier into a color. The microcontroller may derive a combination of colors that creates the color identified from the color identifier. A user may select a color using the color identifier. The microcontroller may operate one or more of the different LEDs included in the fixture to emit light corresponding to the color selected from the color identifier.

In the dim-to-warm mode, the microcontroller may provide, via the fixture, a light having a color that is a combination of at least the first color and the second color LEDs included in the fixture. In the dim-to-warm mode, the microcontroller may provide, via the fixture, a light that corresponds to the brightness/dimming level of the fixture. A user may select a color combination and a brightness/dimming level. The user-selected color and brightness/dimming level may be transmitted to the microcontroller via a signal. The microcontroller may provide the combination of the chosen color and brightness/dimming level from the signal. The combination of the chosen color and brightness/dimming level may be a dim-to-warm correlation. The combination may correspond to the correlation. The combination may correspond to a black-body curve.

The microcontroller may store the dim-to-warm correlation. The microcontroller may store a plurality of dim-to-warm correlations. The plurality of correlations may be preset correlations. A user may select a dim-to-warm correlation from the plurality of correlations. The selected correlation may be transmitted to the microcontroller via a user command. The microcontroller may use the correlation that the user-selected to emit light of the desired color and brightness/dimming level from the different LEDs included in the fixture.

A user may select a high-intensity correlated color temperature ("CCT") partition set-point. A user may select a low-intensity CCT partition set-point. The high-intensity CCT partition set-point and low-intensity CCT partition set-point may be transmitted to the microcontroller. The microcontroller may use the selected high-intensity CCT partition set-point and the selected low-intensity CCT partition set-point to calculate a dim-to-warm correlation.

A user may select a high-intensity CCT partition set-point. The low-intensity CCT partition set-point may be factory set. The microcontroller may use the selected high-intensity CCT partition set-point and the factory set low-intensity CCT partition set-point to calculate a dim-to-warm correlation.

A user may select a low-intensity CCT partition set-point. The high-intensity CCT partition set-point may be factory set. The microcontroller may use the selected low-intensity CCT partition set-point and the factory set high-intensity CCT partition set-point to calculate a dim-to-warm correlation.

The low and high CCT partition set-points may be factory set. The microcontroller may calculate a dim-to-warm correlation based on the factory set CCT partition set-points.

A user may determine a dim-to-warm correlation between the high-intensity CCT partition set-point and the low-intensity CCT set-point. The determined dim-to-warm correlation may be different from the dim-to-warm correlation calculated by the microcontroller. The determined dim-to-warm correlation may be the same as the dim-to-warm correlation calculated by the microcontroller.

A user may select a fixture group. The user may select the fixture group using a user-selection command. The user-selection command may be transmitted to the microcontroller. The microcontroller may select the fixture group based on a user-selection command. The user may select more than one group of fixtures. The user may select one group of fixtures.

The user may select a tunable color mode for the selected group of fixtures. The user may select an intensity level for the selected group of fixtures. The user may select a color preset for the group of fixtures. The user may select an intensity/dimming level preset for the group of fixtures. The user may select a color from the color identifier for the selected group of fixtures. The user may select a dim-to-warm correlation for the selected group of fixtures. The user may select high and low-intensity CCT partition set-points for the selected group of fixtures. The user may select any suitable setting for the selected group of fixtures.

The apparatus may include indirect lighting. The fixture may be configured as an up-light. The fixture may be configured as any suitable indirect lighting fixture.

The microcontroller may be disposed in the fixture support. The microcontroller may be disposed in the fixture support and not in the fixture. The fixture support may be a track, a rail, or any other suitable fixture support. The fixture may include a light tape segment. The fixture may be any suitable fixture.

In the tunable color mode, the microcontroller may provide via the fixture, a light having a color that is a combination of at least the color of the first LED and the color of the second LED. A user may select a desired color of light. The user-selected color may be transmitted to the microcontroller. The microcontroller may provide the user-selected color by combining the color of the first and second LEDs. The microcontroller may provide the user-selected color by creating a combination of any of the different of colors of the LEDs in the fixture. The combination may include the color of the first LED. The combination may include the color of the second LED. The combination may include one color from the different LEDs included in the fixture. The combination may correspond to a black-body curve.

In the tunable color mode, the microcontroller may provide light at an intensity/dimming level that corresponds to a user intensity/dimming level command. A user may select a desired intensity/dimming level of the light. The user-selected intensity/dimming level may be transmitted to the microcontroller via the user-intensity/dimming level command. The microcontroller may provide the user-selected intensity/dimming level by increasing or decreasing the intensity of the light emitted by the different LEDs included in the fixture.

The apparatus may include preset modes. Preset modes may include one or more preset color commands. The one or more preset color commands may include predefined color combinations. The microcontroller may store the predefined color combinations. The microcontroller may operate the fixture to emit a selected preset combination in response to a selected preset color command. A user may select a preset color command from the one or more preset color commands. The microcontroller may operate at least the first and second LEDs to emit the combination in response to the selected preset color command. The microcontroller may provide the preset color command by creating the stored combination from the different LEDs included in the fixture.

Preset modes may include preset intensity/dimming level commands. Preset intensity/dimming level commands may include one or more predefined intensities. The microcontroller may store the one or more predefined intensities/dimming levels. The microcontroller may operate the fixture to emit light at an intensity/dimming level corresponding to a selected preset intensity/dimming level command. Preset modes may include any other suitable preset mode.

The apparatus may include a color identifier. The microcontroller may translate the color identifier into a color. The microcontroller may derive a combination of colors that creates the color identified from the color identifier. A user may select a color using the color identifier. The microcontroller may operate at least the first and second LEDs to emit light corresponding to the color selected from the color identifier.

In the dim-to-warm mode, the microcontroller may provide, via at least the first and second LEDs, a light having a color that is a combination of the colors of at least the first and second LEDs. In the dim-to-warm mode, the microcontroller may provide, via at least the first and second LEDs, a light that corresponds to the brightness/dimming level of the fixture. A user may select a color combination and a brightness/dimming level. The user-selected color and brightness/dimming level may be transmitted to the microcontroller via a signal. The microcontroller may provide the combination of the chosen color and brightness/dimming level from the signal. The combination of the chosen color and brightness/dimming level may be a dim-to-warm correlation. The combination may correspond to a black-body curve.

The microcontroller may store the dim-to-warm correlation. The microcontroller may store a plurality of dim-to-warm correlations. The plurality of correlations may be preset correlations. A user may select a dim-to-warm correlation from the plurality of correlations. The selected correlation may be transmitted to the microcontroller via a user command. The microcontroller may use the correlation that the user selected to provide the desired color and brightness/dimming level to the LEDs included in the fixture.

A user may select a high-intensity CCT partition set-point. A user may select a low-intensity CCT partition set-point. The high-intensity CCT partition set-point and low-intensity CCT partition set-point may be transmitted to the microcontroller. The microcontroller may use the selected high-intensity CCT partition set-point and the selected low-intensity CCT partition set-point to calculate a dim-to-warm correlation.

A user may select a high-intensity CCT partition set-point. The low-intensity CCT partition set-point may be factory set. The microcontroller may user the selected high-intensity CCT partition set-point and the factory set low-intensity CCT partition set-point to calculate a dim-to-warm correlation.

A user may select a low-intensity CCT partition set-point. The high-intensity CCT partition set-point may be factory set. The microcontroller may user the selected low-intensity CCT partition set-point and the factory set high-intensity CCT partition set-point to calculate a dim-to-warm correlation.

The low and high CCT partition set-points may be factory set. The microcontroller may calculate a dim-to-warm correlation based on the factory set CCT partition set-points.

A user may determine a dim-to-warm correlation between the high-intensity CCT partition set-point and the low-intensity CCT set-point. The determined dim-to-warm correlation may be different from the dim-to-warm correlation calculated by the microcontroller. The determined dim-to-warm correlation may be the same as the dim-to-warm correlation calculated by the microcontroller.

The fixture may include a first light tape segment. The first light tape segment may be included in a first light tape. The fixture may include a second light tape segment. The second light tape segment may be included in a second light tape. The fixture may include a plurality of light tape segments. The plurality of light tape segments may be included in a plurality of light tapes.

A user may select a light tape. The user may select a light tape using a user-selection command. The user-selection command may be transmitted to the microcontroller. The user may select more than one light tape. The user may select one light tape.

The user may select a tunable color mode for the selected light tape. The user may select an intensity/dimming level for the selected light tape. The user may select a color preset for the selected light tape. The user may select an intensity/dimming level preset for the selected light tape. The user may select a color from the color identifier for the selected light tape. The user may select a dim-to-warm correlation for the selected light tape. The user may select a high and low-intensity CCT partition set-points for the selected light tape. The user may select any suitable setting for the selected light tape.

The microcontroller may be used to control the CCT and brightness/dimming level of the LEDs included in the light fixture. A user may select a brightness/dimming level in a dim-to-warm mode. The user may select a brightness/dimming level and a CCT level in a tunable color mode. The microcontroller may operate the LEDs to emit a light corresponding to a dim-to-warm correlation when the user-selected brightness/dimming level is a dim-to-warm brightness/dimming level. The microcontroller may operate the LEDs to emit a light corresponding to the user-selected brightness/dimming level and CCT level when the brightness/dimming level and CCT level are a tunable color brightness/dimming level and CCT level. The microcontroller may switch between operating the LEDs in the dim-to-warm mode and in the tunable color mode in response to detecting a change in user-selected inputs.

Illustrative embodiments of apparatus and methods in accordance with the principles of the invention will now be described with reference to the accompanying drawings, which form a part hereof. It is to be understood that other embodiments may be utilized and that structural, functional and procedural modifications, additions or omissions may be made, and features of illustrative embodiments, whether apparatus or method, may be combined, without departing from the scope and spirit of the present invention.

FIG. 1 shows illustrative lighting apparatus 100. The apparatus may include lighting system controller 102. Lighting system controller 102 may include a fixture controller. The apparatus may include light-emitting diode ("LED") driver 104. LED driver 104 may include a microcontroller. The apparatus may include LED module 106. LED module 106 may include one or more LEDs. The microcontroller may control a plurality of light settings of the one or more LEDs included in LED module 106.

The apparatus may include user interface 108. User interface 108 may accept user inputs relating to the plurality of lighting settings. The plurality of lighting settings may include one or more of the following: fixture group selection, tunable color mode, intensity mode, color presets, intensity presets, color palette, dim-to-warm settings, dim-to-warm control mode, dim-to-warm intensity, and any other suitable lighting settings.

Table 5 lists illustrative input formats.

TABLE 5

Illustrative input formats.

| Illustrative formats |
|---|
| DMX (Digital Multiplexer) |
| DALI (Digital Addressable Lighting Interface) |
| TRIAC or ELV (Phase cut dimmer signal) |
| 0-10 V dimmer signal |
| Z-wave (Z-wave Alliance, Beaverton, Oregon) |
| Zigbee (Zigbee Alliance, of San Ramon, California) |
| Custom user defined |
| Default-provided in memory |
| Other third-party control protocol |
| Other suitable input formats |

Lighting system controller 102 may include a transmitter. Lighting system controller 102 may include a receiver. One or both of the transmitter and the receiver may be configured to be in communication with user interface 108. Lighting system controller 102 may be in communication with LED driver 104. LED driver 104 may be in communication with LED module 106. The communication may be wired. The communication may be wireless.

The apparatus may include a fixture (not shown). The fixture may include one or more of system controller 102, LED driver 104, LED module 106 and user interface 108. The fixture may be included in a group of fixtures, such as room downlights. The apparatus may include a fixture support (not shown). The fixture support may include one or more of system controller 102, LED driver 104, LED module 106 and user interface 108.

LED driver 104 may include a microcontroller. The microcontroller may control the color and brightness level of LEDs included in LED module 106. The microcontroller may control the light emitted by the LEDs. The microcontroller may control color of LEDs included in LED module 106 using a dim-to-warm mode. The microcontroller may control the brightness level of LEDs included in LED module 106 using a dim-to-warm mode. The microcontroller may control the color of LEDs included in LED module 106 using a tunable color mode. The microcontroller may control the brightness level of LEDs included in LED module 106 using a tunable white mode.

LED driver 104 may receive a command. The command may be received from lighting system controller 102.

Table 6 shows illustrative commands and illustrative command descriptions.

TABLE 6

Illustrative commands.

| Illustrative commands | Illustrative command description |
|---|---|
| wdLevel | When this parameter is set by an up-stream system, the fixture will go to the brightness and color temperature specified by the Dim-to-warm Curve. |
| wdLow | The color temperature to be rendered at the minimum dimming level. Must be greater than or equal to minColorTemp |
| wdHigh | The color temperature to be rendered at the maximum dimming level. Must be less than or equal to maxColorTemp |
| Other suitable illustrative commands | Other suitable illustrative command description |

Lighting system controller 102 may provide to the lighting system controller wired inputs. the wired inputs may include, for example, triode for alternating current ("TRIAC")/electronic low voltage ("ELV"), 0-10V or any other suitable input.

The user may use an application to cause the lighting system controller to set a wdLevel ("warm dim" level) of a fixture or group. This may allow a single wired input (TRIAC/ELV or 0-10V) to control a fixture or group as if it were a dim-to-warm fixture.

For devices with a DMX input the user may configure a DMX channel to set the wdLevel of a fixture or group. This may allow a single DMX channel to control a fixture or group as if it were a dim-to-warm fixture.

When interacting with fixtures or groups capable of a dim-to-warm feature, the application control may display a toggle to set the fixture to dim-to-warm mode. When in dim-to-warm mode, the application may display a single slider representing the wdLevel of the fixture or group. The application may be an application that does not display separate intensity CCT controls.

The fixture settings for applicable fixtures may also allow for the setting of the wdLow and wdHigh value for those fixtures.

The fixture may calculate the brightness and color temperature to emit when a wdLevel command is received.

Figure 2:
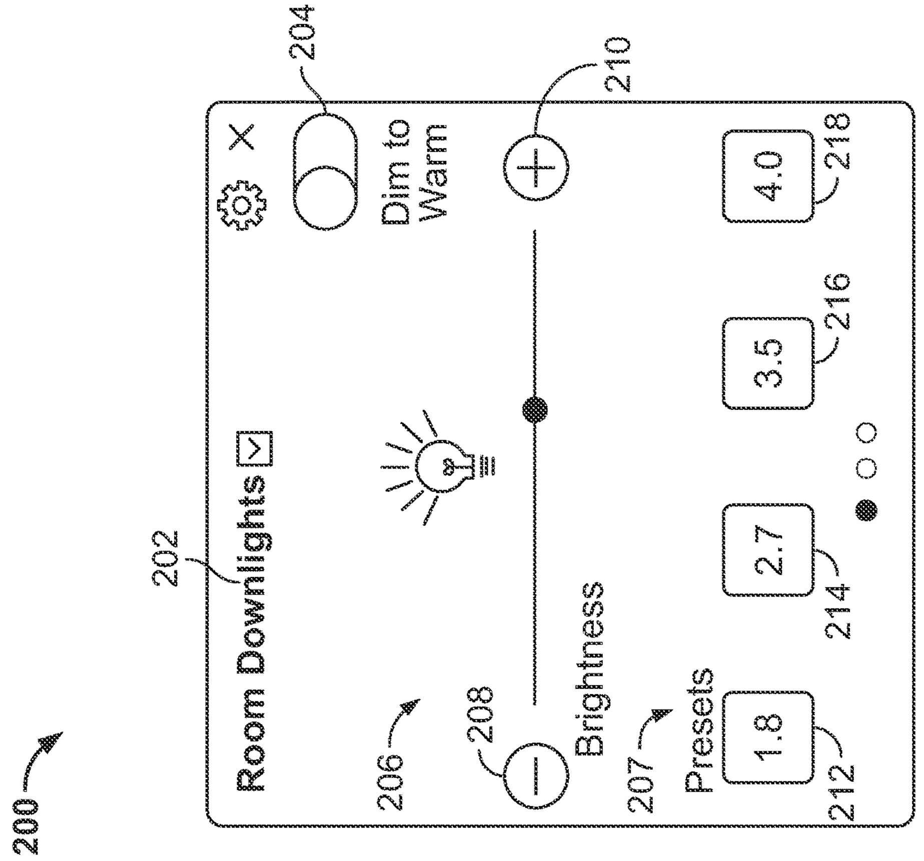
FIG. 2 shows schematically illustrative apparatus in accordance with principles of the invention.

FIG. 2 shows user interface view 200. User interface view 200 may be a tunable color control mode. User interface view 200 may include two or more user-selectable controls, such as a brightness and a correlated color temperature ("CCT"). The user-selectable controls may include brightness control 206. Brightness control 206 may include brightness selector 208. Brightness control 206 may include brightness selector 210. Brightness selector 208 may decrease the brightness level of the light emitted by LED module 106. Brightness selector 210 may increase the brightness level of the light emitted by LED module 106. Brightness control 206 may include a slider. A user may slide along the slider to determine a desired brightness. The brightness control may be an intensity control. The brightness control may include a dimming control.

The user-selectable controls may include preset CCT control 207. Preset CCT control 207 may include presets 212, 214, 216, and 218. Presets 212, 214, 216, and 218 may each correspond to a preset CCT value. The user may use preset CCT control 207 to select a CCT of light emitted by LED module 106.

View 200 may include drop-down list 202 from which the user may select a group of fixtures to control. The group of fixtures may include direct lighting fixtures. The group of fixtures may include indirect lighting fixtures. View 200 may include mode switch 204. Mode switch 204 may be configured to enable a selection between a tunable color mode (such as that shown) and a dim-to-warm mode.

Figure 3:
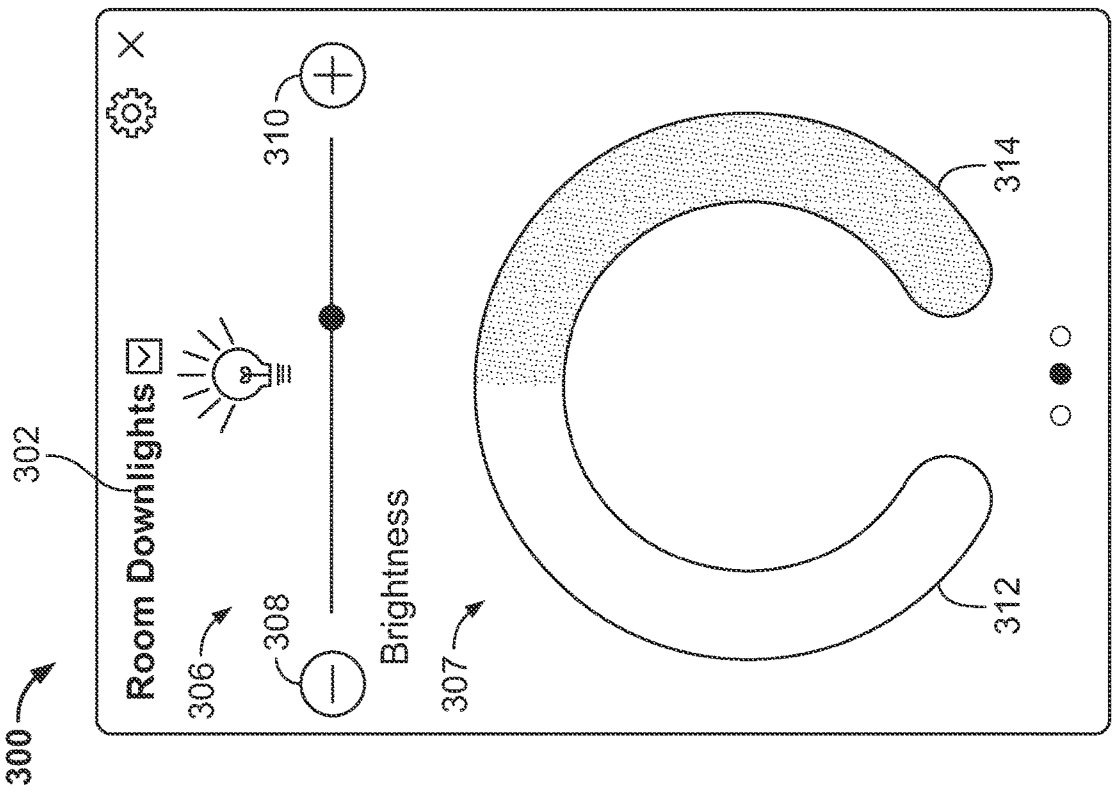
FIG. 3 shows schematically illustrative apparatus in accordance with principles of the invention.

FIG. 3 shows user interface view 300. User interface view 300 may be a tunable color control mode. User interface view 300 may include two or more user-selectable controls The two or more user-selectable controls may include brightness control 306. Brightness control 306 may include brightness selector 308. Brightness control 306 may include brightness selector 310. Brightness selector 308 may decrease the brightness level of the light emitted by LED module 106. Brightness selector 310 may increase the brightness level of the light emitted by LED module 106. Brightness control 306 may include a slider. A user may slide along the slider to determine a desired brightness. The brightness control may be an intensity control. The brightness control may include a dimming control.

The two or more user-selectable controls may include continuous CCT control 307. Continuous CCT control 307 may include low-CCT end 312. Continuous CCT control may include high-CCT end 314. Continuous CCT control 307 may include a range of CCTs from low-CCT end 312 to high-CCT end 314. The user may use continuous CCT control 307 to select a desired CCT of light to be emitted by LED module 106.

View 300 may include drop-down list 302 from which the user may select a group of fixtures to control. The group of fixtures may include direct lighting fixtures. The group of fixtures may include indirect lighting fixtures.

Figure 4:
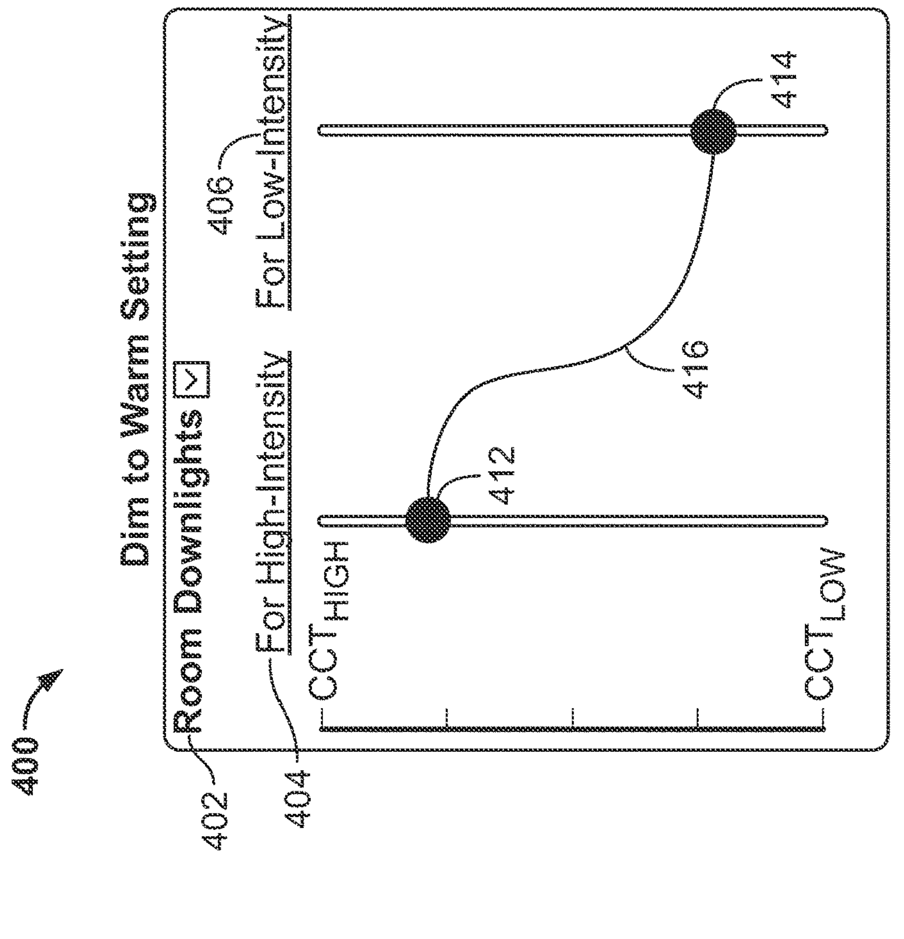
FIG. 4 shows schematically illustrative apparatus in accordance with principles of the invention.

FIG. 4 shows user interface view 400. User interface view 400 may be a dim-to-warm control mode. User interface view 400 may include a parameter selector. User interface view 400 may include a CCT partition set-point selector. View 400 may include a high-intensity CCT partition set-point selector 404. View 400 may include low-intensity CCT partition set-point selector 406.

A user may select high-intensity CCT partition set point 412 using high-intensity CCT partition set-point selector 404. The user may select low-intensity CCT partition set-point 414 using low-intensity CCT partition set-point selector 406. View 400 may indicate correlation curve 416 between the selected high-intensity CCT partition set-point 412 and the low-intensity CCT partition set-point 414. The user interface may provide the user with a control for selecting correlation curve 416.

View 400 may include drop-down list 402 from which the user may select a group of fixtures to control. The group of fixtures may include direct lighting fixtures. The group of fixtures may include indirect lighting fixtures.

Figure 5:
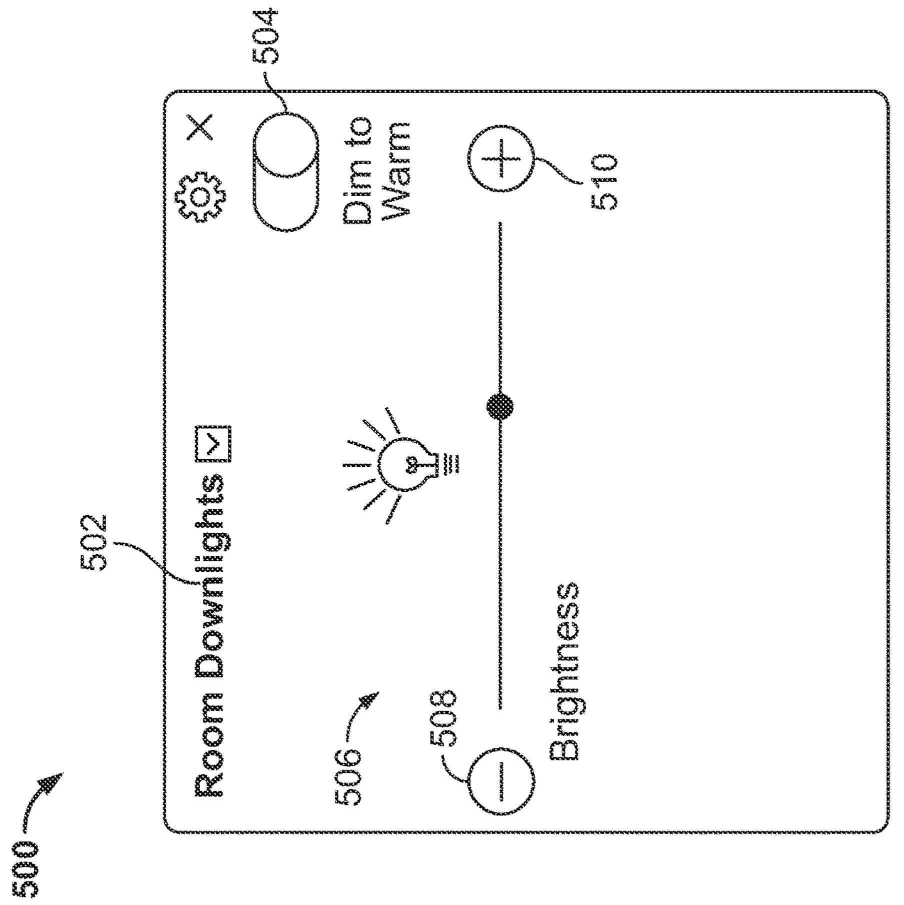
FIG. 5 shows schematically illustrative apparatus in accordance with principles of the invention.

FIG. 5 shows user interface view 500. User interface view 500 may be a dim-to-warm control mode. User interface view 500 may include a user-selectable control. The user-selectable control may be brightness control 506. Brightness control 506 may include brightness selector 508. Brightness control 506 may include brightness selector 510. Brightness selector 508 may decrease the brightness level of the light emitted by LED module 106. Brightness selector 510 may increase the brightness level of the light emitted by LED module 106. Brightness control 506 may include a slider. A user may slide along the slider to determine a desired brightness. The brightness control may be an intensity control. The brightness control may include a dimming control.

View 500 may include drop-down list 502 from which the user can select a group of fixtures to control. The group of fixtures may include direct lighting fixtures. The group of fixtures may include indirect lighting fixtures. View 500 may include mode switch 504. Mode switch 504 may be configured to enable a selection between a tunable color mode and a dim-to-warm mode (such as that shown).

In the dim-to-warm mode, the user may select a brightness from brightness control 506. The microcontroller may use the selected brightness to compute a corresponding CCT for LED module 106 based on the selections shown in the dim-to-warm parameter selector view (shown in FIG. 4).

Figure 6:
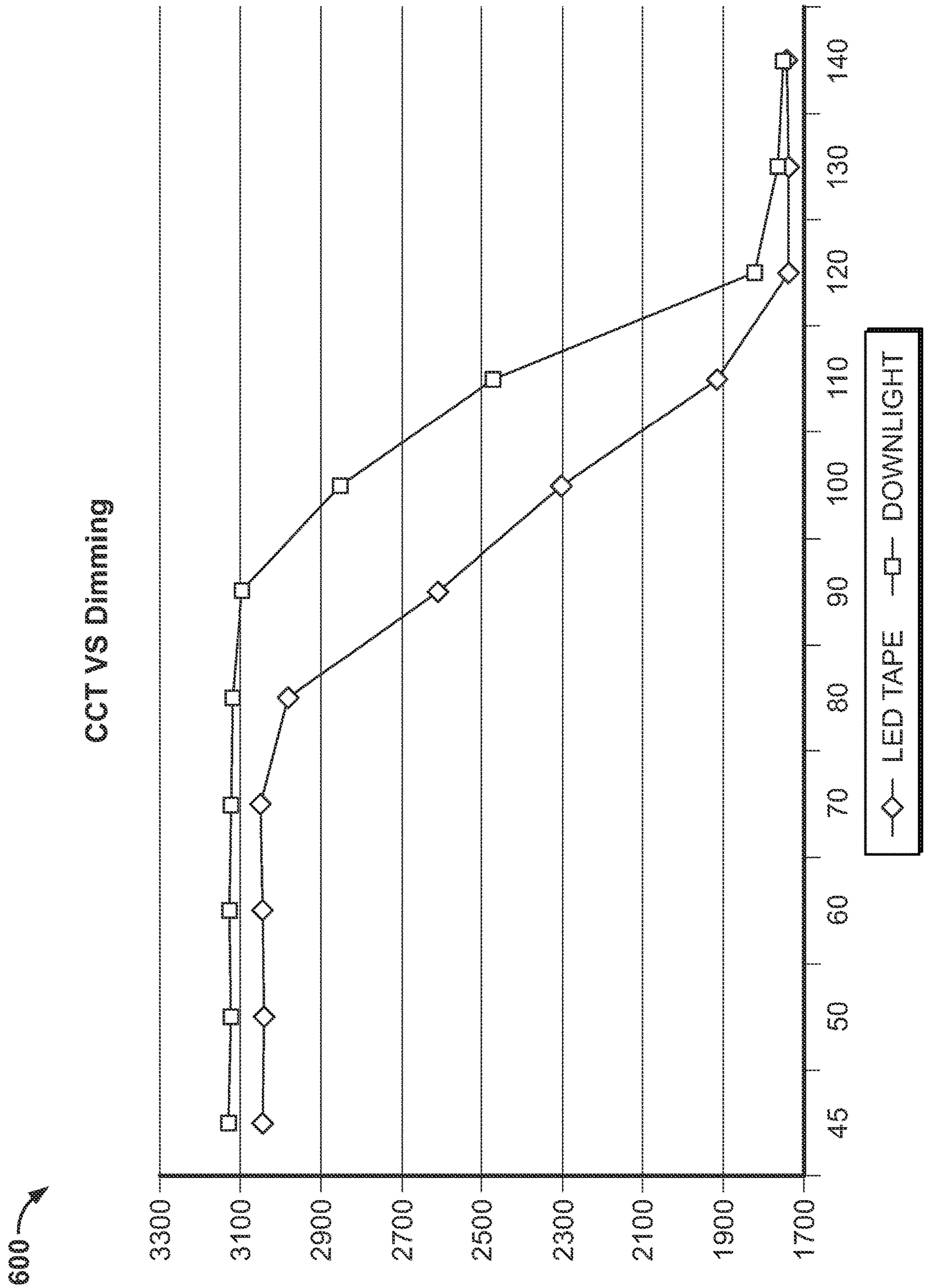
FIG. 6 shows illustrative information in accordance with principles of the invention.

FIG. 6 shows illustrative curves 600 for a fixture with 1800-3200K CCT capability. Curves 600 may correspond to user-selected CCT partition points and intensity levels from the selector shown in FIGS. 4 and 5. Curves 600 may correspond to direct lighting fixtures. Curves 600 may correspond to indirect lighting fixtures.

Figure 7:
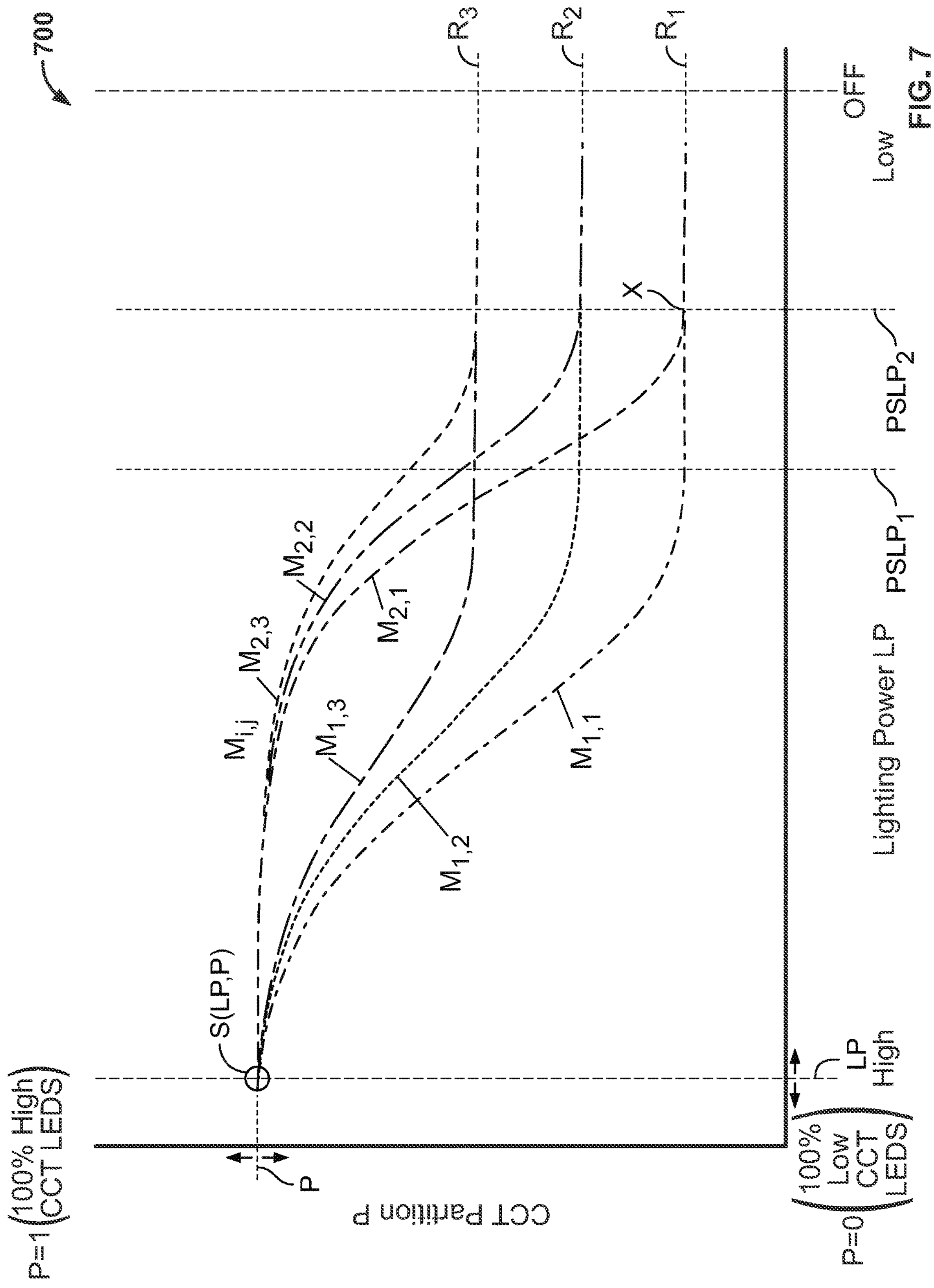
FIG. 7 shows illustrative information in accordance with principles of the invention.

FIG. 7 shows illustrative lighting power-CCT correlation scheme 700. CCT scheme 700 may have one or more features in common with one or more of dim-to-warm setting view 400 and user interface view 500. The horizontal axis may represent a total lighting power (LP) for the high CCT LEDs and the low CCT LEDs included in the fixture, the fixture may include one or more features in common with LED module 106. The vertical axis may represent a partitioning P of power between the high CCT LEDs and the low CCT LEDs. The partitioning may range, for example, from delivery of 100% of the lighting power to low CCT LEDs to delivery of 100% of the lighting power to high CCT LEDs. The partitioning may be linear over the range of LP. The partitioning may be non-linear over the range of LP.

CCT scheme 700 may include CCT partition curves $M_{i,j}$. i may indicate a preset lighting power $PSLP_k$ such as $PSLP_1$ or $PSLP_2$. $_j$ may indicate a CCT partition set-point $R_1$ such as $R_1$, $R_2$ or $R_3$. A CCT partition set-point selector may be used to select a $PSLP_k$. The selector may be used to select a CCT partition set-point $R_1$.

Curves $M_{i,j}$ may be defined using a controller. The controller may have one or more features in common with one or both lighting system controller 102 and the microcontroller included in LED driver 104. Curves $M_{i,j}$ may be stored in the microcontroller. Curves $M_{i,j}$ may be calculated using the controller.

Each of curves $M_{i,j}$ may identify a CCT value that is to be displayed in connection with a given lighting power level.

A user may select a preset lighting power PSLP such as $PSLP_2$. The user may set a CCT partition set-point. The CCT partition set-point may correspond to a CCT partition R such as $R_1$. The user may set scene S. Scene S may be defined by a lighting power LP. Scene S may be defined by a partition P. Scene S may be defined by a lighting power LP and a partition P. Scene S may be a preset dim-to-warm correlation.

When the light source is set to scene S, the user may use dimmer switch to reduce the lighting power of the LEDs. The reduction may proceed in discrete steps. The reduction may be a continuous reduction. The controller may detect the reduction. The controller may determine a curve $M_{2,1}$ that is constrained by scene S, $PSLP_2$ and $R_1$. For each reduced lighting power between scene S and $PSLP_2$, The controller along with a power supply may control the fixture to provide light having a CCT corresponding to $M_{2,1}$. Target X is the CCT partition set-point defined by $R_1$. $M_{2,1}$ may be flat between target X and OFF.

Figure 8:
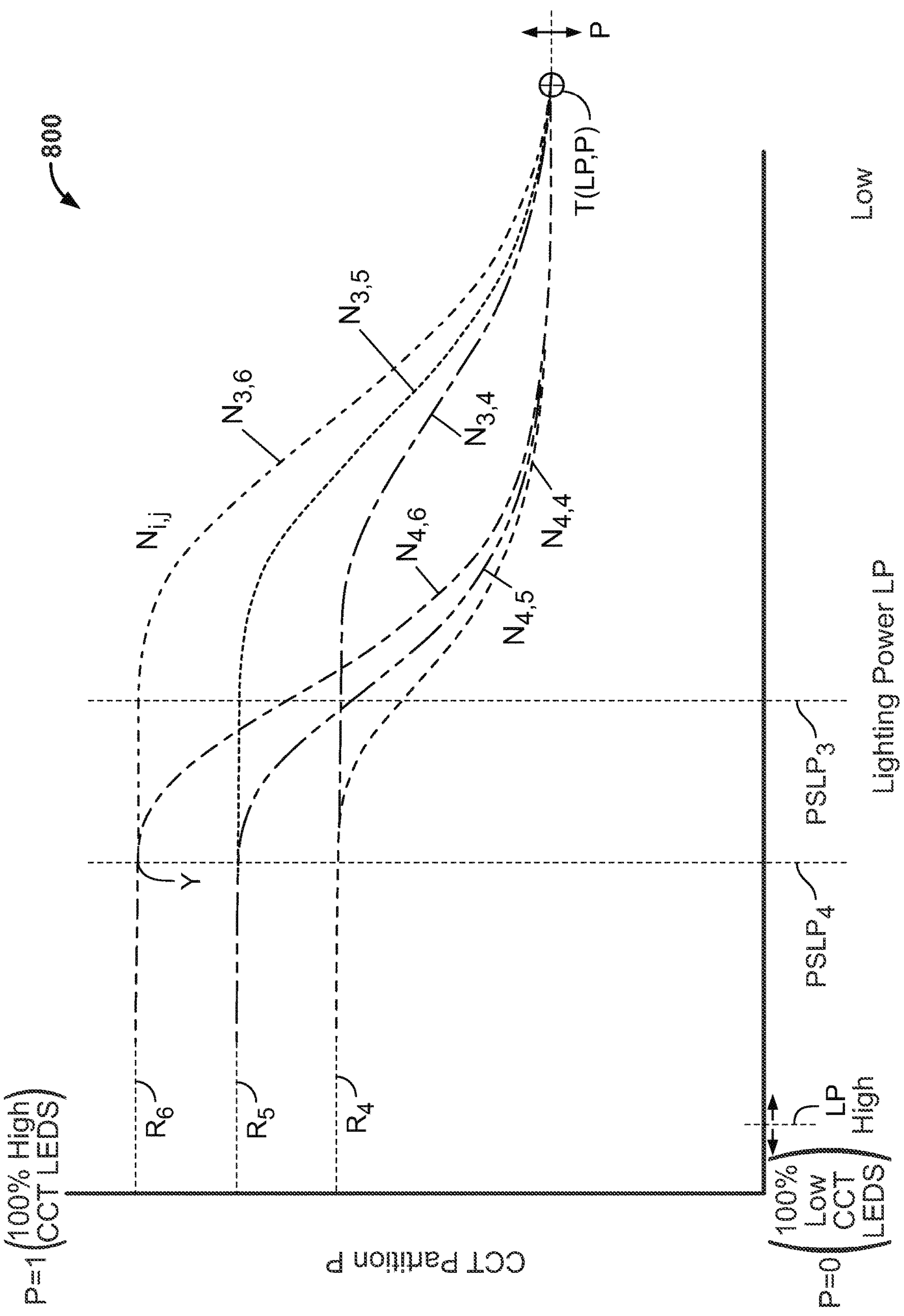
FIG. 8 shows illustrative information in accordance with principles of the invention.

FIG. 8 shows illustrative lighting power-CCT scheme 800. CCT scheme 800 may include one or more features in common with lighting power-CCT-correlation scheme 700. The horizontal axis may represent a total lighting power LP for the high CCT LEDs and the low CCT LEDs included in the fixture. The vertical axis P may represent a partitioning of power between the high CCT LEDs and the low CCT LEDs. The partitioning may range, for example, from delivery of 100% of the lighting power to low CCT LEDs to delivery of 100% of the lighting power to high CCT LEDs. The partitioning may be linear over the range. The partitioning may be non-linear over the range.

CCT scheme 800 may include CCT partition curves $N_{i,j}$. i may indicate a preselected lighting power PSLPk such as PSLP3 or PSLP4. j may indicate a CCT partition $R_1$ such as $R_4$, $R_5$ or $R_6$. The CCT partition set-point selector may be used to select a PSLPk. The selector may be used to select an $R_1$.

Curves $N_{i,j}$ may be defined in the controller. Curves $N_{i,j}$ may be stored in the controller. Curves $N_{i,j}$ may be calculated in the controller.

Each of curves $N_{i,j}$ may identify a CCT value that is to be displayed in connection with a given lighting power level.

A user may select a preset lighting power PSLP such as PSLP4. The user may set a CCT partition set-point. The CCT partition set-point may correspond to a CCT partition R such as R6. The user may set scene T. Scene T may be defined by a lighting power LP. Scene S may be defined by a partition P. Scene S may be defined by both a lighting power LP and a partition P.

When the fixture is set to scene T, the user may use the dimmer switch to increase the lighting power of the LEDs. The increase may proceed in discrete steps. The increase may be a continuous increase. The controller may detect the increase. The controller may determine a curve N4,6 that is constrained by scene T, PSLP4 and R6. For each increased lighting power between scene T and PSLP4, the controller may control the fixture to provide light having a CCT corresponding to N4,6. Target Y is the CCT partition set-point defined by R1. N4,6 may be flat between target Y and a higher LP.

One or more of lighting system controller 102, LED driver 104, LED module 106, user interface 108, and any other suitable lighting apparatus component may perform one or more of the functions of a system for controlling fixtures, such as that shown and described in US Publication No. 2021/0352790 which is hereby incorporated by reference.

Figure 9:
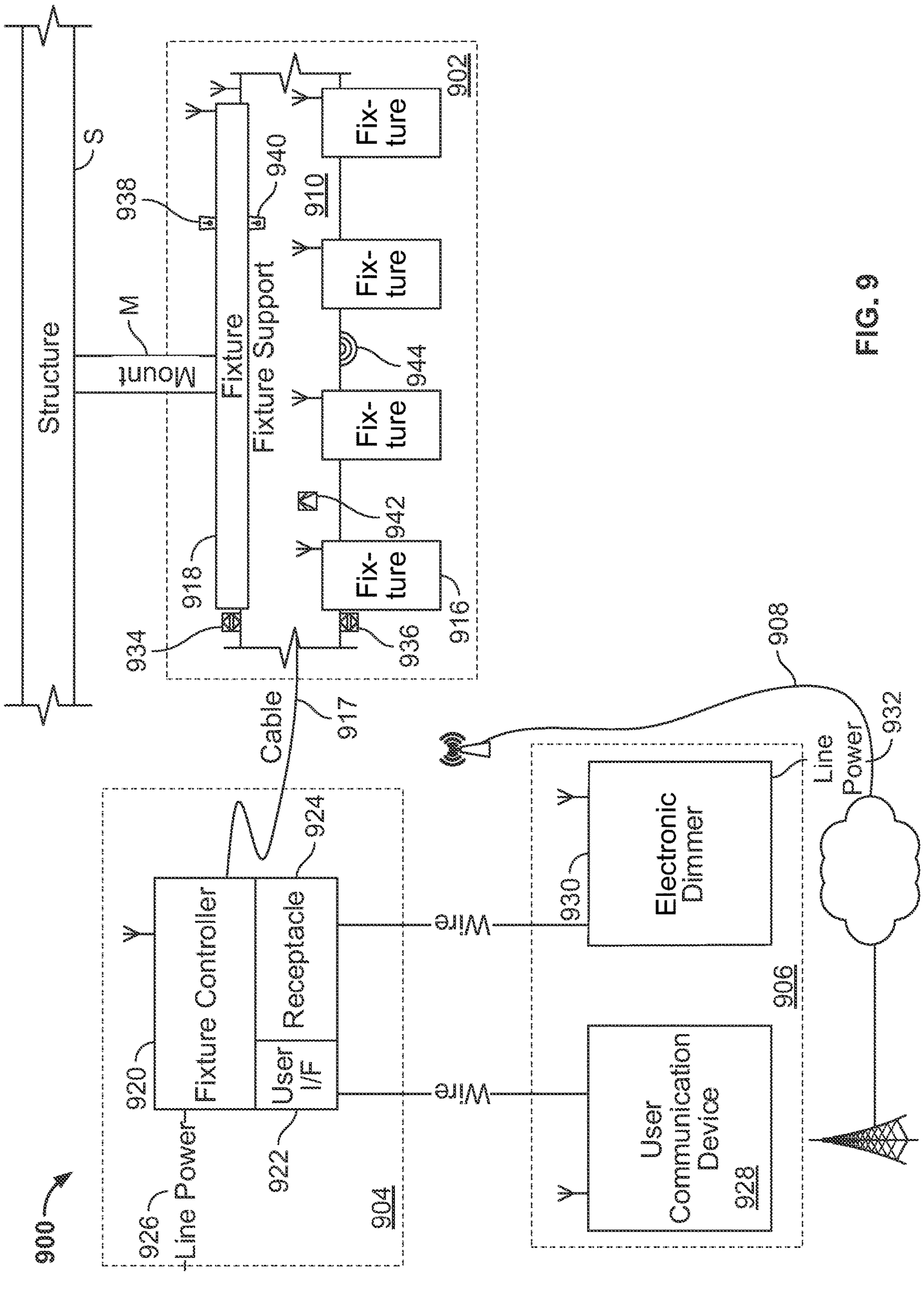
FIG. 9 shows illustrative apparatus in accordance with principles of the invention.

FIG. 9 shows illustrative architecture 900 for controlling fixtures. Architecture 900 may include one or more of the features described herein in relation to lighting apparatus 100. Architecture 900 may include fixture arrangement 902. Fixture arrangement 902 may include LED driver 104 and LED module 106 (shown in FIG. 1). LED driver 104 and LED module 106 may be included in one or more fixtures included in fixture arrangement 902. Architecture 900 may include fixture control module 904. Fixture control module 904 may include lighting system controller 102 (shown in FIG. 1). Architecture 900 may include inputs 906. Architecture 900 may include wide area network 908. Architecture 900 may include any suitable network.

Table 7 lists illustrative networks.

TABLE 7

| Illustrative networks.<br>Illustrative networks |
|---|
| Wide Area Network (e.g., Internet) |
| Local Area Network |
| DMX 512 |
| Dali |
| Other suitable networks |

Architecture 900 may define one or more network segments. A first segment may include inputs 906. A second segment may include fixtures such as fixtures 916 and 918 in fixture arrangement 902. A segment may include one or more individually addressable devices. A segment may include one or more addressable groups.

Fixture arrangement 902 may include fixture support 910. Fixture arrangement 902 may be supported by mount M. Mount M may fix fixture support 910 to structure S. Structure S may include a ceiling, a wall, a beam, cabinet, a free-standing object or any other suitable structure. Fixture support 910 may support one or more fixtures such as fixture 916. Fixture support 910 may support one or more fixtures such as fixture 918. One or more of fixtures 916 and 918 may be disposed on top of fixture support 910. One or more of fixtures 916 and 918 may be disposed on bottom of fixture support 910. One or more of fixtures 916 and 918 may be disposed on a side of fixture support 910. One or more of fixtures 916 and 918 may be disposed on an end of fixture support 910.

Fixture control module 904 may include fixture controller 920. Fixture control module 904 may include user interface 922. Fixture control module 904 may include receptacle 924. Fixture controller 920 may be in electrical communication with line power 926. Line power 926 may provide two-phase or three-phase power at 110 V or 220 V, DC voltage at any suitable level, or any other suitable voltage. Receptacle 924 may receive a dimmer voltage from electronic dimmer 930. Fixture 916 may operate over a range of operational levels. Fixture 916 may operate at a maximum operational level. The dimmer voltage may have a maximum voltage. A proportion of the maximum dimmer voltage that is represented by the dimmer voltage may correspond to an operational level at which a fixture 916 is to be operated. The dimmer voltage proportion, if applied to the maximum operational level, may define the operational level at which a fixture 916 is to be operated.

The operational level may be a power level, a current level, or any other suitable level.

Input 906 may include user communication device 928. User communication device 928 may include user interface 108. Input 906 may include electronic dimmer 930.

Fixture controller 920 may be in wired electrical communication with fixture arrangement 902. The wired electrical communication may be provided by cable 917. The wired electrical communication may provide power to fixture arrangement 902. The wired electrical communication may provide control messages to fixture arrangement 902. Fixture controller 920 may provide the power and the control messages over different conductors. Fixture controller 920 may provide the power and the control messages simultaneously over a conductor, as is done in power line control methods.

Fixture controller 920 may be in wireless communication with fixture arrangement 902. The wireless electrical communication may provide control messages to fixture arrangement 902.

Communication between fixture controller 920 and fixture arrangement 902 may be wholly or in part by wired electrical communication. Communication between fixture controller 920 and fixture arrangement 902 may be wholly or in part by wireless electrical communication. Communication between fixture controller 920 and fixture arrangement 902 may be wholly or in part by wireless communication. The wireless communication may include optical communication. The wireless communication may include acoustic communication. Communication between fixture controller 920 and fixture arrangement 902 may be partially by wired electrical communication and partially wireless communication.

Fixture control module 904 may be in communication with input 906.

User interface 922 may provide communication functions for fixture control module 904. The communication may include transmission of a user command to fixture control module 904. The communication may include transmission of fixture information to input 906. The fixture information may include a fixture parameter. The communication may be wireless. The communication may be wired.

User interface 922 may receive a user command from communication device 928. User interface 922 may include a data input device. The data input device may include one or more of a touch screen, a key-pad and any other suitable device. User interface 922 may receive a user command from communication device 928. Control over a fixture may be passed from user communication device 928 to user interface 922. Control over a fixture may be passed from user interface 922 to user communication device 928. The control may be passed by the user. The control may be configured to be passed automatically. The control may be configured to be passed automatically upon the fulfilment of a condition. The condition may be a temporal condition. The condition may be based on a fixture parameter. The condition may be based on an ambient lighting condition. The condition may be based on any suitable condition.

Electronic dimmer 930 may provide TRIAC/ELV dimming. Electronic dimmer 930 may receive electrical current from line power 932.

Architecture 900 may include one or more sensors. The sensors may include a range sensor such as sensors 934 and 936. The range sensor may sense a distance to a surface. The sensors may include a temperature sensor such as sensors 938 and 940. The temperature sensor may sense an ambient temperature. The temperature sensor may sense a temperature or a differential temperature of a surface at a distance from the sensor. The sensors may include motion sensors such as sensors 942. The sensors may include one or more light sensors such as sensors 944. The light sensor may sense visible light. The light sensor may sense energy associated with one or more wavelengths of light.

Figure 10:
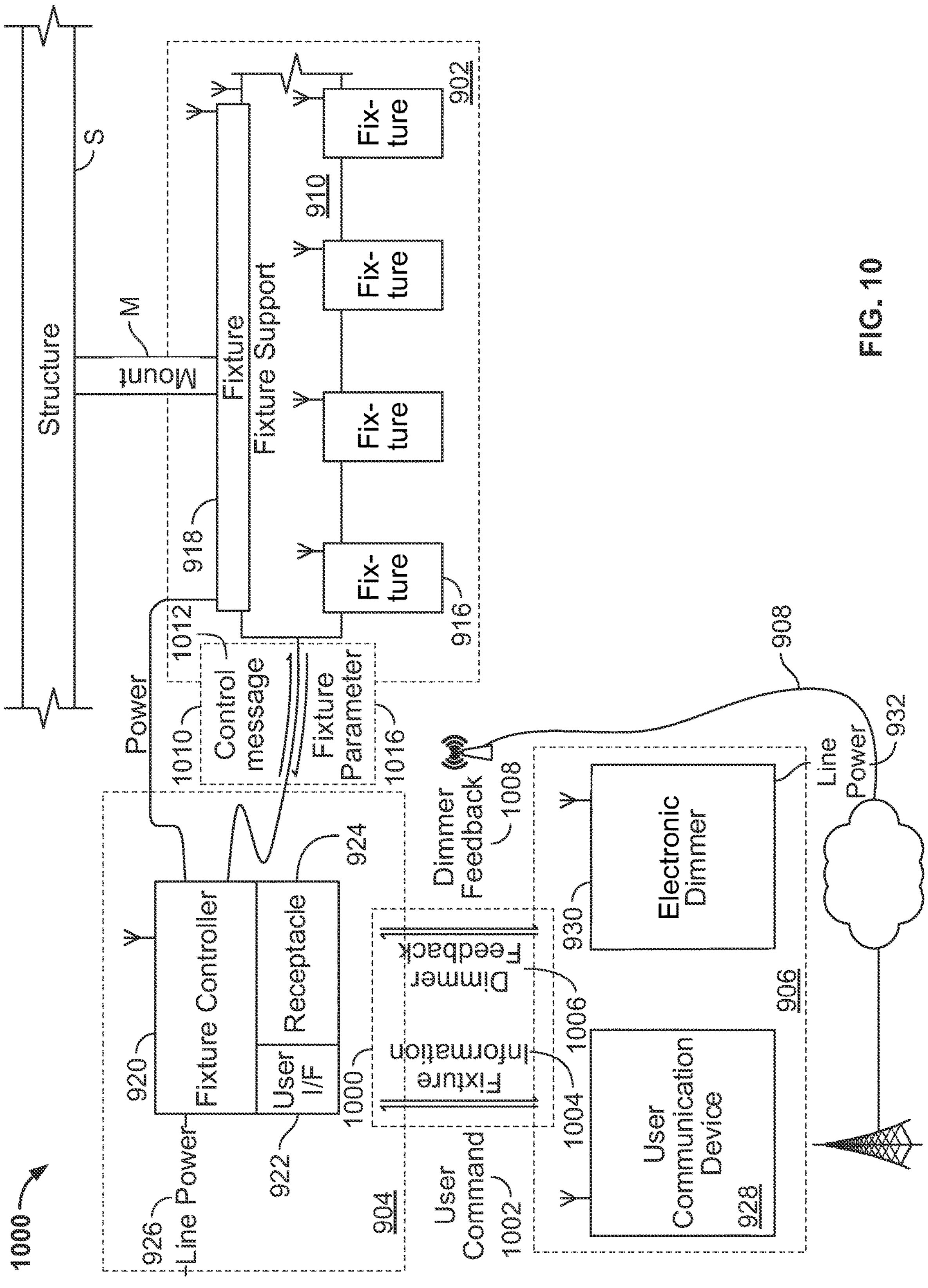
FIG. 10 shows illustrative apparatus in accordance with principles of the invention.

FIG. 10 shows illustrative communications 1000 between fixture controller 920 and input 906. Illustrative communications 1000 may include user command 1002, fixture information 1004, dimmer voltage 1006, dimmer feedback 1008 or any other suitable communication. FIG. 10 shows illustrative communications 1010 between fixture controller 920 and fixture arrangement 902. Communications 1010 may include control messages 1012 for control performance of fixtures such as parameter 1016. Communications 1010 may include fixture parameter 1016.

The lighting apparatus may include architecture for controlling fixtures such as is described in US Publication No. 2021/0352790 which is incorporated by reference herein.

Figure 11:
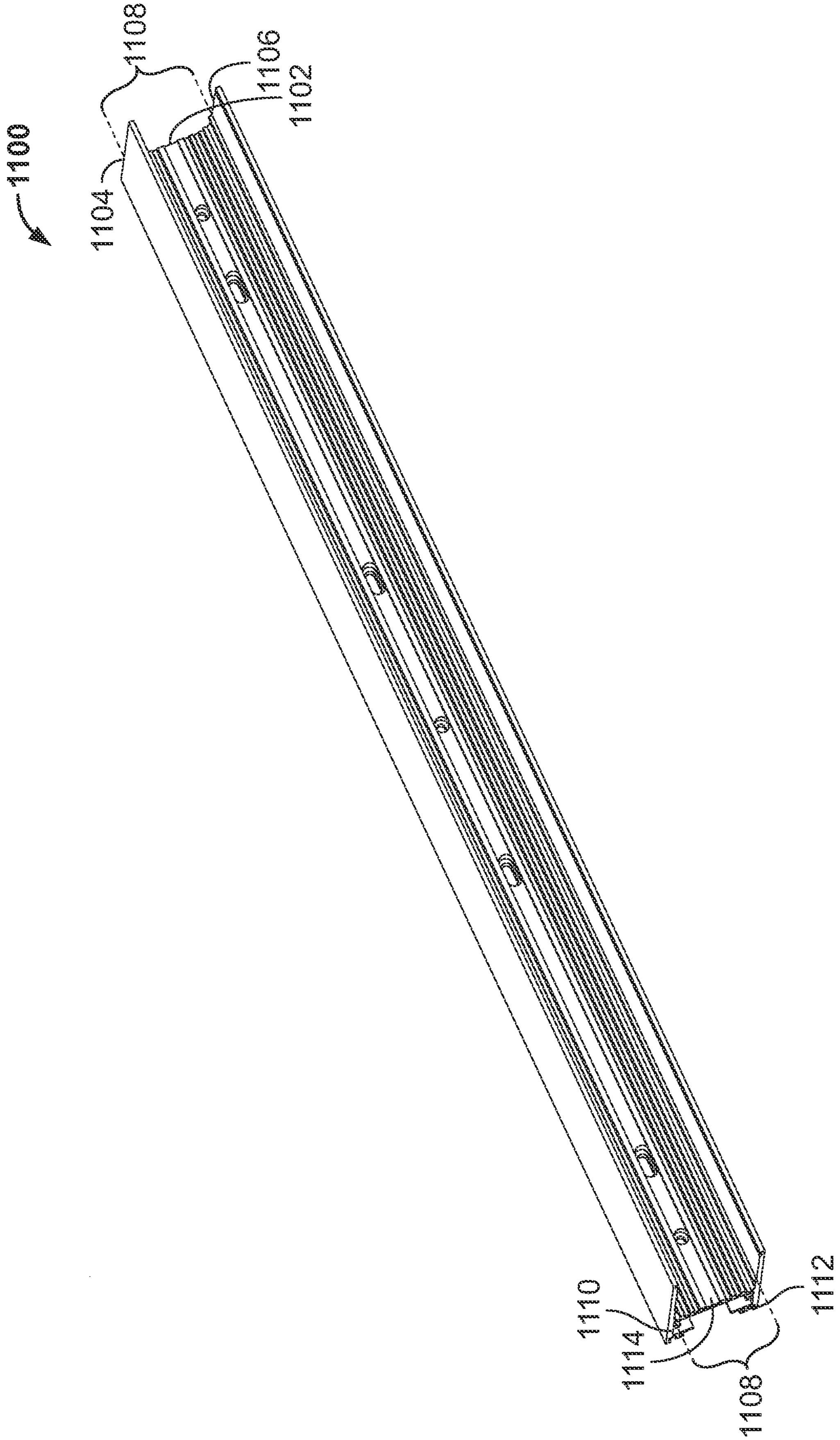
FIG. 11 shows illustrative apparatus in accordance with principles of the invention.

FIG. 11 shows illustrative fixture support 1100. Fixture support 1100 may have one or more features in common with fixture support 910. LED driver 104 and LED module 106 may be disposed in the fixture support. The fixture support may perform one or more functions such as those shown and described in US Publication No. 2021/0352790, which is incorporated by reference herein.

Fixture support 1100 may include spine 1102. Fixture support may include panel 1104. Fixture support may include panel 1106. Spine 1102, panel 1104 and panel 1106 may define fixture docking area 1108. Spine 1102, panel 1104 and panel 1106 may define connector slot 1110. Panel 1104 and panel 1106 may define fixture slot 1112. Fixtures such as fixture 916 may be docked in docking area 1108. Fixtures such as fixtures 918 may be mounted in fixture slot 1112. Fixture docking tier 1114 may be disposed between panel 1104 and 1106.

Figure 12:
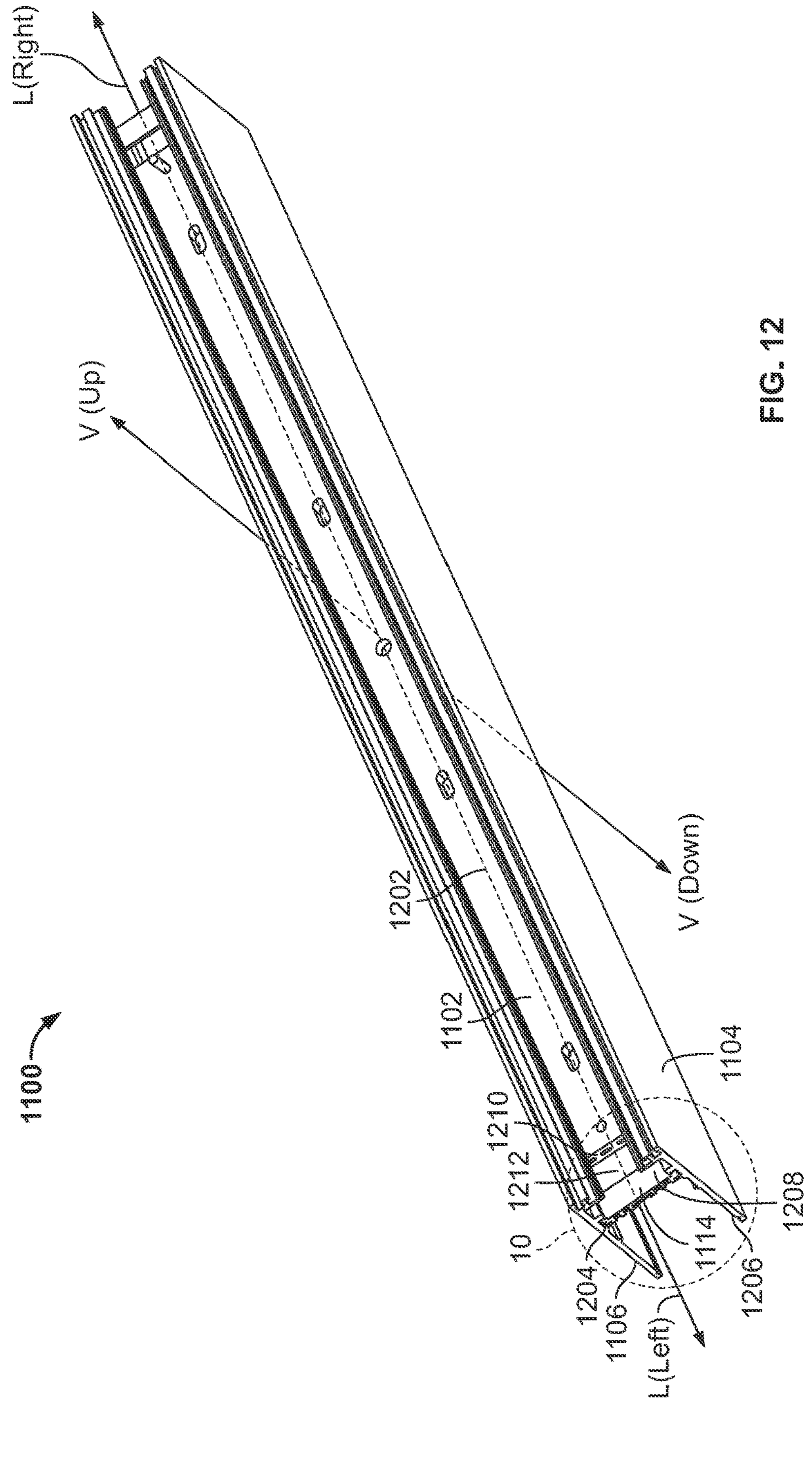
FIG. 12 shows illustrative apparatus in accordance with principles of the invention.

FIG. 12 is a view of fixture support 1100 that is different from that shown in FIG. 11. FIG. 12 shows that spine 1102 may include bridge 1202. Bridge 1202 may span between panel 1104 and panel 1106. Fixture docking tier 1114 may extend longitudinally to the left along longitudinal direction L (left). End 1204 of tier 1114 may be flush with end 1206 of fixture support 1100. Tier 1114 may include platform 1208. Tier 1114 may include connection field 1212. Bridge 1202 may include abutment 1210. Abutment 1210 may be set back to the right along direction L (right) from end 1204. The directions L (left) and R (right) are for description of relative positions within fixture support 1100, and do not necessarily define an orientation of fixture support 1100 relative to any other frame of reference.

Figure 13:
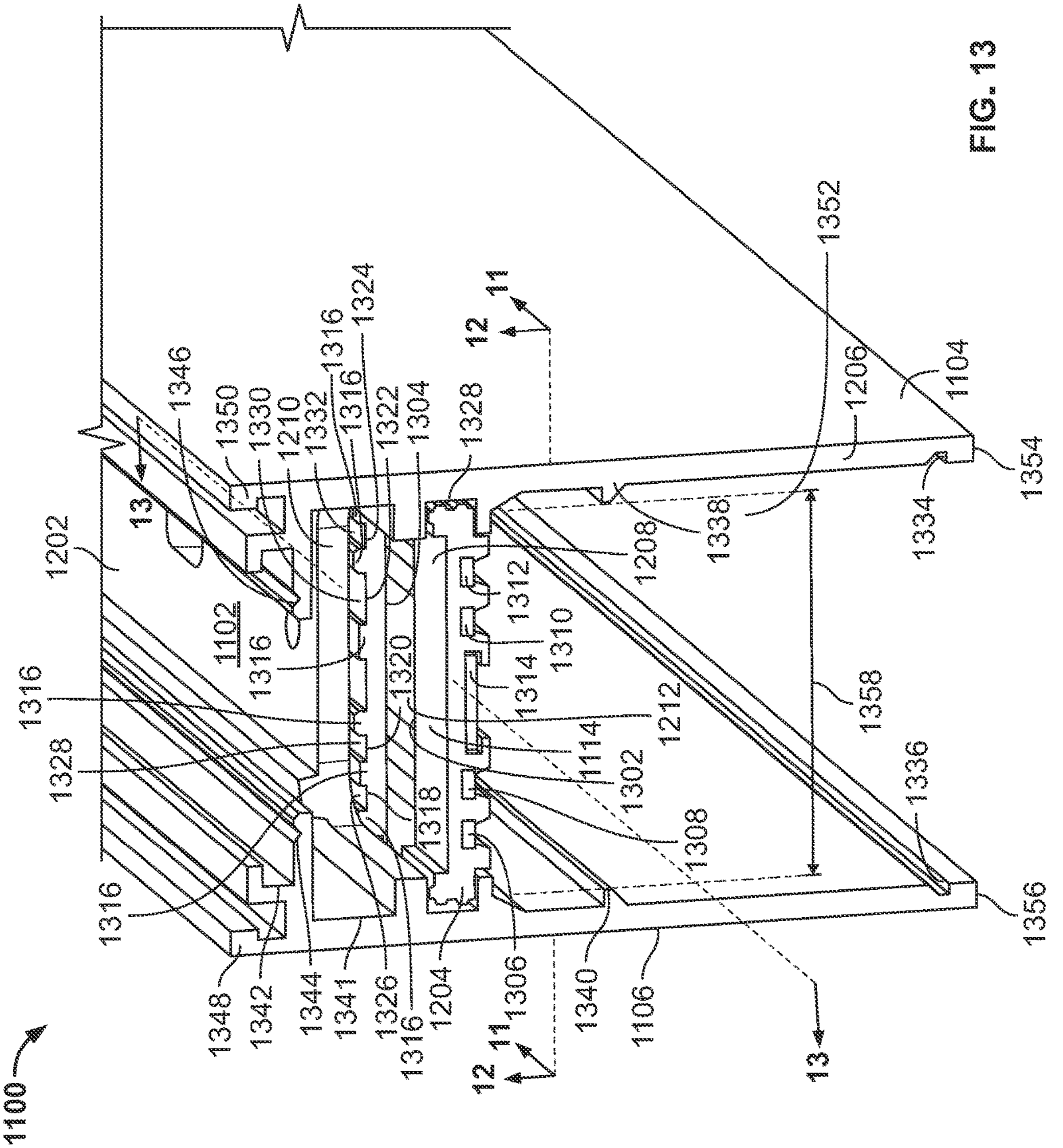
FIG. 13 shows illustrative apparatus in accordance with principles of the invention.

FIG. 13 shows that platform 1208 may be disposed above, in direction V (up), from connection field 1212. The directions V (up) and V (down) are for description of relative positions within fixture support 1100, and do not necessarily define an orientation of fixture support 1100 relative to any other frame of reference. Platform 1208 may include abutment 1302 between platform 1208 and connection field 1212.

Tier 1114 may include back-plate 1304. Back-plate 1304 may extend above, and define a right limit of, connection field 1212. Connection field 1212 may provide access, from above tier 1114 to conductors in tier 1114. A connector bridging from another fixture support to fixture support 1100 may thus be made without interfering with fixture docking area 1108 below tier 1114.

Docking tier 1114 may include conductor 1306. Docking tier 1114 may include conductor 1308. Docking tier 1114 may include conductor 1310. Docking tier 1114 may include conductor 1312. A pair of the conductors, one positive and one negative, may be a communication bus that may transmit communications 1010 (shown in FIG. 10). A pair of the conductors, one positive and one negative, may be a power rail that may transmit power from a transformer. Docking tier 1114 may include magnetic strip 1314. Back-plate 1304 may include ribs such as ribs 1316. Back-plate 1304 may include grooves 1318, 1320, 1322 and 1324. Together with bridge 1202, grooves 1318, 1320, 1322 and 1324 may form slots 1326, 1328, 1330 and 1332.

Panel 1104 may include groove 1334. Panel 1106 may include groove 1336. The grooves may engage with a complementary feature on a fixture such as fixture 916.

Panel 1104 may include ridge 1338. Panel 1106 may include ridge 1340. The ridges may engage with a complementary feature on the fixture.

Docking tier 1114 may be disposed in slot 1328.

Fixture support 1100 may include slot 1341. Slot 1341 may be above tier 1114. Slot 1341 may receive a fixture support connector.

Fixture support 1100 may include slot 1342. Slot 1342 may be above slot 1341. Slot 1342 may include grooves 1344 and 1346. Slot 1342 may receive a fixture such as fixture 918.

Fixture support 1100 may include overhangs 1348 and 1350.

Fixture support 1100 may define U-channel 1352. U-channel 1352 may be defined by docking tier 1114, panel 1104 and panel 1106. Panel 1104 may include distal edge 1354. Panel 1106 may include distal edge 1356. The fixture may be retractable within U-channel 1352. A lowest extreme of the fixture may be retracted above distal edge 1354. A lowest extreme of the fixture may be retracted above distal edge 1356. The lowest extreme may be a lip.

Fixture support 1114 may have docking area width 1358.

Figure 14:
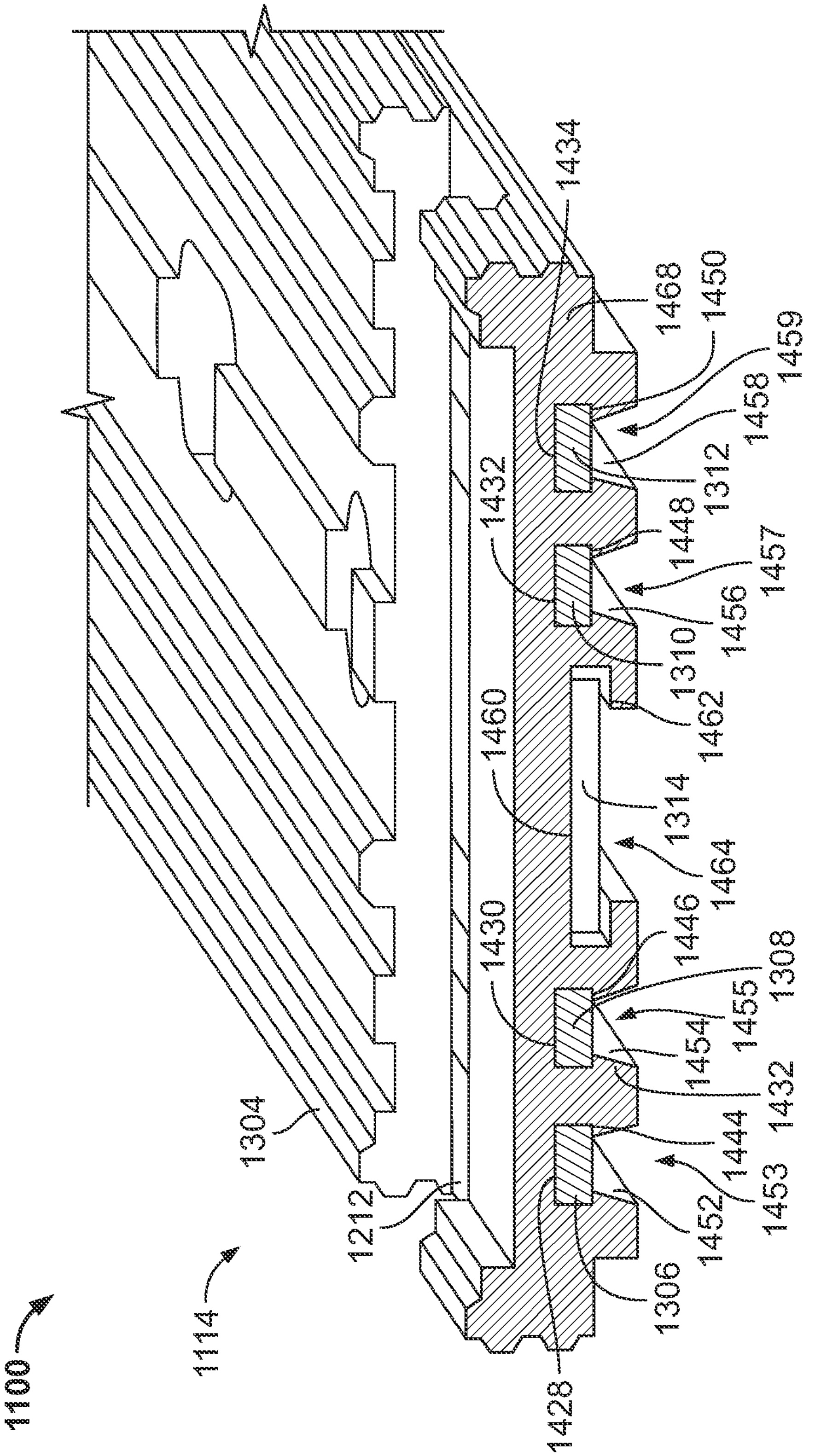
FIG. 14 shows illustrative apparatus in accordance with principles of the invention.

FIG. 14 shows that conductors 1306, 1308, 1310 and 1312 may be disposed in grooves 1428, 1430, 1432 and 1434, respectively. Tier 1114 may include lips 1444, 1446, 1448 and 1450, corresponding to grooves 1428, 1430, 1432 and 1434. The lips may retain the conductors in tier 1114. Tier 1114 may include tapers 1453, 1455, 1457 and 1459, corresponding to grooves 1428, 1430, 1432 and 1434. A taper may guide a terminal from a fixture such as fixture 916 toward a conductor. A taper may guide a terminal from a fixture such as fixture 916 into electrical communication with a conductor. A taper may guide a terminal from a fixture such as fixture 916 into direct contact with a conductor. Gaps 1452, 1454, 1456, and 1458 may provide access for direct contact between the fixture and a conductor.

Magnetic strip 1314 may be disposed in groove such as strip 1460. Tier 1114 may include lip 1462 for retaining magnetic strip 1314. Gap 1464 may expose magnetic strip 1314. Gap 1464 may have a magnetic permeability that is less than that of body 1468 of tier 1114. Gap 1464 may be a gap that includes no solid material.

Figure 15:
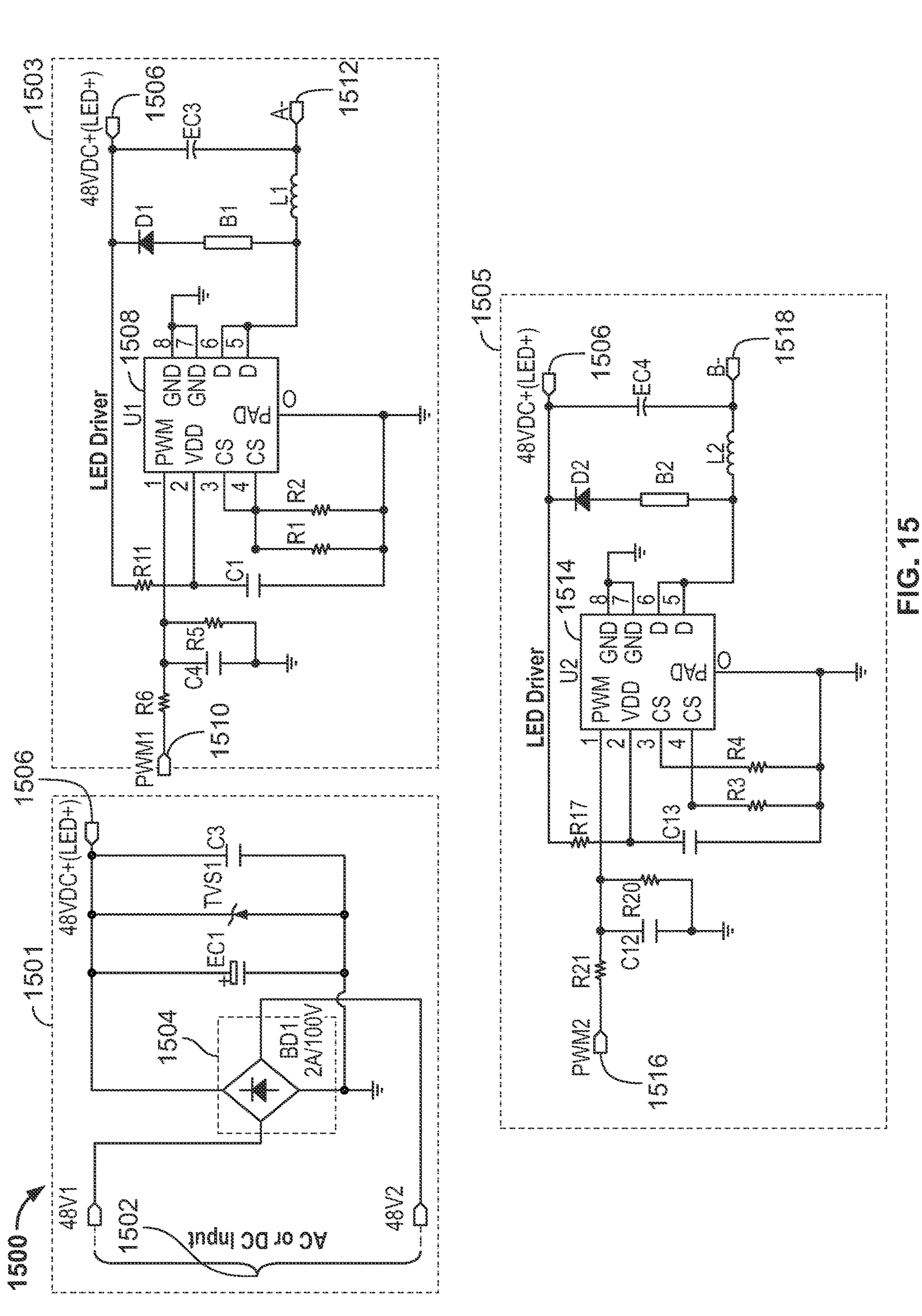
FIG. 15 shows schematically illustrative apparatus in accordance with principles of the invention.
Figure 15:
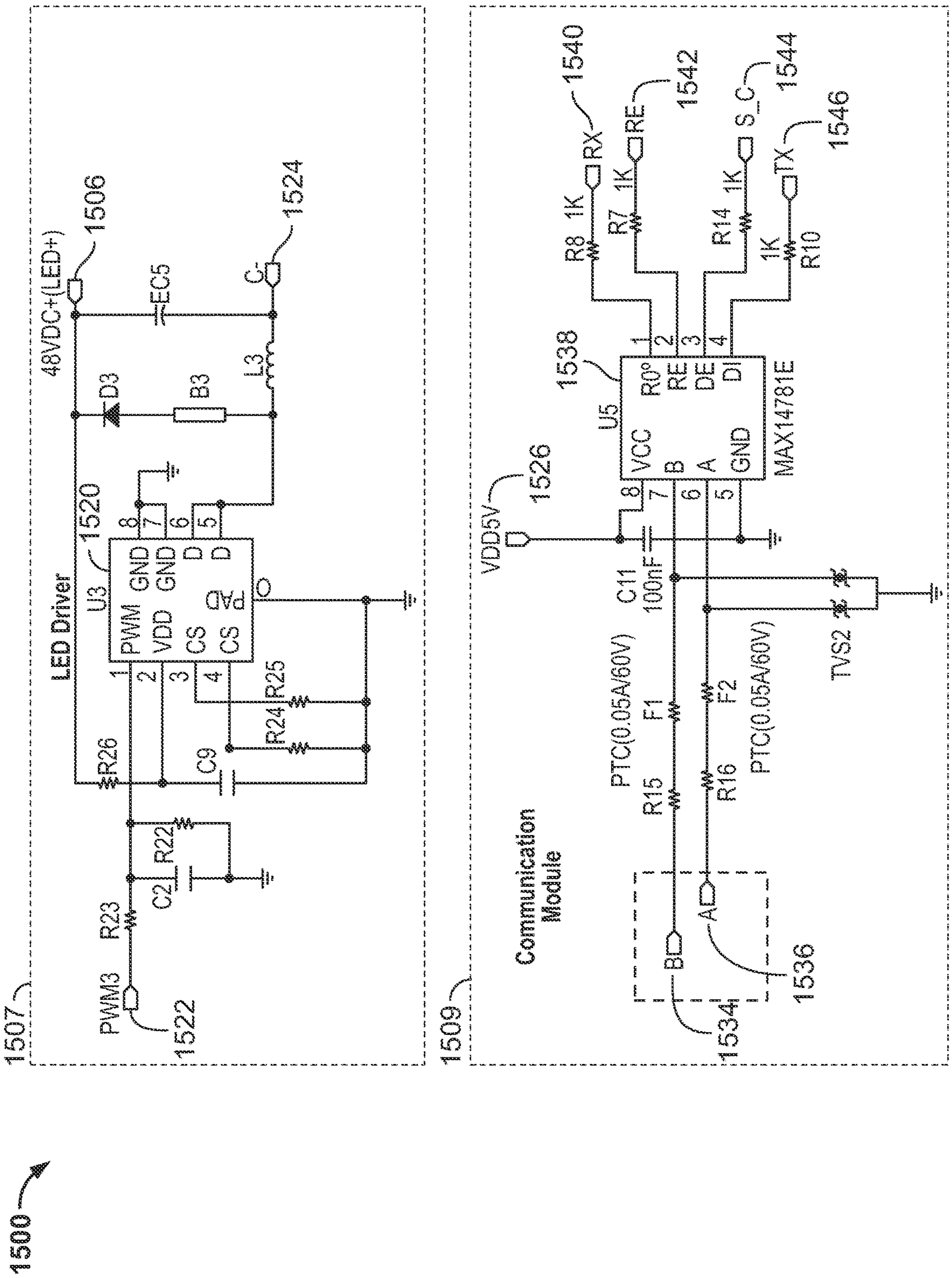
Figure 15:
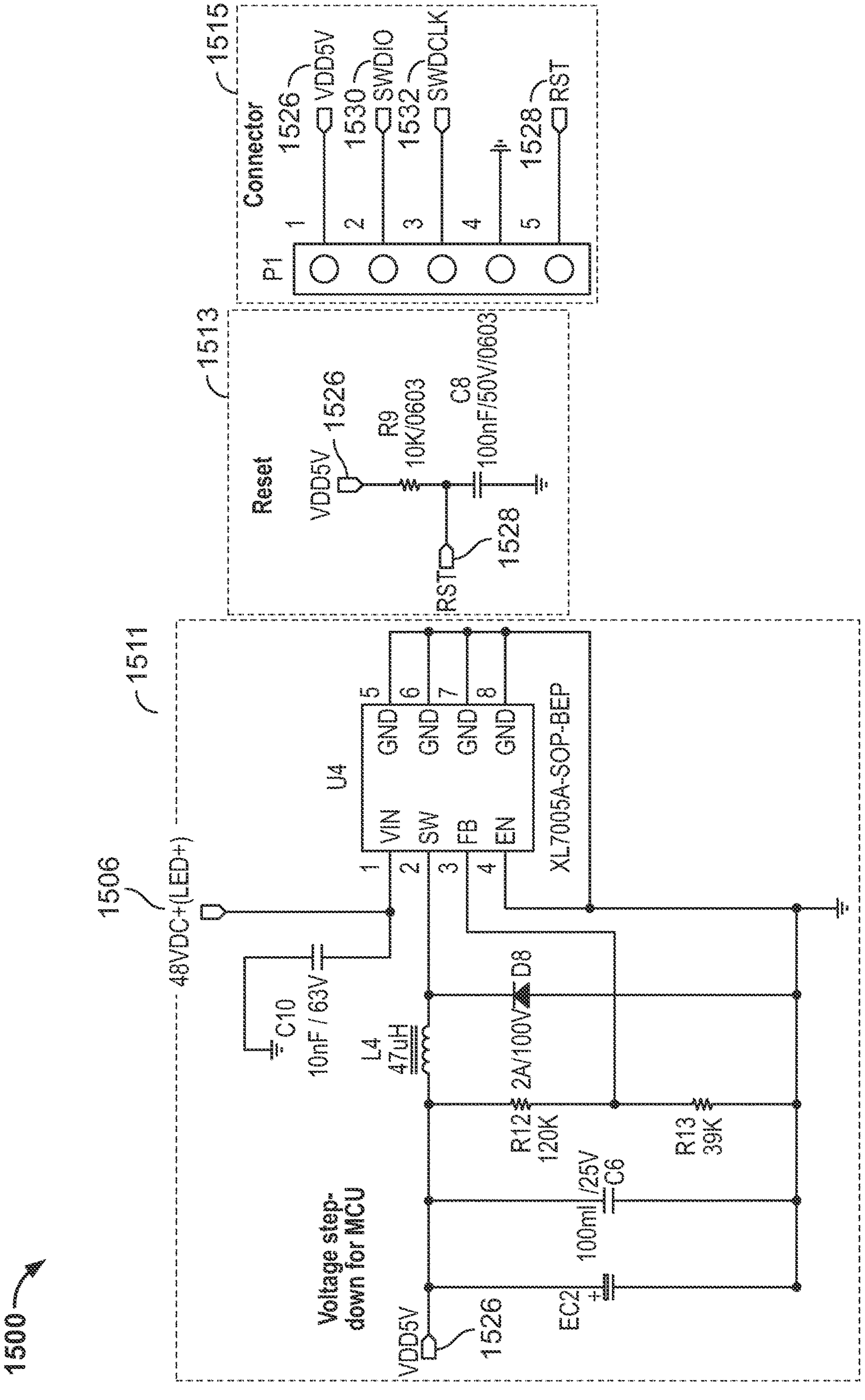
Figure 15:
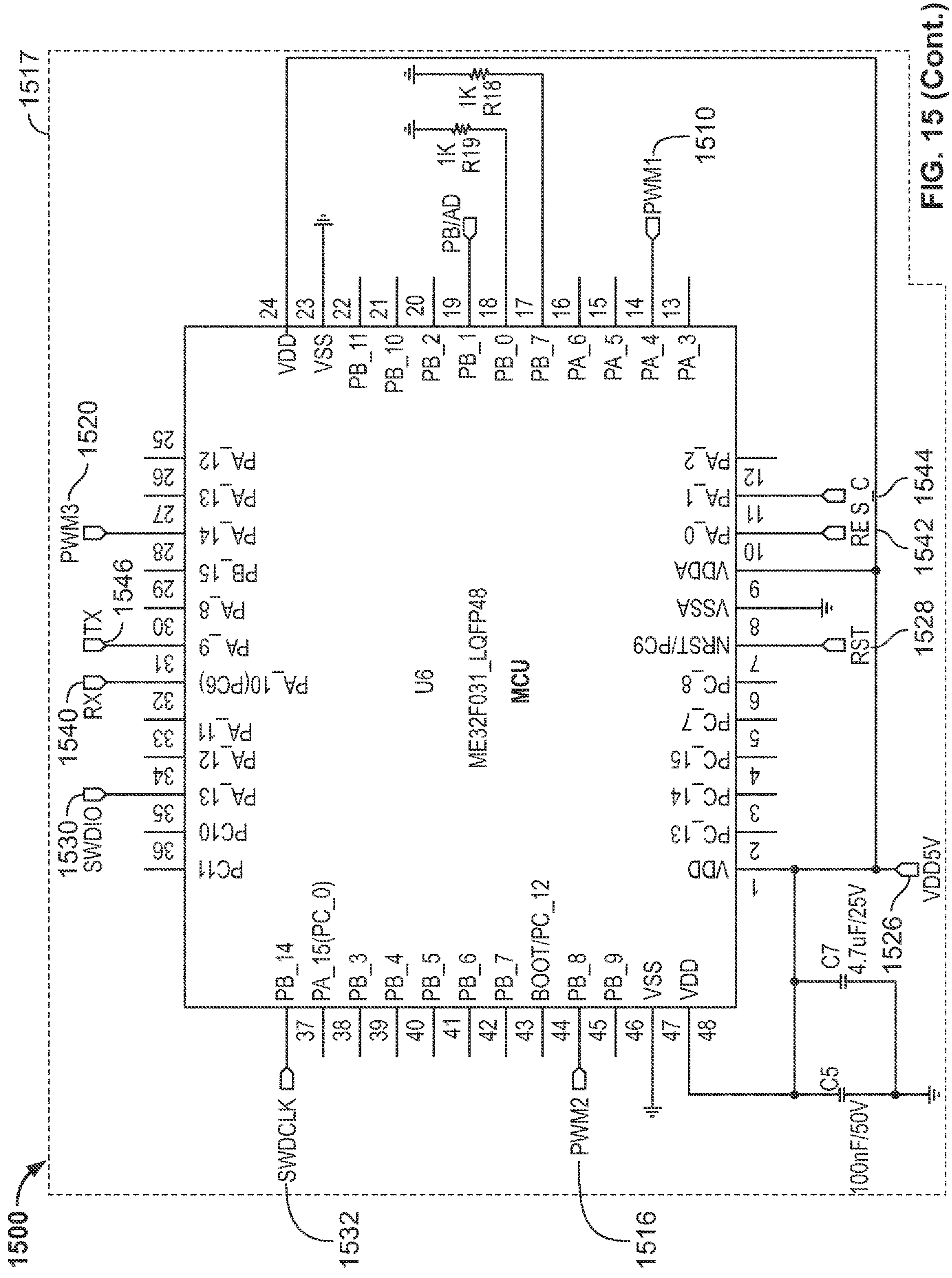

FIG. 15 shows illustrative circuit 1500. Circuit 1500 may have one or more features in common with one or more features of apparatus 100. Circuit 1500 may be included in one or more of lighting system controller 102, LED driver 104 and LED module 106. Circuit 1500 may include power input circuitry 1501. Power input circuitry 1501 may include voltage inputs 1502. Voltage inputs 1502 may include AC voltage inputs. Voltage inputs 1502 may include an input voltage of 48 VAC. Input voltages 1502 may be rectified through rectifier 1504 (BD1). Rectifier 1504 may convert input AC voltage in to output DC voltage. Power input circuitry 1501 may output voltage 1506. Voltage 1506 may be 48 VDC.

Circuit 1500 may include LED driver 1503. LED driver 1503 may receive voltage 1506. LED driver 1503 may output current through terminal 1512. Terminal 1512 may connect to an LED module. The LED module may include a plurality of LEDs. The plurality of LEDs may be connected in parallel. The plurality of LEDs may be connected in series. LED driver circuit 1503 may include integrated circuit ("IC") 1508 (U1). IC 1508 may include an internal MOSFET. The internal MOSFET may be turned on and off to control current flow from LED driver 1503 through the connected LEDs. Microcontroller 1517 may adjust the current in response to a brightness/dimming signal transmitted from the dimmer. Microcontroller 1517 may adjust the current in response to a CCT partition set-point signal transmitted from the dimmer.

LED driver 1503 may be in electronic communication with microcontroller 1517. LED driver 1503 may be in electronic communication with microcontroller 1517 through terminal 1510 (PWM1).

Circuit 1500 may include LED driver 1505. LED driver circuit 1505 may receive voltage 1506. LED driver 1505 may output current through terminal 1518. Terminal 1518 may connect to an LED module. The LED module may include a plurality of LEDs. The plurality of LEDs may be connected in parallel. The plurality of LEDs may be connected in series. LED driver 1505 may include IC 1514 (U2). IC 1514 may include an internal MOSFET. The internal MOSFET may be turned on and off to control current flow from LED driver circuit 1505 through the connected LEDs. Microcontroller 1517 may adjust the current in response to a brightness/dimming signal transmitted from the dimmer. Microcontroller 1517 may adjust the current in response to a CCT partition set-point signal transmitted from the dimmer.

LED driver 1505 may be in electronic communication with microcontroller 1517. LED driver 1505 may be in electronic communication with microcontroller 1517 through terminal 1516 (PWM2).

Circuit 1500 may include LED driver 1507. LED driver 1507 may receive voltage 1506. LED driver 1507 may output current through terminal 1524. Terminal 1524 may connect to an LED module. The LED module may include a plurality of LEDs. The plurality of LEDs may be connected in parallel. The plurality of LEDs may be connected in series. LED driver 1507 may include IC 1520 (U3). IC 1520 may include an internal MOSFET. The internal MOSFET may be turned on and off to control current flow from LED driver 1507 through the connected LEDs. Microcontroller 1517 may adjust the current in response to a brightness/dimming signal transmitted from the dimmer. Microcontroller 1517 may adjust the current in response to a CCT partition set-point signal transmitted from the dimmer.

LED driver 1507 may be in electronic communication with microcontroller 1517. LED driver 1507 may be in electronic communication with microcontroller 1517 through terminal 1522 (PWM3).

Circuit 1500 may include voltage step-down circuitry 1511. Voltage step-down circuitry 1511 may receive voltage 1506. Voltage step-down circuitry 1511 may step-down voltage 1506. Voltage step-down circuitry 1511 may output voltage 1526. Voltage 1526 may be stepped down from voltage 1506. Voltage 1506 may be 48 VDC. Voltage 1526 may be 5 VDC. Voltage 1506 may be stepped down from 48V to 5V. Voltage 1506 may be stepped down to produce a suitable input voltage for microcontroller 1517.

Circuit 1500 may include reset circuitry 1513. Reset circuitry 1513 may receive voltage 1526. Reset circuitry 1513 may be in communication with microcontroller 1517. Reset circuitry 1513 may be in communication with microcontroller 1517 through reset terminal (RST) 1528. Reset circuitry 1513 may be used to reset microcontroller 1517. Reset circuitry 1513 may stop a program/protocol running on microcontroller 1517 and may start the program/protocol from the beginning.

Circuit 1500 may include connector 1515 (P1). Connector 1515 may receive voltage 1526. Connector 1515 may include SWDIO pin 1530. SWIDO pin 1530 may be a bidirectional data pin. SWIDO pin 1530 may transfer data. Connector 1515 may include SWDCLK pin 1532. SWD- CLK pin 1532 may clock data. Connector 1515 may include reset terminal 1528. Reset terminal 1528 may connect connector 1515 with reset circuitry 1513. Connector 1515 may be connected to microcontroller 1517.

Circuit 1500 may include communication module 1509. Communication module 1509 may be a two-wire communication system. Communication module 1509 may input signal 1534 (A) and signal 1536 (B). Signal 1534 and 1536 may be picked up from a communication bus. Communication module 1509 may allow for communication of data to microcontroller 1517.

Communication module 1509 may receive voltage 1526. Communication module 1509 may include IC 1538 (U5). IC 1538 may convert signal 1534 and signal 1536 into microcontroller-readable signals. IC 1538 may receive voltage 1526, signal 1534 and signal 1536. IC 1538 may transmit signals 1534 and 1536 to microcontroller 1517.

Circuit 1500 may include microcontroller 1517. Microcontroller 1517 may be powered by voltage 1526. Microcontroller 1517 may connect to reset circuitry 1513 through reset terminal (RST) 1528. Microcontroller 1517 may connect to connector 1515 through SWDIO pin 1530, and SWDCLK pin 1532, and reset terminal (RST) 1528.

Signals 1534 and 1536 may correspond to a user-selected color mode. Signals 1534 and 1536 may correspond to a user-selected light intensity. Signals 1534 and 1536 may correspond to a user-selected dim-to-warm correlation. Microcontroller 1517 may control the color of the LEDs included in the LED module. Microcontroller 1517 may control the intensity of the LEDs included in the LED module. Microcontroller 1517 may control the dim-to-warm correlation of the LEDs in the LED module. Microcontroller 1517 may receive a translation of signals 1534 and 1536. The translation may be transmitted through pins 1540 (RX), pin 1542 (RE), pin 1544 (S_C), and pin 1546 (TX). The translation may be readable by microcontroller 1517.

Microcontroller 1517 may throttle current to one or more of LED drivers 1503, 1505, and 1507 through pulse width modulated ("PWM") terminals 1510, 1516, and 1522. The current may be throttled based on the received signal. Microcontroller 1517 may prevent current transmission to one or more LED modules. Microcontroller 1517 may limit current transmission to one or more LED modules. Microcontroller 1517 may increase current transmission to one or more LED modules. Microcontroller 1517 may include dimming circuitry to dim the LED modules. Microcontroller 1517 may include digital dimming signals. Microcontroller 1517 may transmit the dimming signals through PWM terminals 1510, 1516, and 1522. Microcontroller 1517 may control the color, intensity, dim-to-warm correlation of the light emitted by controlling the amount of current that is transmitted to each LED module.

Figure 16:
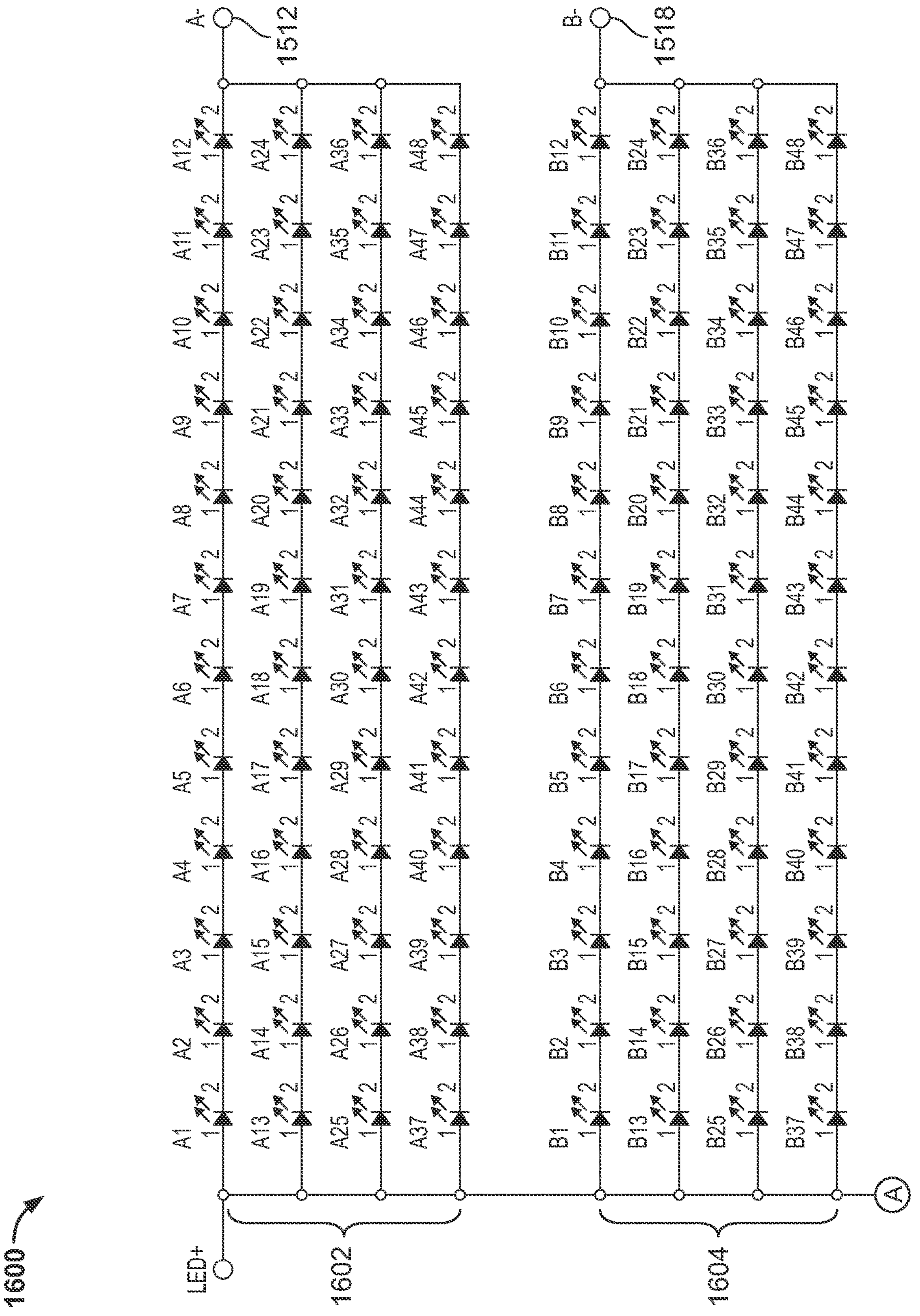
FIG. 16 shows schematically illustrative apparatus in accordance with principles of the invention.
Figure 16:
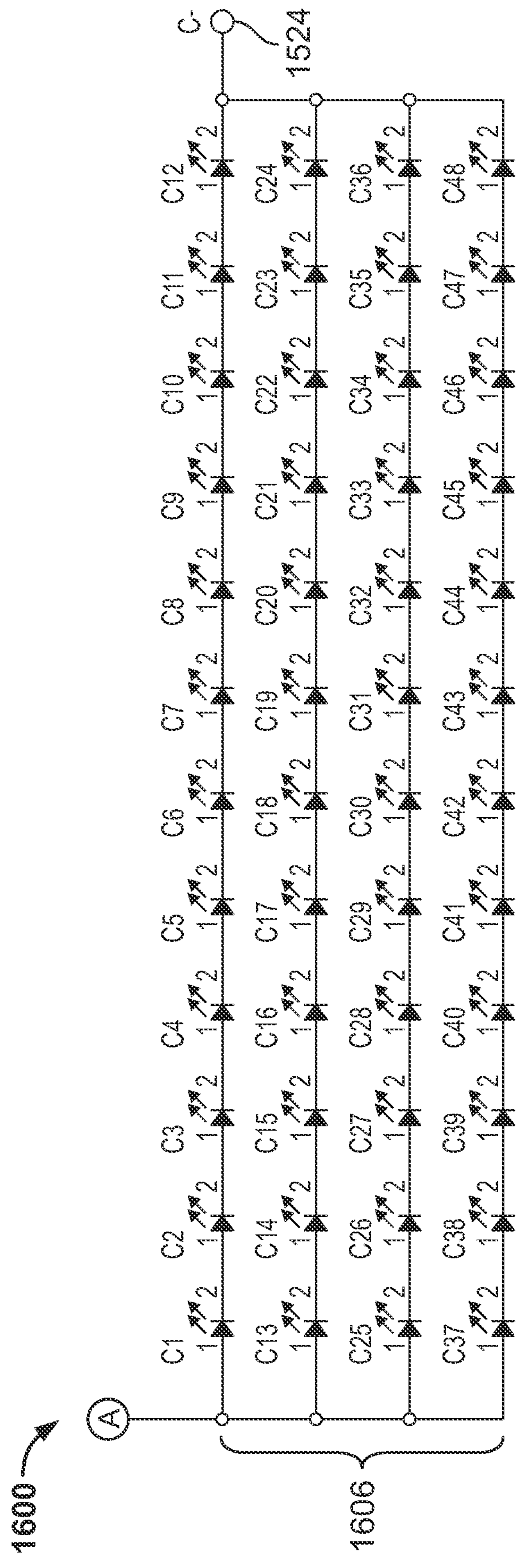

FIG. 16 shows illustrative LED module 1600. LED module 1600 may be in communication with one or more elements of circuit 1500. LED module 1600 may be used for direct lighting. LED module 1600 may include an array of LED light sources. The array may include string of LEDs 1602. The array may include string of LEDs 1604. The array may include string of LEDs 1606. Each string of LEDs 1602, 1604 and 1606 may include a plurality of LEDs. The plurality of LEDs may be connected in series. The plurality of LEDs may be connected in parallel. The plurality of LEDs may be connected in a combination of series and parallel connections.

String of LEDs 1602 may include LEDs A1 through LEDs A48. String of LEDs 1602 may be connected to LED driver 1503. String of LEDs 1602 may be connected to LED driver 1503 through terminal 1512. String of LEDs 1602 may receive regulated current from LED driver 1503 through terminal 1512.

String of LEDs 1604 may include LEDs B1 through LEDs B48. String of LEDs 1604 may be connected to LED driver 1505. String of LEDs 1604 may be connected to LED driver 1505 through terminal 1518. String of LEDs 1604 may receive regulated current from LED driver 1505 terminal 1518.

String of LEDs 1606 may include LEDs C1 through LEDs C48. String of LEDs 1606 may be connected to LED driver 1507. String of LEDs 1606 may be connected to LED driver 1507 through terminal 1524. String of LEDs 1606 may receive regulated current from LED driver 1507 from terminal 1524.

Figure 17:
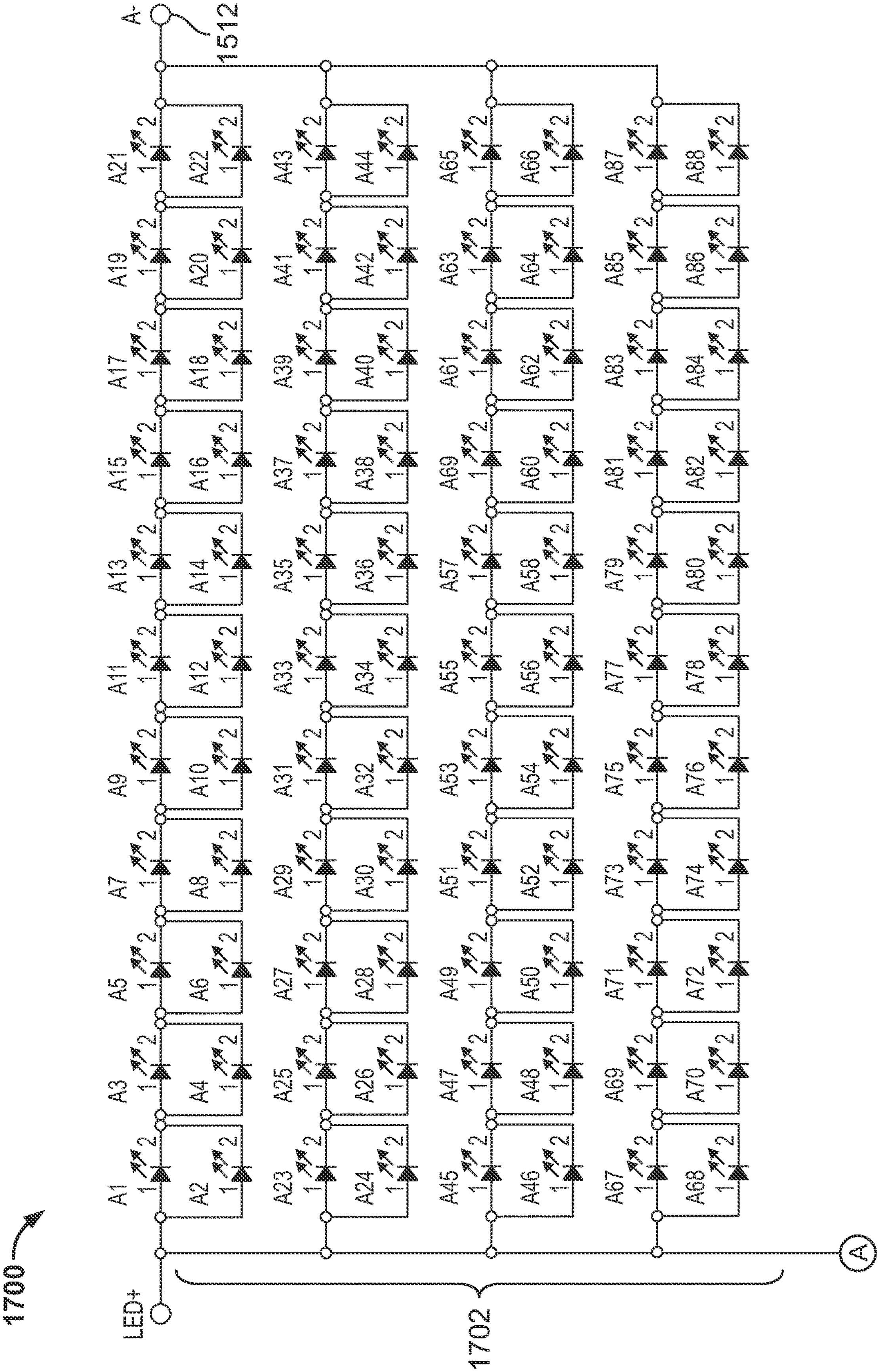
FIG. 17 shows schematically illustrative apparatus in accordance with principles of the invention.
Figure 17:
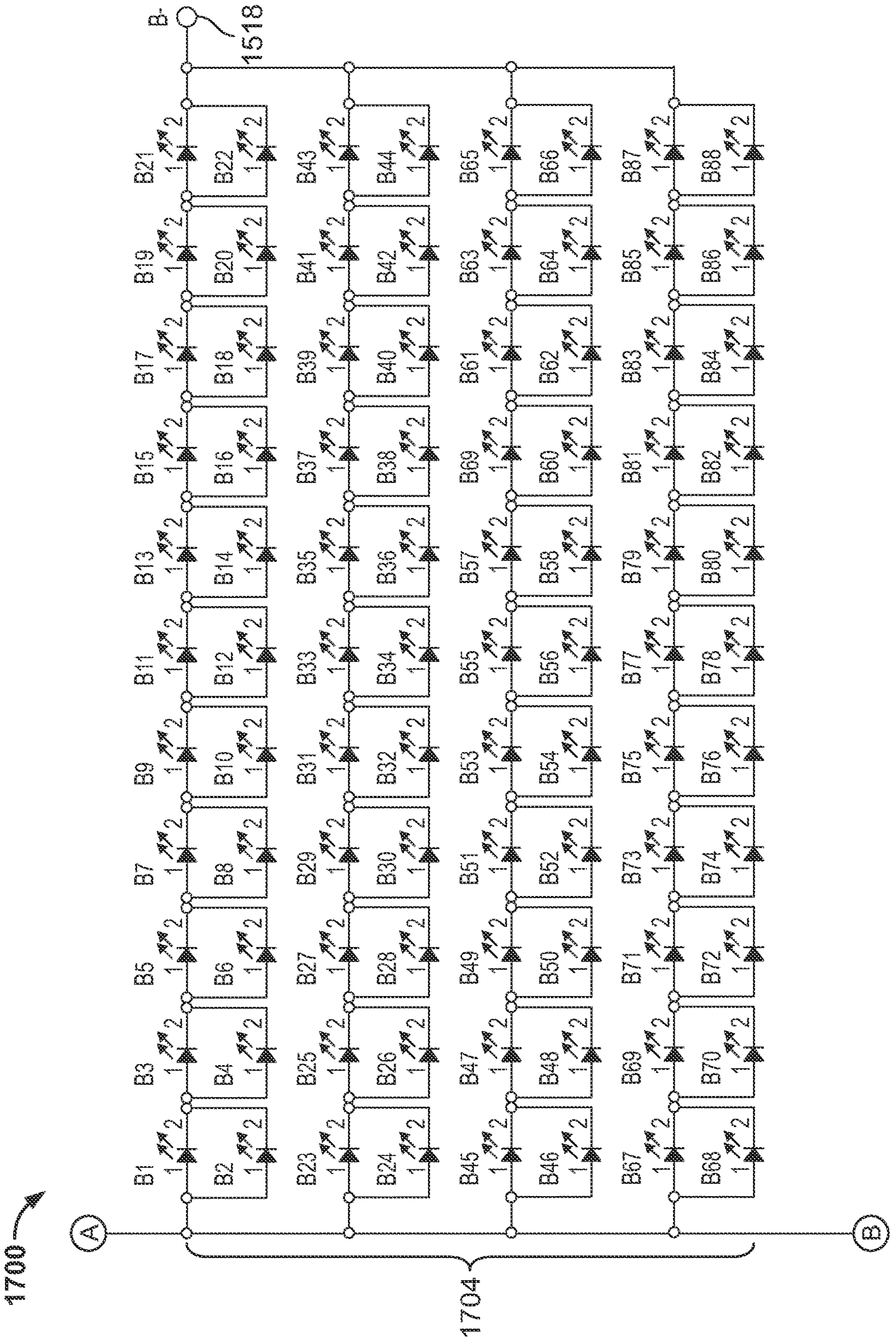
Figure 17:
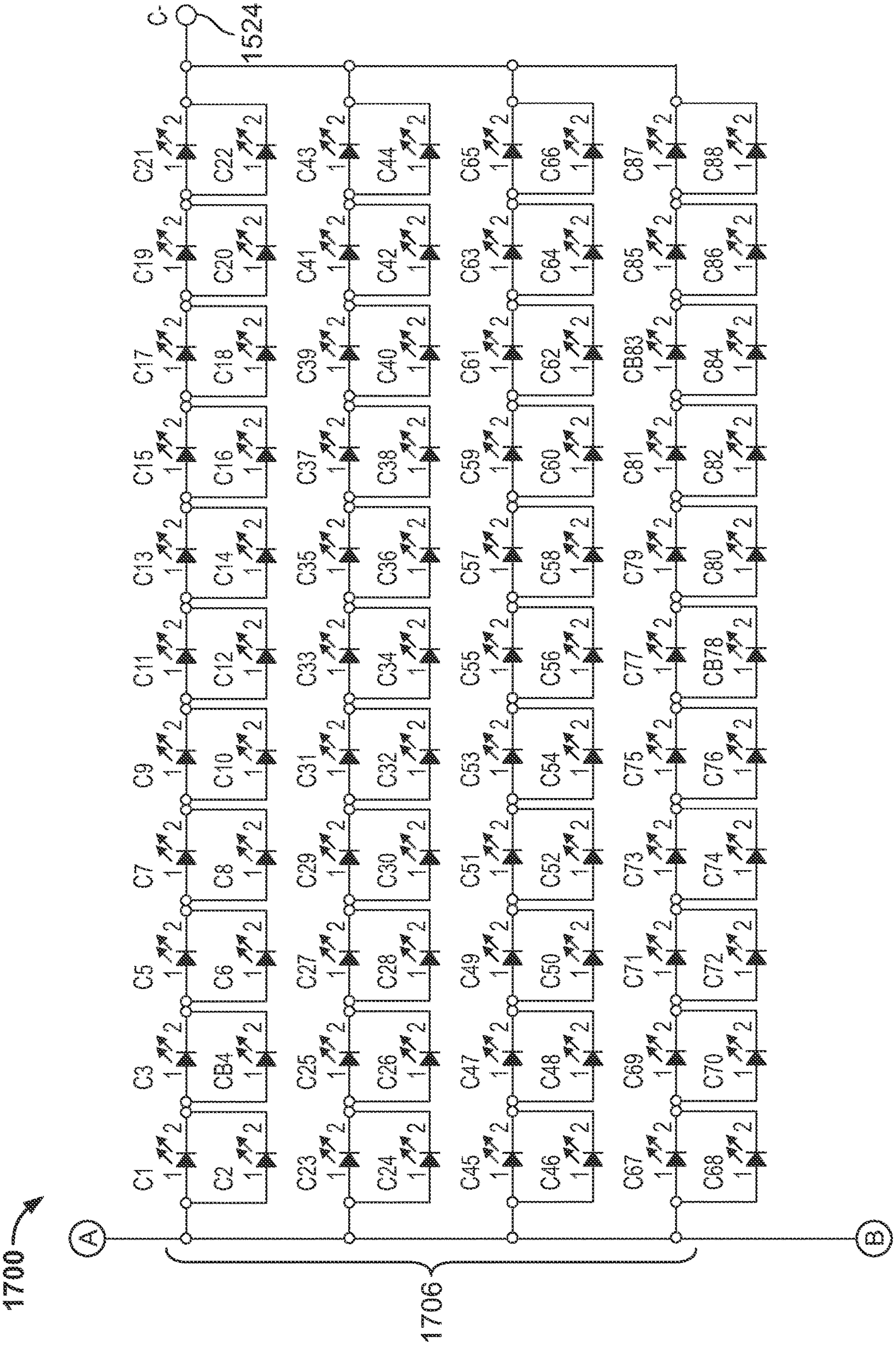

FIG. 17 shows illustrative LED module 1700. LED module 1700 may be in communication with one or more elements of circuit 1500. LED module 1700 may be used for direct lighting. LED module 1700 may include an array of LED light sources. The array may include string of LEDs 1702. The array may include string of LEDs 1704. The array may include string of LEDs 1706. Each string of LEDs 1702, 1704 and 1706 may include a plurality of LEDs. The plurality of LEDs may be connected in series. The plurality of LEDs may be connected in parallel. The plurality of LEDs may be connected in a combination of series and parallel connections.

String of LEDs 1702 may include LEDs A1 through LEDs A88. String of LEDs 1702 may be connected to LED driver 1503. String of LEDs 1702 may be connected to LED driver 1503 through terminal 1512. String of LEDs 1702 may receive regulated current from LED driver 1503 through terminal 1512.

String of LEDs 1704 may include LEDs B1 through LEDs B88. String of LEDs 1704 may be connected to LED driver 1505. String of LEDs 1704 may be connected to LED driver 1505 through terminal 1518. String of LEDs 1704 may receive regulated current from LED driver 1505 through terminal 1518.

String of LEDs 1706 may include LEDs C1 through LEDs C88. String of LEDs 1706 may be connected to LED driver 1507. String of LEDs 1706 may be connected to LED driver 1507 through terminal 1524. String of LEDs 1706 may receive regulated current from LED driver 1507 through terminal 1524.

Figure 18:
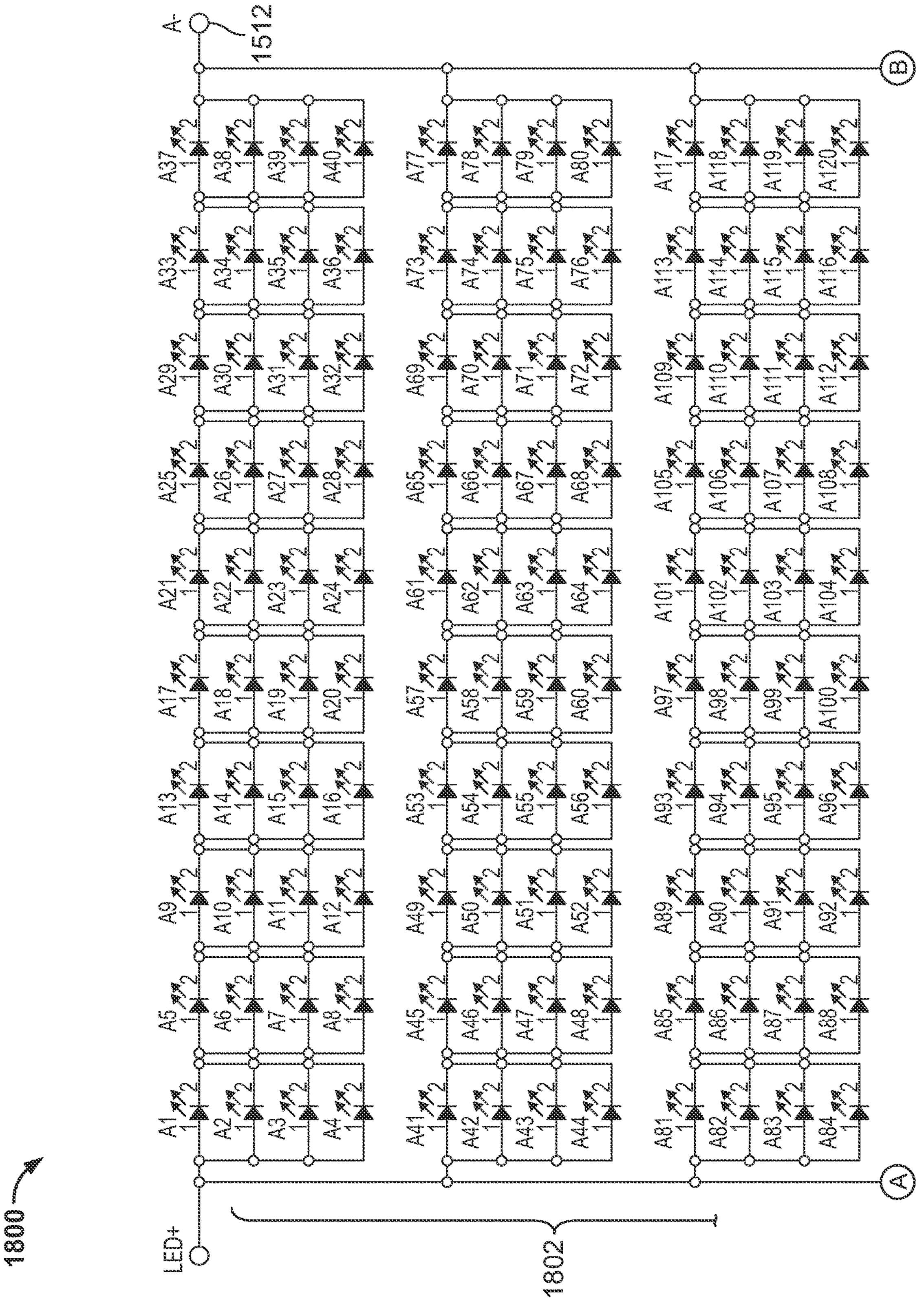
FIG. 18 shows schematically illustrative apparatus of a process in accordance with principles of the invention.
Figure 18:
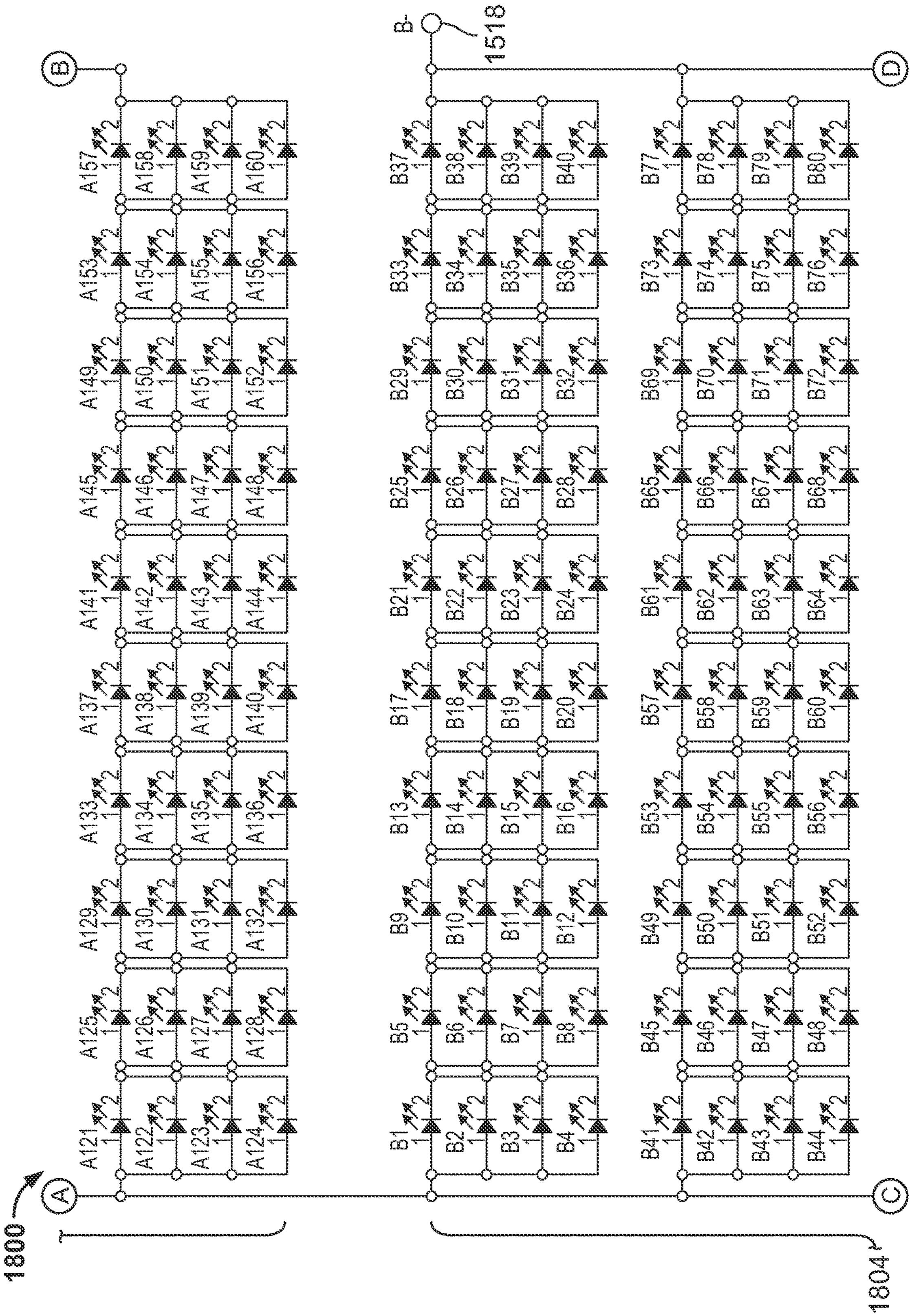
Figure 18:
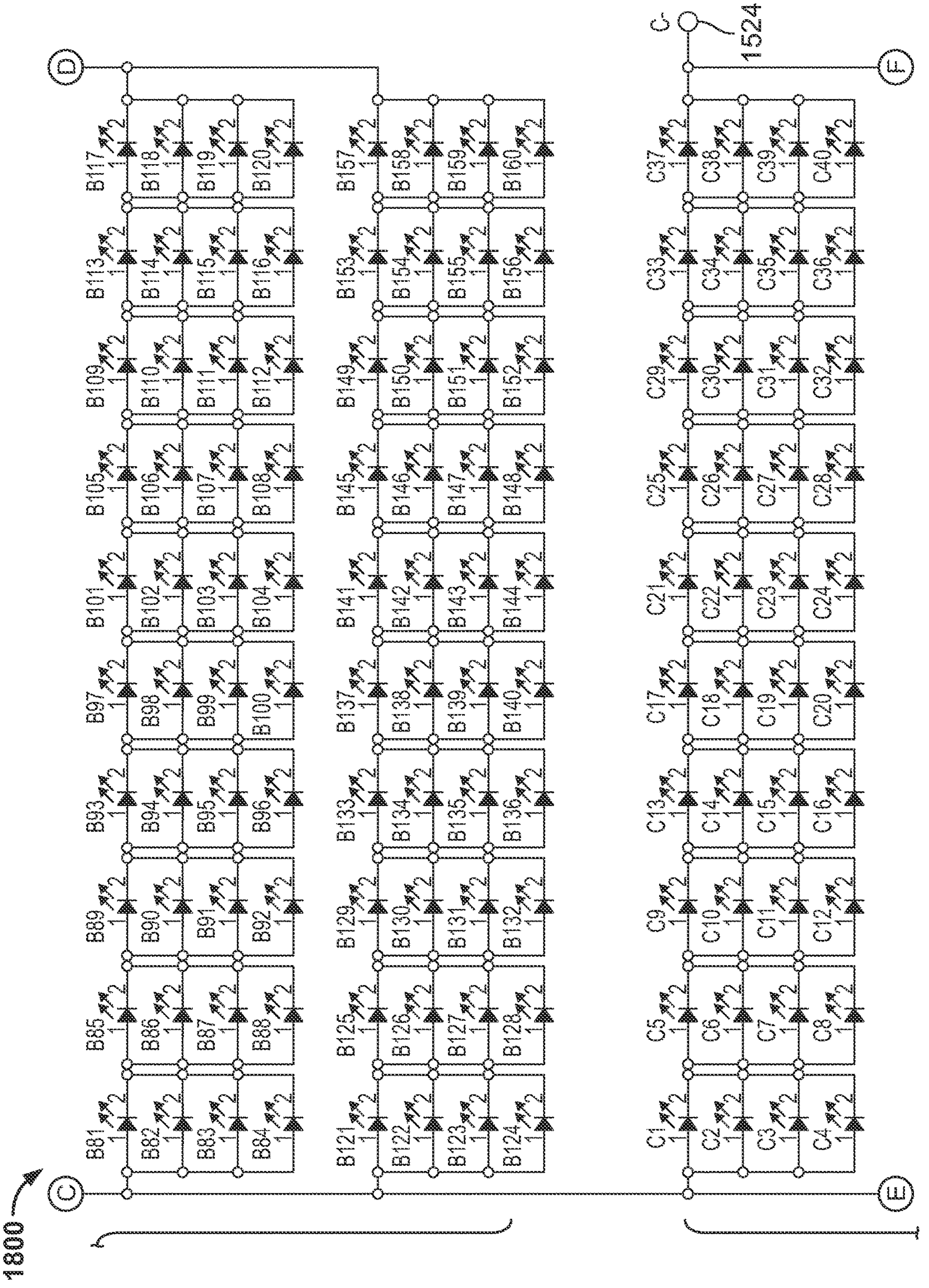
Figure 18:
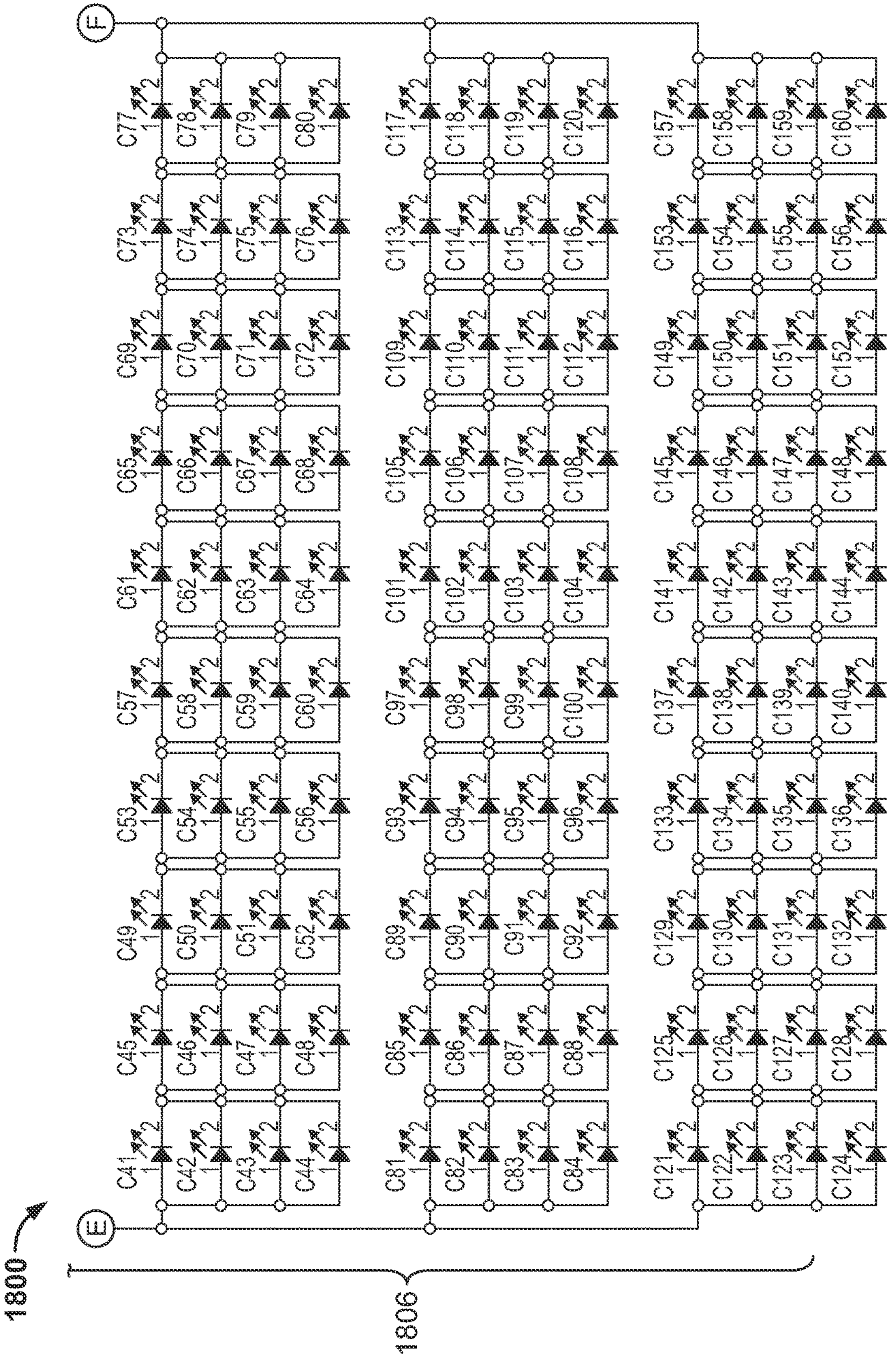

FIG. 18 shows illustrative LED module 1800. LED module 1800 may be in communication with one or more elements of circuit 1500. LED module 1800 may be used for direct lighting. LED module 1800 may include an array of LED light sources. The array may include string of LEDs 1802. The array may include string of LEDs 1804. The array may include string of LEDs 1806. Each string of LEDs 1802, 1804 and 1806 may include a plurality of LEDs. The plurality of LEDs may be connected in series. The plurality of LEDs may be connected in parallel. The plurality of LEDs may be connected in a combination of series and parallel connections.

String of LEDs 1802 may include LEDs A1 through LEDs A160. String of LEDs 1802 may be connected to LED driver 1503. String of LEDs 1802 may be connected to LED driver 1503 through terminal 1512. String of LEDs 1802 may receive regulated current from LED driver 1503 through terminal 1512.

String of LEDs 1804 may include LEDs B1 through LEDs B160. String of LEDs 1804 may be connected to LED driver 1505. String of LEDs 1804 may be connected to LED driver 1505 through terminal 1518. String of LEDs 1804 may receive regulated current from LED driver 1505 through terminal 1518.

String of LEDs 1806 may include LEDs C1 through LEDs C160. String of LEDs 1806 may be connected to LED driver 1507. String of LEDs 1806 may be connected to LED driver 1507 through terminal 1524. String of LEDs 1806 may receive regulated current from LED driver 1507 through terminal 1524.

Figure 19:
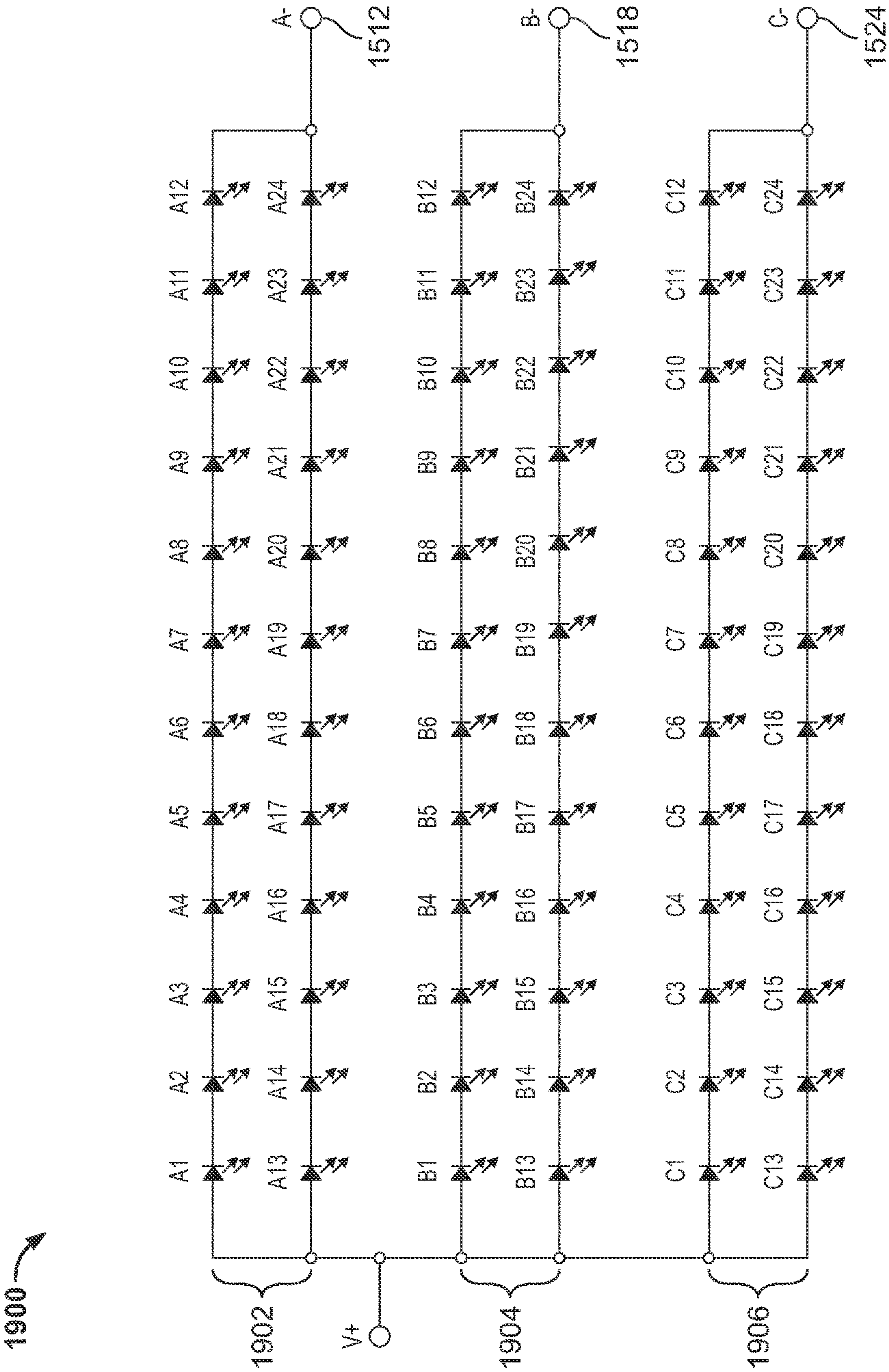
FIG. 19 shows schematically illustrative apparatus of a process in accordance with principles of the invention.

FIG. 19 shows illustrative LED module 1900. LED module 1900 may be in communication with one or more elements of circuit 1500. LED module 1900 may include an array of LED light sources. The array may include string of LEDs 1902. The array may include string of LEDs 1904. The array may include string of LEDs 1906. Each string of LEDs 1902, 1904 and 1906 may include a plurality of LEDs. The plurality of LEDs may be connected in series. The plurality of LEDs may be connected in parallel. The plurality of LEDs may be connected in a combination of series and parallel connections.

String of LEDs 1902 may include LEDs A1 through LEDs A24. The LEDs included in string of LEDs 1902 may have a CCT of 1800° K. String of LEDs 1902 may be connected to LED driver 1503. String of LEDs 1902 may be connected to LED driver 1503 through terminal 1512. String of LEDs 1902 may receive regulated current from LED driver 1503 through terminal 1512.

String of LEDs 1904 may include LEDs B1 through LEDs B24. The LEDs included in string of LEDs 1904 may have a CCT of 2700° K. String of LEDs 1904 may be connected to LED driver 1505. String of LEDs 1904 may be connected to LED driver 1505 through terminal 1518. String of LEDs 1904 may receive regulated current from LED driver 1505 through terminal 1518.

String of LEDs 1906 may include LEDs C1 through LEDs C24. The LEDs included in string of LEDs 1906 may have a CCT of 6500° K. String of LEDs 1906 may be connected to LED driver 1507. String of LEDs 1906 may be connected to LED driver 1507 through terminal 1524. String of LEDs 1906 may receive regulated current from LED driver 1507 through terminal 1524.

Figure 20:
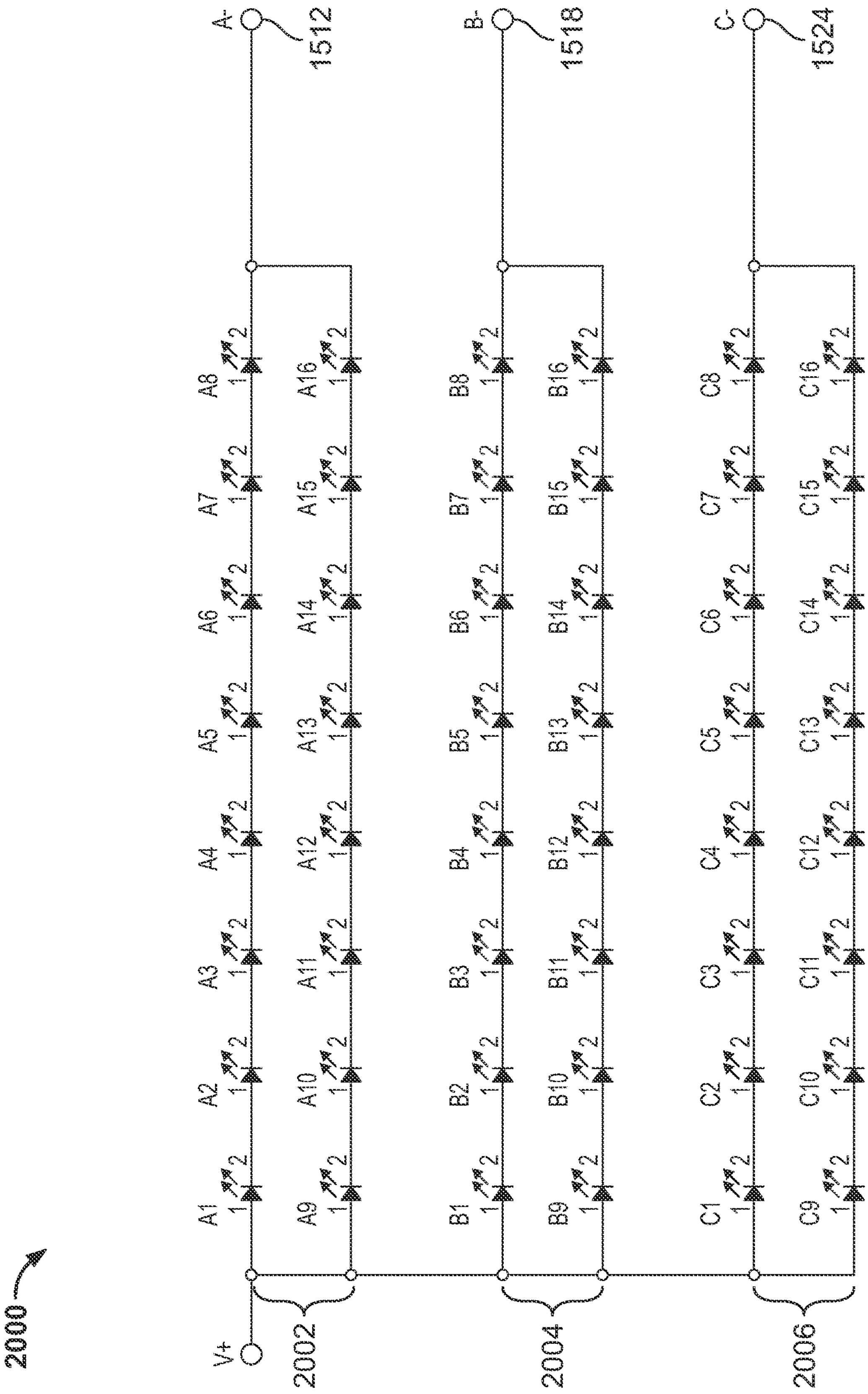
FIG. 20 shows schematically illustrative apparatus of a process in accordance with principles of the invention.

FIG. 20 shows illustrative LED module 2000. LED module 2000 may be in communication with one or more elements of circuit 1500. LED module 2000 may include an array of LED light sources. The array may include string of LEDs 2002. The array may include string of LEDs 2004. The array may include string of LEDs 2006. Each string of LEDs 2002, 2004 and 2006 may include a plurality of LEDs. The plurality of LEDs may be connected in series. The plurality of LEDs may be connected in parallel. The plurality of LEDs may be connected in a combination of series and parallel connections.

String of LEDs 2002 may include LEDs A1 through LEDs A16. The LEDs included in string of LEDs 2002 may have a CCT of 1800° K. String of LEDs 2002 may be connected to LED driver 1503. String of LEDs 2002 may be connected to LED driver 1503 through terminal 1512. String of LEDs 2002 may receive regulated current from LED driver 1503 through terminal 1512.

String of LEDs 2004 may include LEDs B1 through LEDs B16. The LEDs included in string of LEDs 2004 may have a CCT of 2700° K. The LEDs included in string of LEDs 2004 may be connected to LED driver 1505. String of LEDs 2004 may be connected to LED driver 1505 through terminal 1518. String of LEDs 2004 may receive regulated current from LED driver 1505 through terminal 1518.

String of LEDs 2006 may include LEDs C1 through LEDs C16. The LEDs included in string of LEDs 2006 may have a CCT of 6500° K. String of LEDs 2006 may be connected to LED driver 1507. String of LEDs 2006 may be connected to LED driver 1507 through terminal 1524. String of LEDs 2006 may receive regulated current from LED driver 1507 through terminal 1524.

Figure 21:
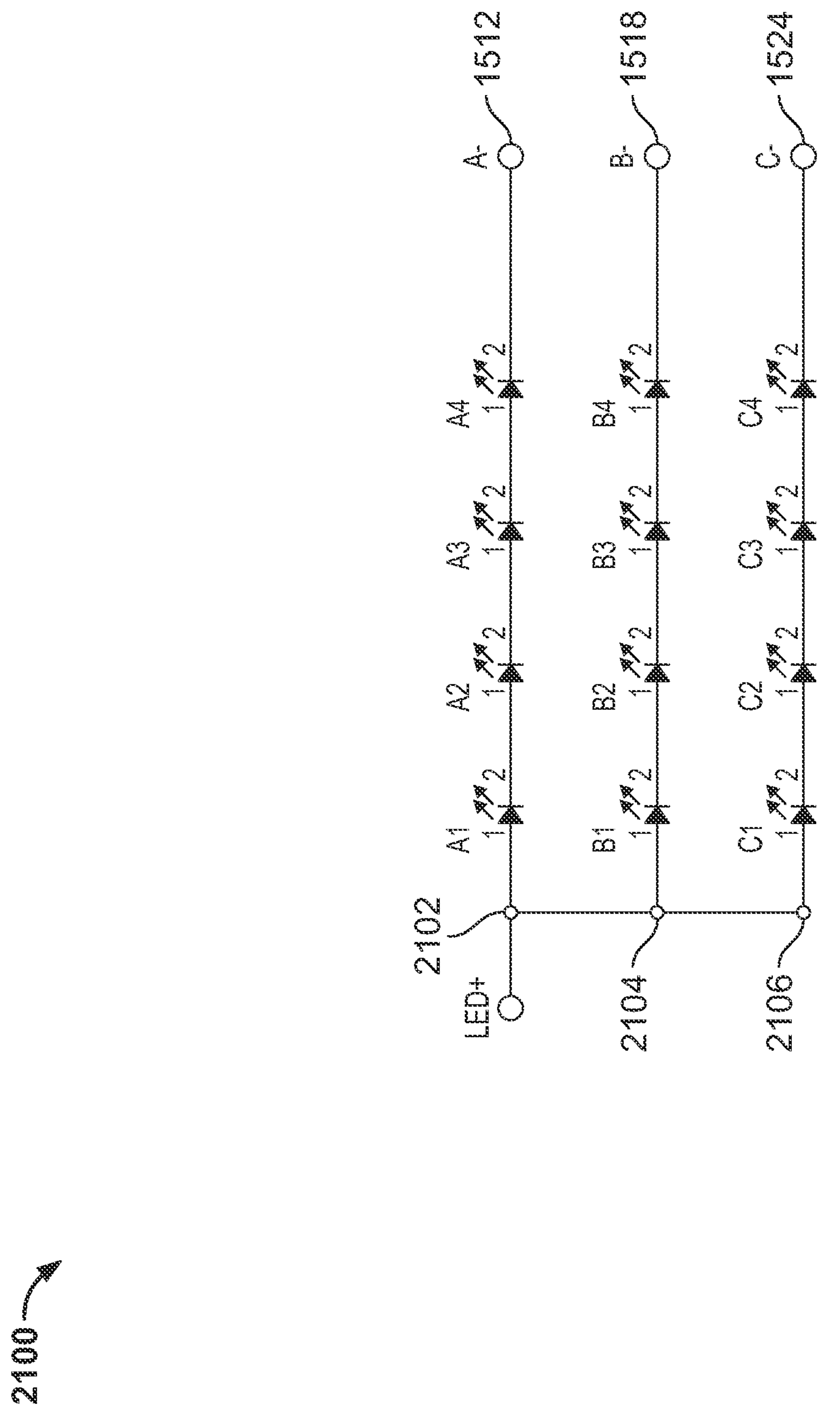
FIG. 21 shows schematically illustrative apparatus of a process in accordance with principles of the invention.

FIG. 21 shows illustrative LED module 2100. LED module 2100 may be in communication with one or more elements of circuit 1500. LED module 2100 may be used as a micro-downlight. LED module 2100 may include an array of LED light sources. The array may include string of LEDs 2102. The array may include string of LEDs 2104. The array may include string of LEDs 2106. Each string of LEDs 2102, 2104 and 2106 may include a plurality of LEDs. The plurality of LEDs may be connected in series. The plurality of LEDs may be connected in parallel. The plurality of LEDs may be connected in a combination of series and parallel connections.

String of LEDs 2102 may include LEDs A1 through LEDs A4. String of LEDs 2002 may be connected to LED driver 1503. String of LEDs 2102 may be connected to LED driver 1503 through terminal 1512. String of LEDs 2102 may receive regulated current from LED driver 1503 through terminal 1512.

String of LEDs 2104 may include LEDs B1 through LEDs B4. String of LEDs 2104 may be connected to LED driver 1505. String of LEDs 2104 may be connected to LED driver 1505 through terminal 1518. String of LEDs 2104 may receive regulated current from LED driver 1505 through terminal 1518.

String of LEDs 2106 may include LEDs C1 through LEDs C4. String of LEDs 2106 may be connected to LED driver 1507. String of LEDs 2106 may be connected to LED driver 1507 through terminal 1524. String of LEDs 2106 may receive regulated current from LED driver 1507 through terminal 1524.

Figure 22:
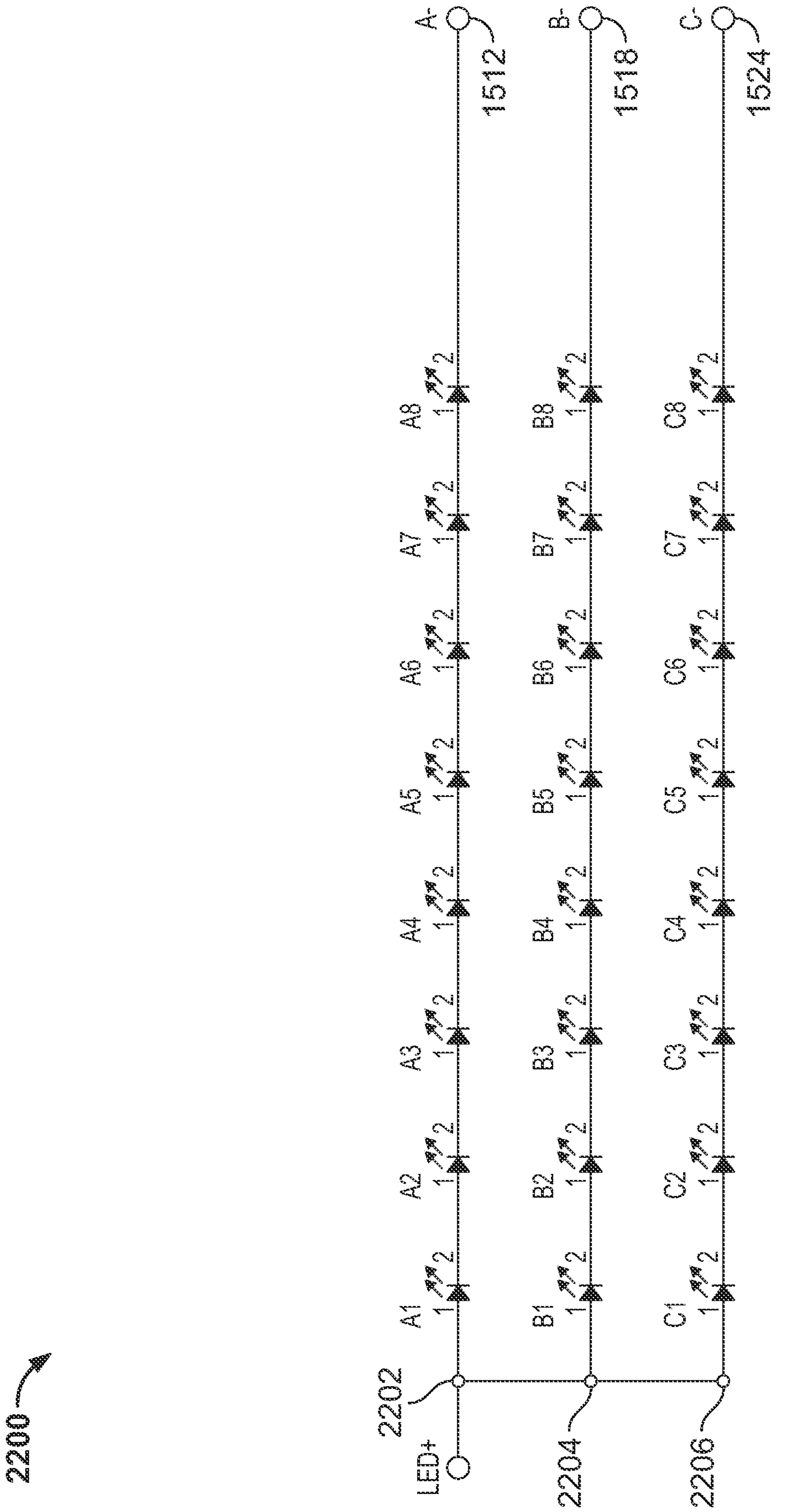
FIG. 22 shows schematically illustrative apparatus of a process in accordance with principles of the invention.

FIG. 22 shows illustrative LED module 2200. LED module 2200 may be in communication with one or more elements of circuit 1500. LED module 2200 may be used as a micro-downlight. LED module 2200 may include an array of LED light sources. The array may include string of LEDs 2202. The array may include string of LEDs 2204. The array may include string of LEDs 2206. Each string of LEDs 2202, 2204 and 2206 may include a plurality of LEDs. The plurality of LEDs may be connected in series. The plurality of LEDs may be connected in parallel. The plurality of LEDs may be connected in a combination of series and parallel connections.

String of LEDs 2202 may include LEDs A1 through LEDs A8. String of LEDs 2202 may be connected to LED driver 1503. String of LEDs 2202 may be connected to LED driver 1503 through terminal 1512. String of LEDs 2202 may receive regulated current from LED driver 1503 through terminal 1512.

String of LEDs 2204 may include LEDs B1 through LEDs B8. String of LEDs 2204 may be connected to LED driver 1505. String of LEDs 2204 may be connected to LED driver 1505 through terminal 1518. String of LEDs 2204 may receive regulated current from LED driver 1505 through terminal 1518.

String of LEDs 2206 may include LEDs C1 through LEDs C8. String of LEDs 2206 may be connected to LED driver 1507. String of LEDs 2206 may be connected to LED driver 1507 through terminal 1524. String of LEDs 2206 may receive regulated current from LED driver 1507 through terminal 1524.

Figure 23:
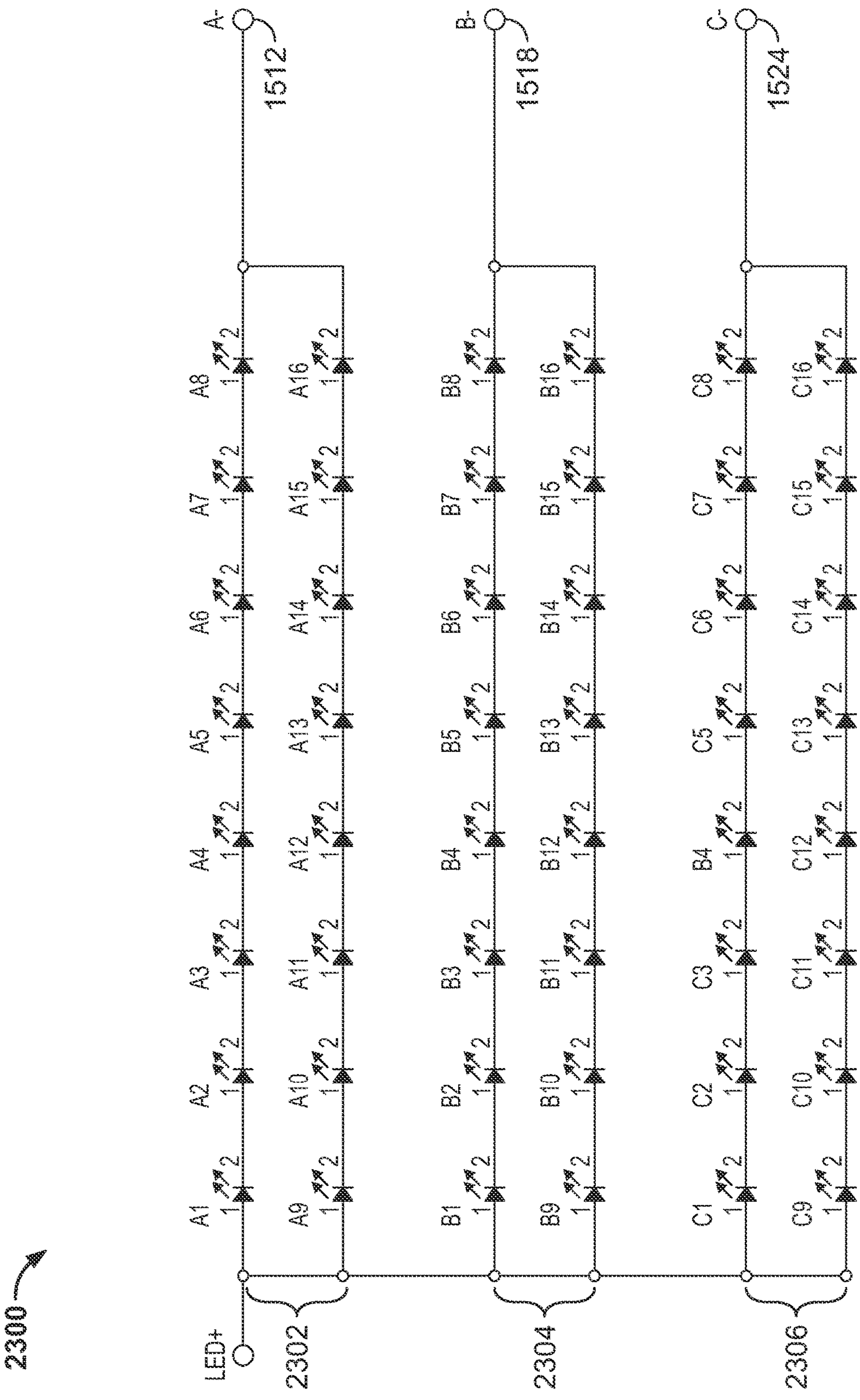
FIG. 23 shows schematically illustrative apparatus of a process in accordance with principles of the invention.

FIG. 23 shows illustrative LED module 2300. LED module 2300 may be in communication with one or more elements of circuit 1500. LED module 2300 may be used as a micro-downlight. LED module 2300 may include an array of LED light sources. The array may include string of LEDs 2302. The array may include string of LEDs 2304. The array may include string of LEDs 2306. Each string of LEDs 2302, 2304 and 2306 may include a plurality of LEDs. The plurality of LEDs may be connected in series. The plurality of LEDs may be connected in parallel. The plurality of LEDs may be connected in a combination of series and parallel connections.

String of LEDs 2302 may include LEDs A1 through LEDs A16. String of LEDs 2302 may be connected to LED driver 1503. String of LEDs 2302 may be connected to LED driver 1503 through terminal 1512. String of LEDs 2302 may receive regulated current from LED driver 1503 through terminal 1512.

String of LEDs 2304 may include LEDs B1 through LEDs B16. String of LEDs 2304 may be connected to LED driver 1505. String of LEDs 2304 may be connected to LED driver 1505 through terminal 1518. String of LEDs 2304 may receive regulated current from LED driver 1505 through terminal 1518.

String of LEDs 2306 may include LEDs C1 through LEDs C16. String of LEDs 2306 may be connected to LED driver 1507. String of LEDs 2306 may be connected to LED driver 1507 through terminal 1524. String of LEDs 2306 may receive regulated current from LED driver 1507 through terminal 1524.

Figure 24:
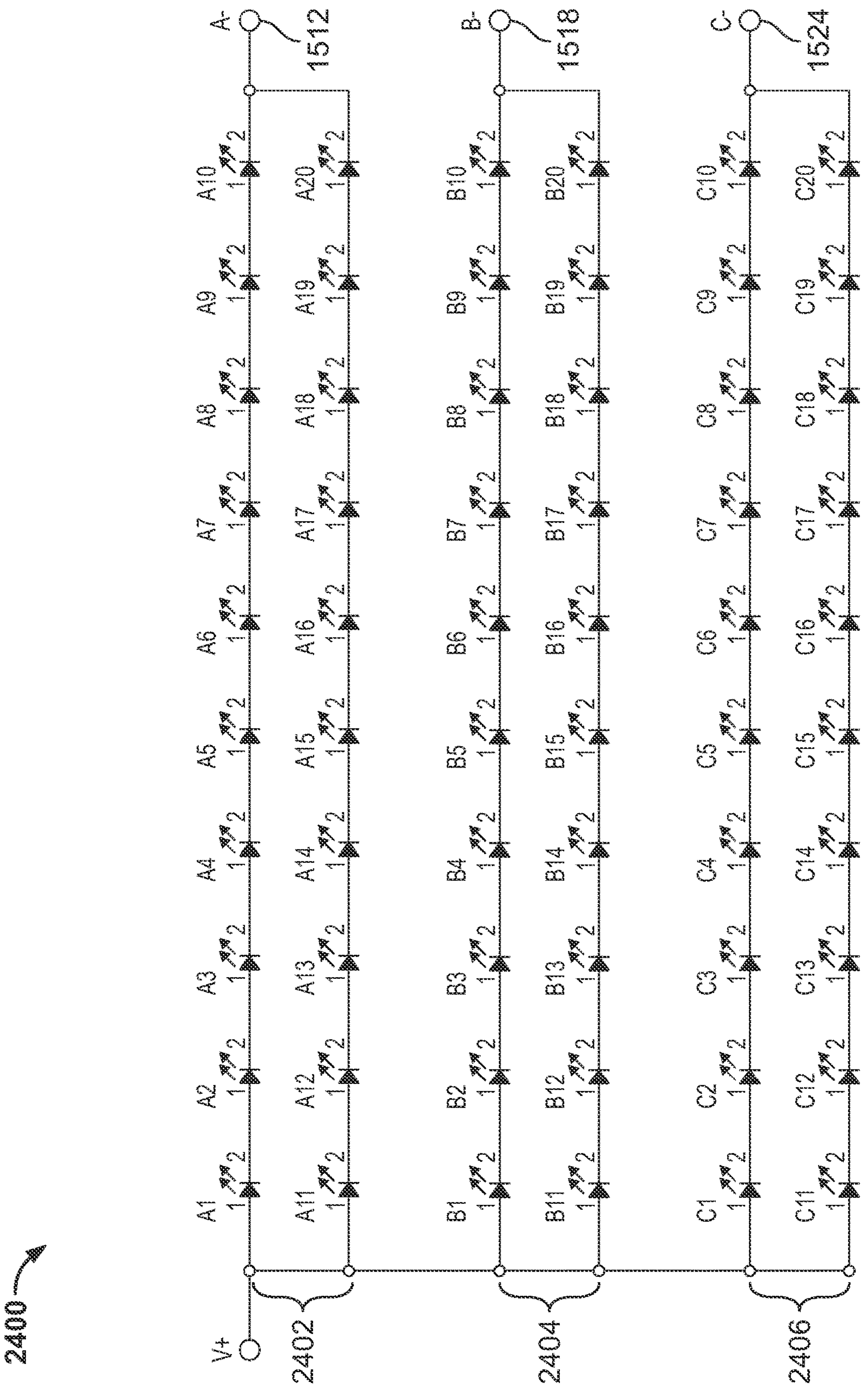
FIG. 24 shows schematically illustrative apparatus of a process in accordance with principles of the invention.

FIG. 24 shows illustrative LED module 2400. LED module 2400 may be in communication with one or more elements of circuit 1500. LED module 2400 may be used as a micro-downlight. LED module 2400 may include an array of LED light sources. The array may include string of LEDs 2402. The array may include string of LEDs 2404. The array may include string of LEDs 2406. Each string of LEDs 2402, 2404 and 2406 may include a plurality of LEDs. The plurality of LEDs may be connected in series. The plurality of LEDs may be connected in parallel. The plurality of LEDs may be connected in a combination of series and parallel connections.

String of LEDs 2402 may include LEDs A1 through LEDs A20. String of LEDs 2402 may be connected to LED driver 1503. String of LEDs 2402 may be connected to LED driver 1503 through terminal 1512. String of LEDs 2402 may receive regulated current from LED driver 1503 through terminal 1512.

String of LEDs 2404 may include LEDs B1 through LEDs B20. String of LEDs 2404 may be connected to LED driver 1505. String of LEDs 2404 may be connected to LED driver 1505 through terminal 1518. String of LEDs 2404 may receive regulated current from LED driver 1505 through terminal 1518.

String of LEDs 2406 may include LEDs C1 through LEDs C20. String of LEDs 2406 may be connected to LED driver 1507. String of LEDs 2406 may be connected to LED driver 1507 through terminal 1524. String of LEDs 2406 may receive regulated current from LED driver 1507 through terminal 1524.

Figure 25:
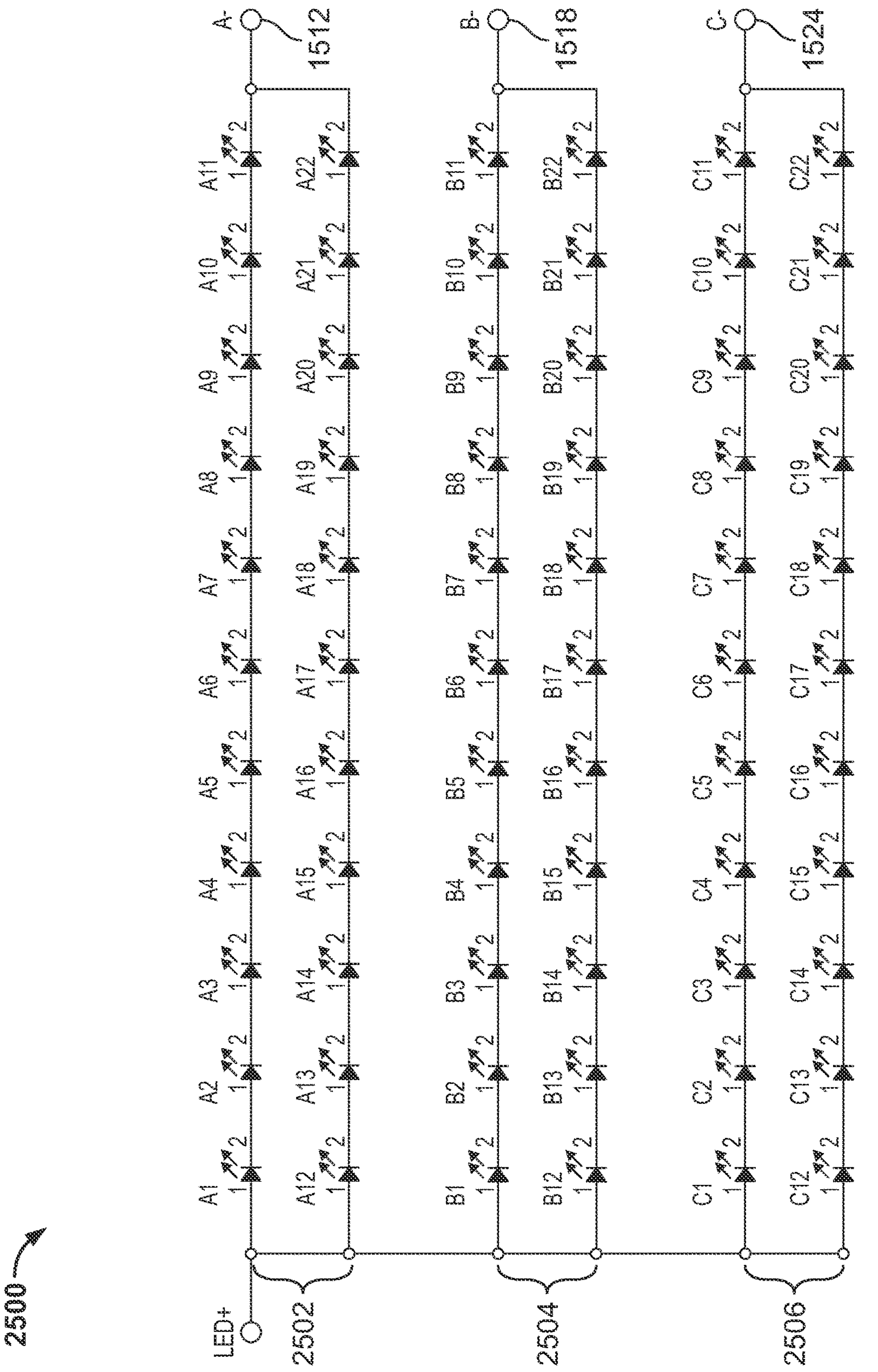
FIG. 25 shows schematically illustrative apparatus of a process in accordance with principles of the invention.

FIG. 25 shows illustrative LED module 2500. LED module 2500 may be in communication with one or more elements of circuit 1500. LED module 2500 may be used as wall-wash lighting. LED module 2500 may include an array of LED light sources. The array may include string of LEDs 2502. The array may include string of LEDs 2504. The array may include string of LEDs 2506. Each string of LEDs 2502, 2504 and 2506 may include a plurality of LEDs. The plurality of LEDs may be connected in series. The plurality of LEDs may be connected in parallel. The plurality of LEDs may be connected in a combination of series and parallel connections.

String of LEDs 2502 may include LEDs A1 through LEDs A22. String of LEDs 2502 may be connected to LED driver 1503. String of LEDs 2502 may be connected to LED driver 1503 through terminal 1512. String of LEDs 2502 may receive regulated current from LED driver 1503 through terminal 1512.

String of LEDs 2504 may include LEDs B1 through LEDs B22. String of LEDs 2504 may be connected to LED driver 1505. String of LEDs 2504 may be connected to LED driver 1505 through terminal 1518. String of LEDs 2504 may receive regulated current from LED driver 1505 through terminal 1518.

String of LEDs 2506 may include LEDs C1 through LEDs C22. String of LEDs 2506 may be connected to LED driver 1507. String of LEDs 2506 may be connected to LED driver 1507 through terminal 1524. String of LEDs 2506 may receive regulated current from LED driver 1507 through terminal 1524.

Figure 26:
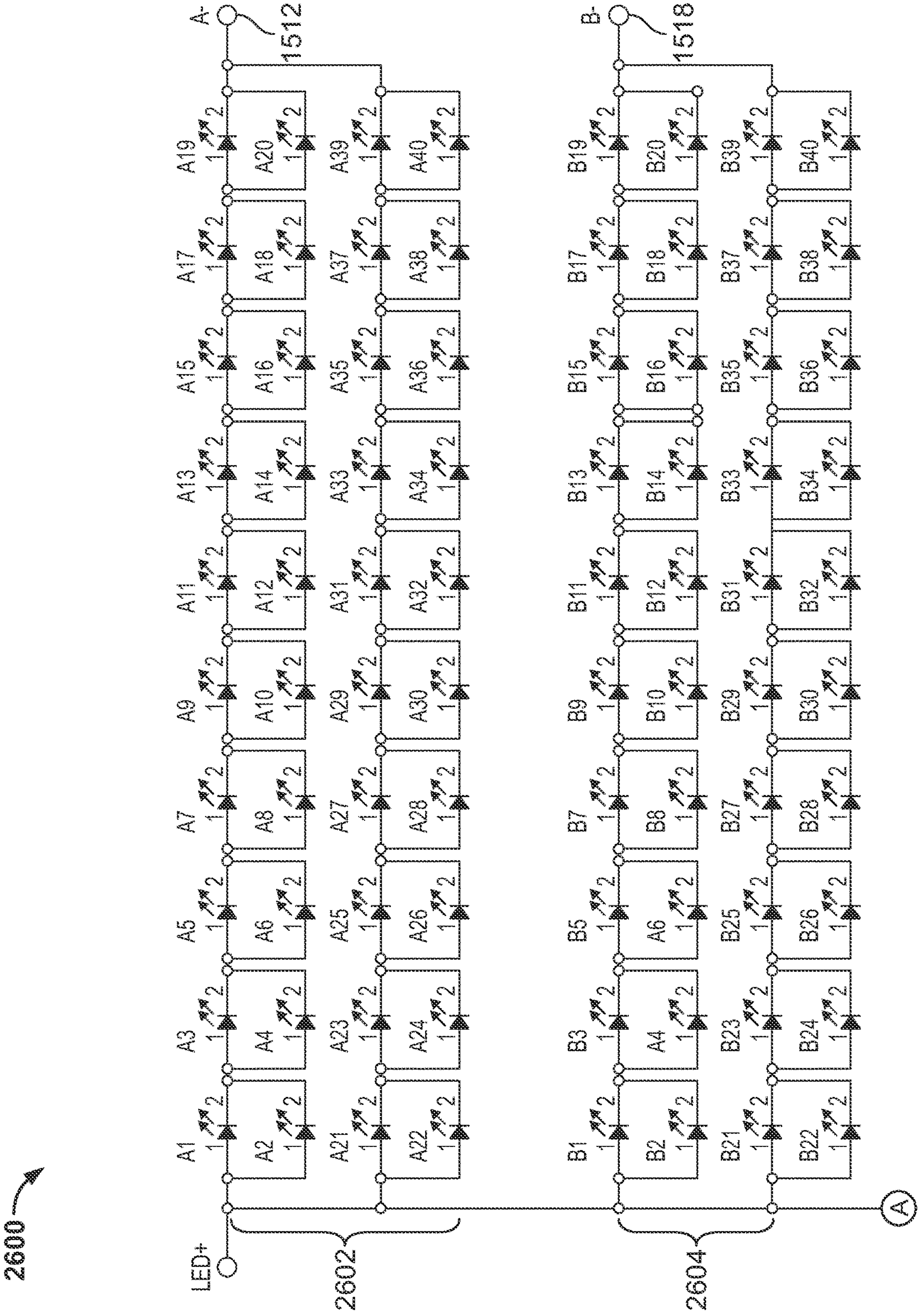
FIG. 26 shows schematically illustrative apparatus of a process in accordance with principles of the invention.
Figure 26:
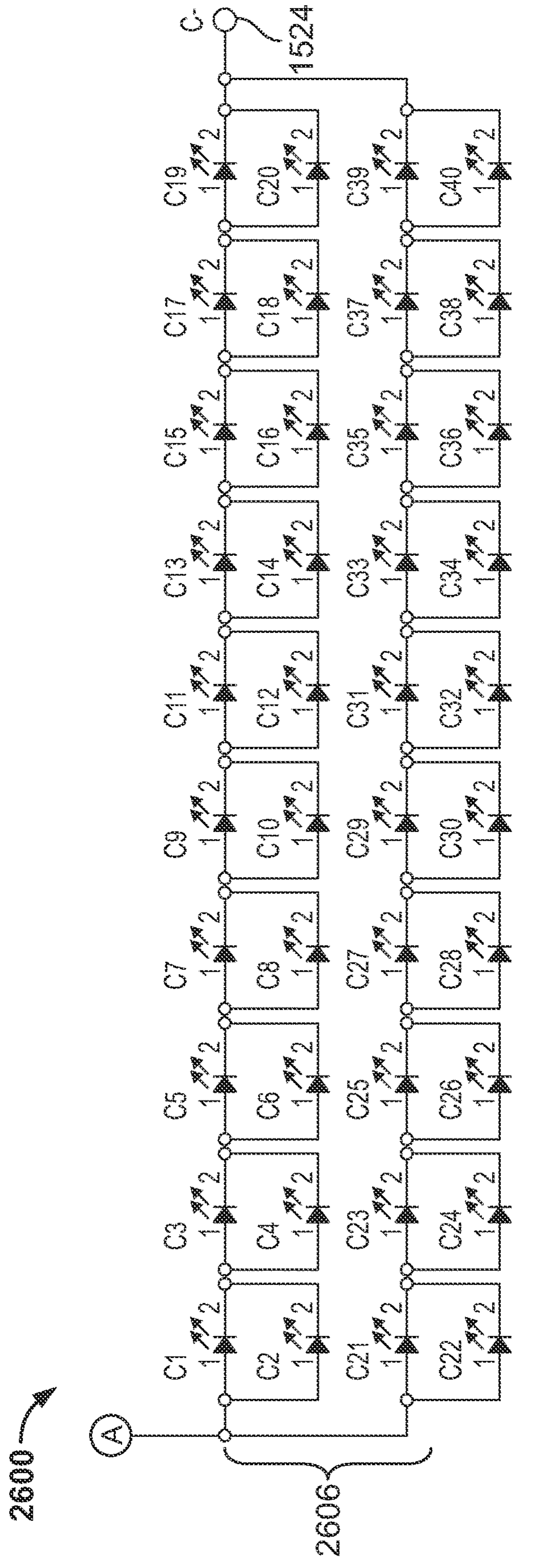

FIG. 26 shows illustrative LED module 2600. LED module 2600 may be in communication with one or more elements of circuit 1500. LED module 2600 may be used as wall-wash lighting. LED module 2600 may include an array of LED light sources. The array may include string of LEDs 2602. The array may include string of LEDs 2604. The array may include string of LEDs 2606. Each string of LEDs 2602, 2604 and 2606 may include a plurality of LEDs. The plurality of LEDs may be connected in series. The plurality of LEDs may be connected in parallel. The plurality of LEDs may be connected in a combination of series and parallel connections.

String of LEDs 2602 may include LEDs A1 through LEDs A39. String of LEDs 2602 may be connected to LED driver 1503. String of LEDs 2602 may be connected to LED driver 1503 through terminal 1512. String of LEDs 2602 may receive regulated current from LED driver 1503 through terminal 1512.

String of LEDs 2604 may include LEDs B1 through LEDs B39. String of LEDs 2604 may be connected to LED driver 1505. String of LEDs 2604 may be connected to LED driver 1505 through terminal 1518. String of LEDs 2604 may receive regulated current from LED driver 1505 through terminal 1518.

String of LEDs 2606 may include LEDs C1 through LEDs C39. String of LEDs 2606 may be connected to LED driver 1507. String of LEDs 2606 may be connected to LED driver 1507 through terminal 1524. String of LEDs 2606 may receive regulated current from LED driver 1507 through terminal 1524.

Figure 27:
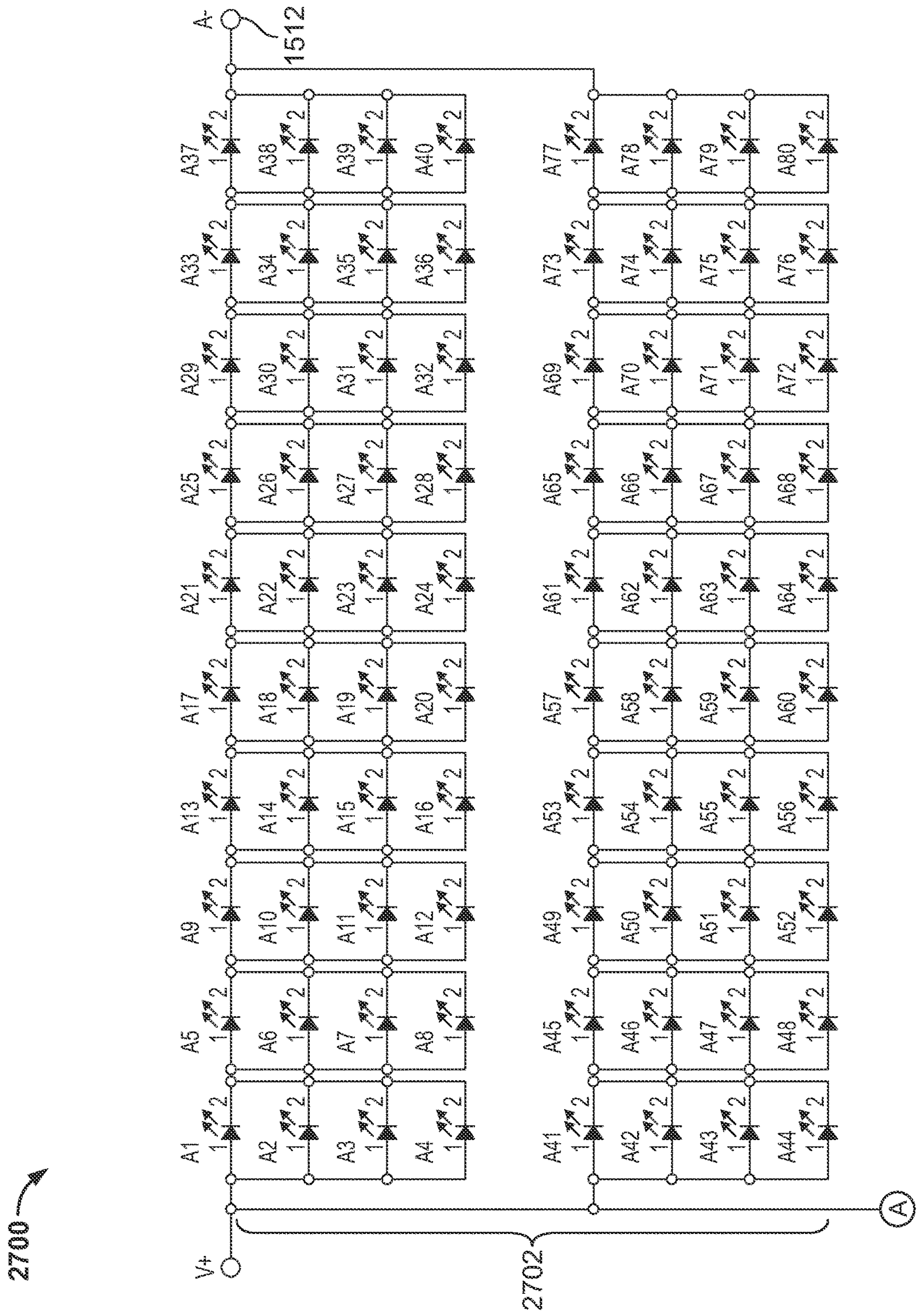
FIG. 27 shows schematically illustrative apparatus of a process in accordance with principles of the invention.
Figure 27:
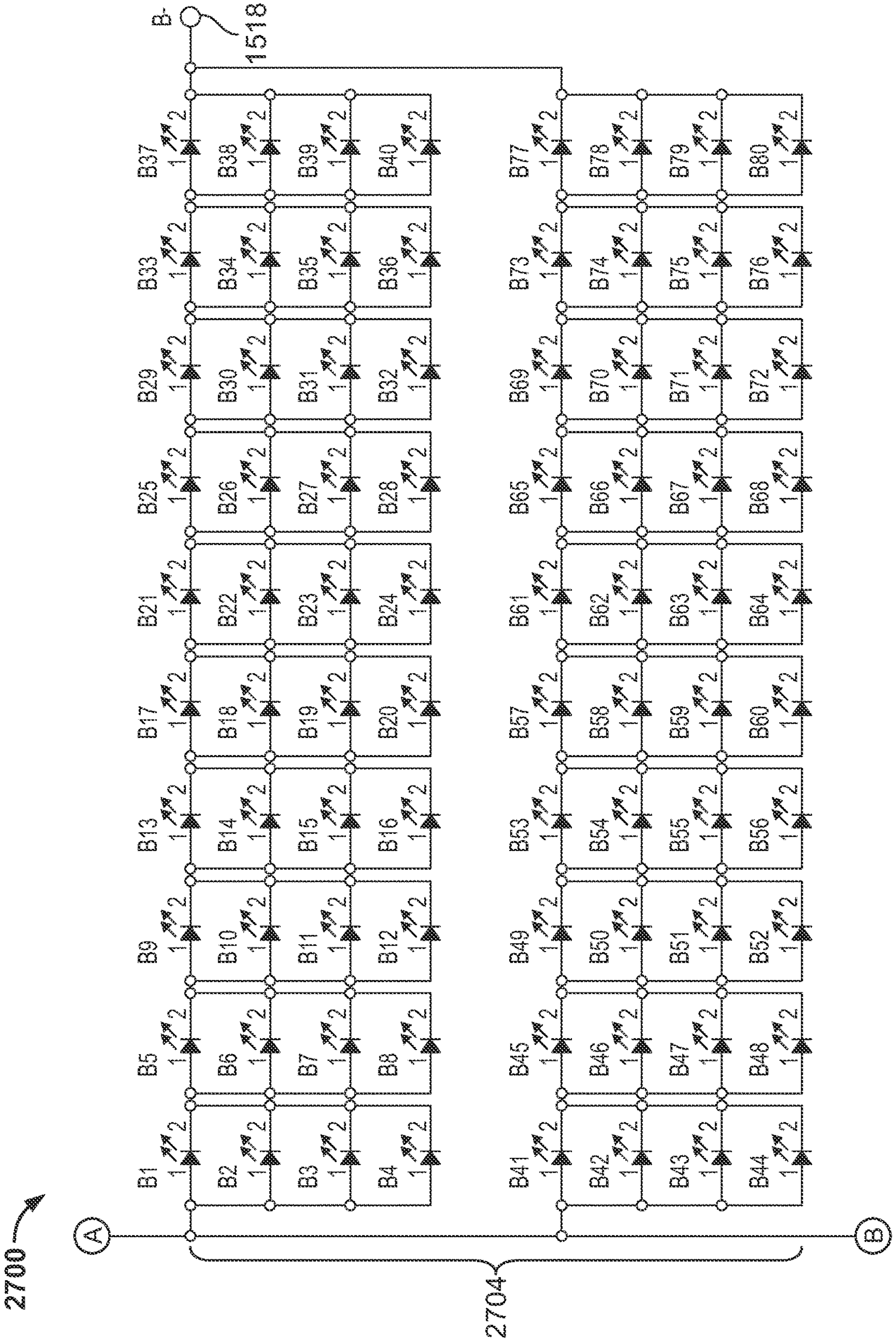
Figure 27:
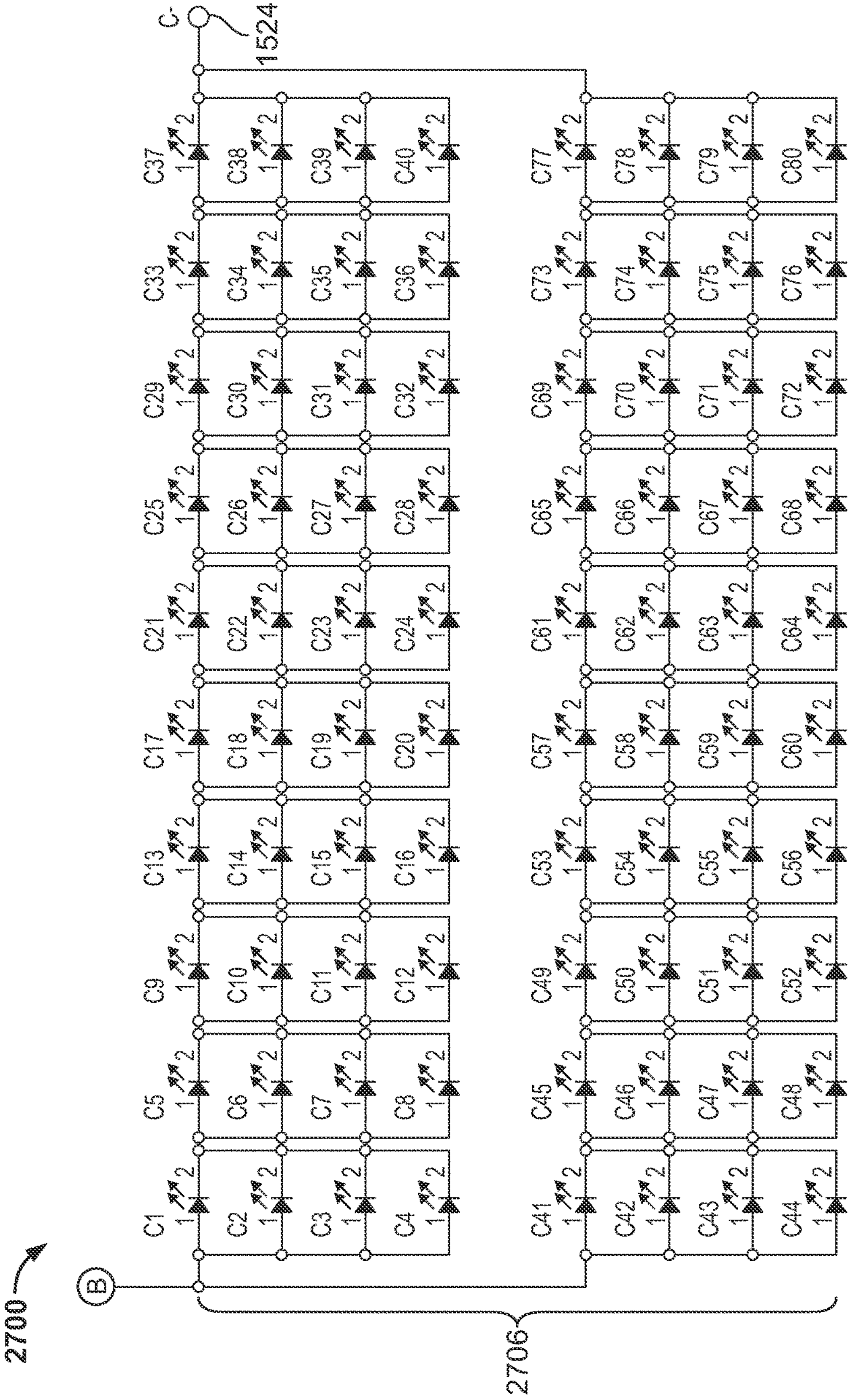

FIG. 27 shows illustrative LED module 2700. LED module 2700 may be in communication with one or more elements of circuit 1500. LED module 2700 may be used as wall-wash lighting. LED module 2700 may include an array of LED light sources. The array may include string of LEDs 2702. The array may include string of LEDs 2704. The array may include string of LEDs 2706. Each string of LEDs 2702, 2704 and 2706 may include a plurality of LEDs. The plurality of LEDs may be connected in series. The plurality of LEDs may be connected in parallel. The plurality of LEDs may be connected in a combination of series and parallel connections.

String of LEDs 2702 may include LEDs A1 through LEDs A80. String of LEDs 2702 may be connected to LED driver 1503. String of LEDs 2702 may be connected to LED driver 1503 through terminal 1512. String of LEDs 2702 may receive regulated current from LED driver 1503 through terminal 1512.

String of LEDs 2704 may include LEDs B1 through LEDs B80. String of LEDs 2704 may be connected to LED driver 1505. String of LEDs 2704 may be connected to LED driver 1505 through terminal 1518. String of LEDs 2704 may receive regulated current from LED driver 1505 through terminal 1518.

String of LEDs 2706 may include LEDs C1 through LEDs C80. String of LEDs 2706 may be connected to LED driver 1507. String of LEDs 2706 may be connected to LED driver 1507 through terminal 1524. String of LEDs 2706 may receive regulated current from LED driver 1507 through terminal 1524.

Figure 28:
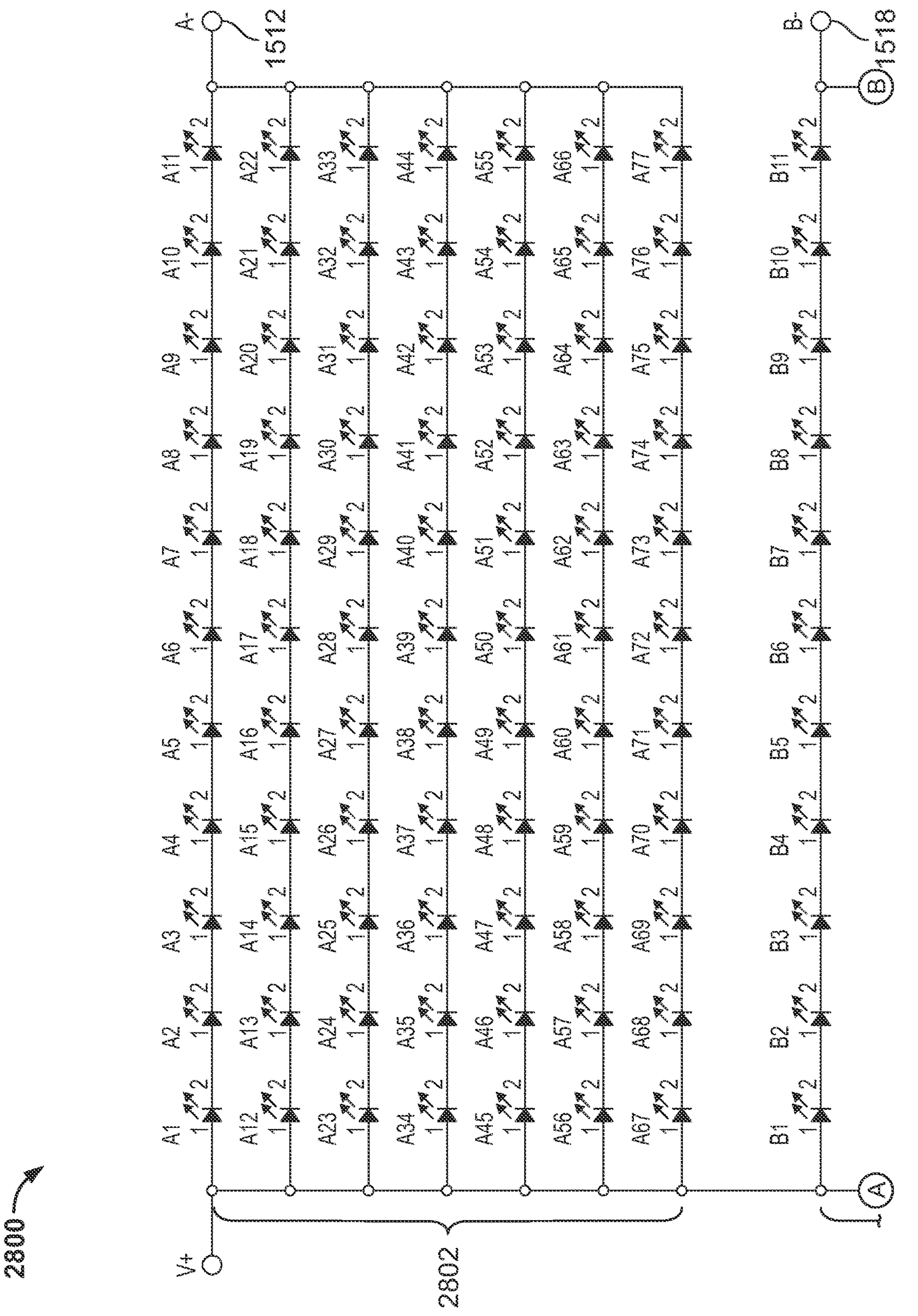
FIG. 28 shows schematically illustrative apparatus of a process in accordance with principles of the invention.
Figure 28:
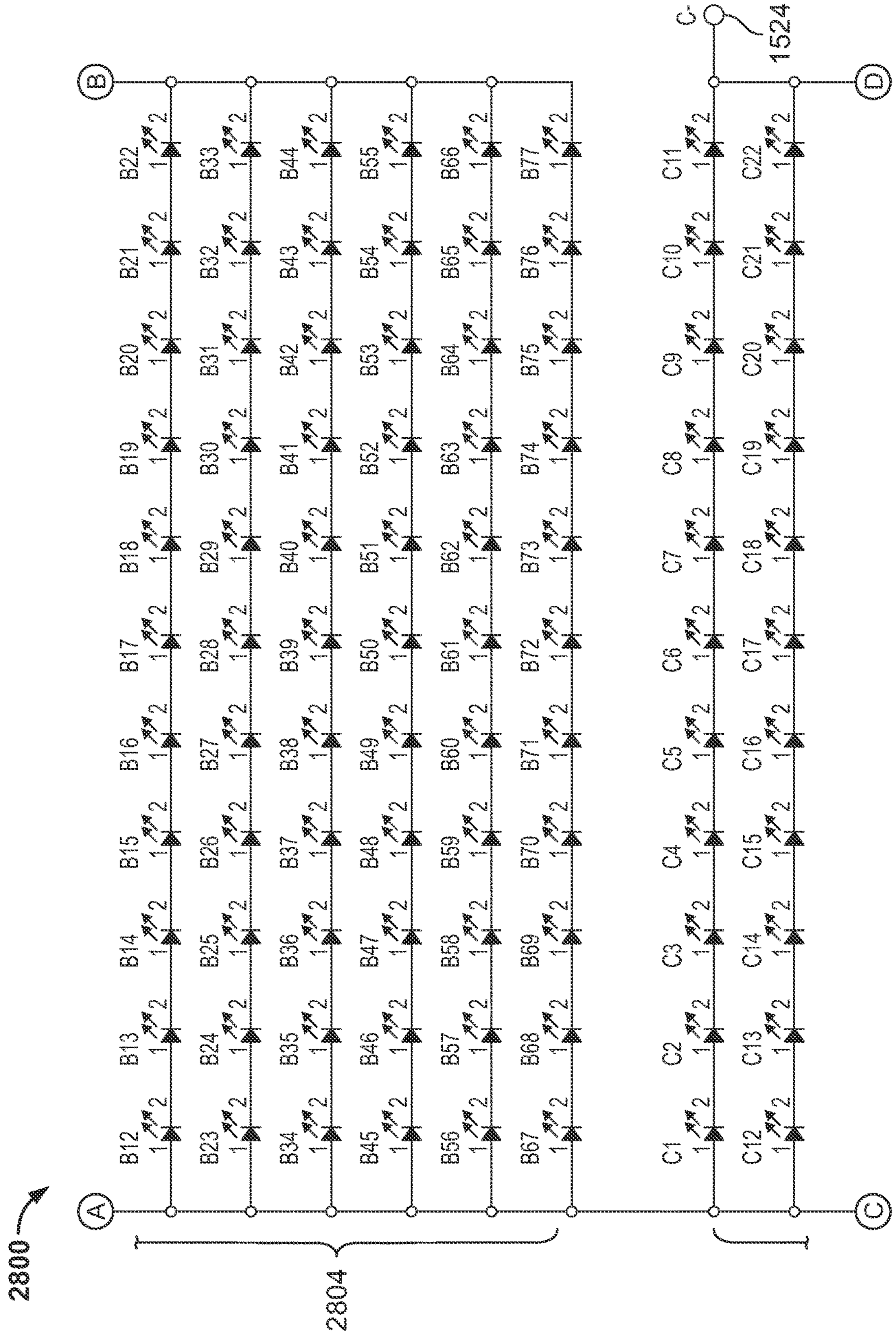
Figure 28:
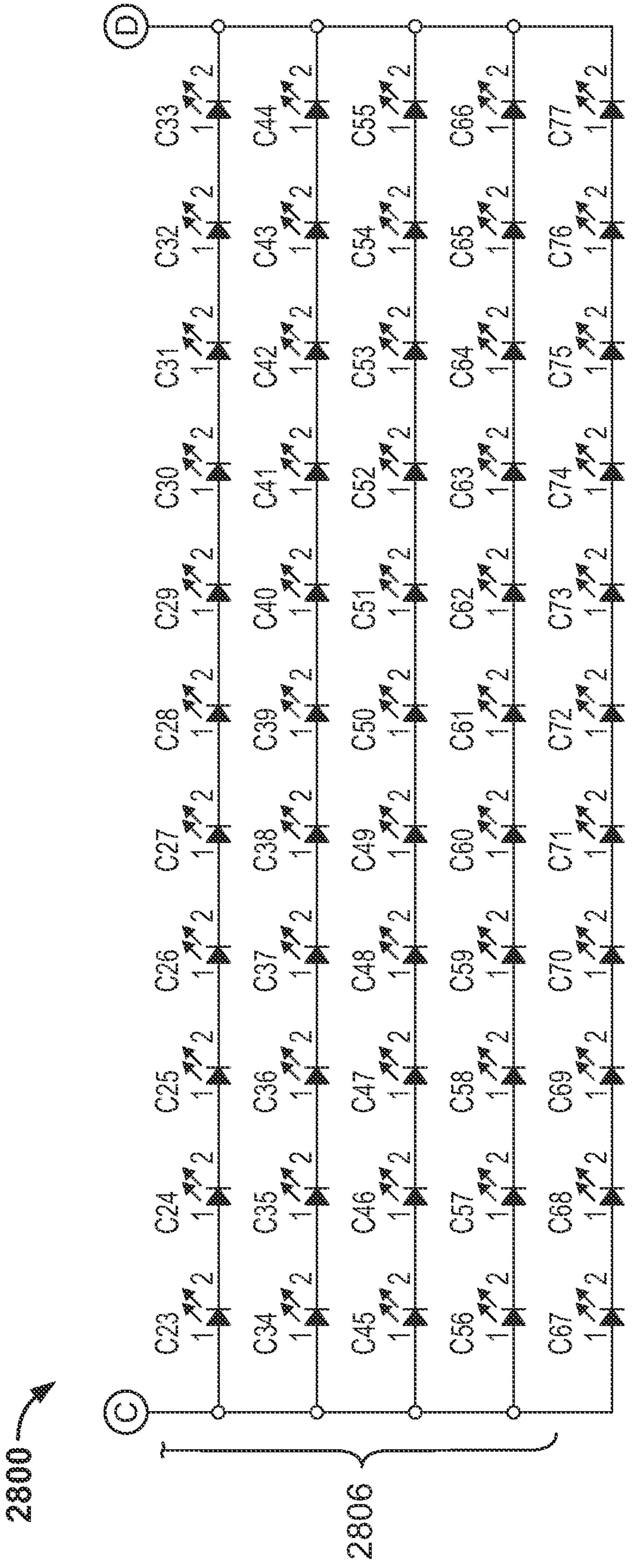

FIG. 28 shows illustrative LED module 2800. LED module 2800 may be in communication with one or more elements of circuit 1500. LED module 2800 may include an array of LED light sources. The array may include string of LEDs 2802. The array may include string of LEDs 2804. The array may include string of LEDs 2806. Each string of LEDs 2802, 2804 and 2806 may include a plurality of LEDs. The plurality of LEDs may be connected in series. The plurality of LEDs may be connected in parallel. The plurality of LEDs may be connected in a combination of series and parallel connections.

String of LEDs 2802 may include LEDs A1 through LEDs A77. The LEDs included in string of LEDs 2802 may have a CCT of 1800° K. String of LEDs 2802 may be connected to LED driver 1503. String of LEDs 2802 may be connected to LED driver 1503 through terminal 1512. String of LEDs 2802 may receive regulated current from LED driver 1503 through terminal 1512.

String of LEDs 2804 may include LEDs B1 through LEDs B77. The LEDs included in string of LEDs 2804 may have a CCT of 2700° K. String of LEDs 2804 may be connected to LED driver 1505. String of LEDs 2804 may be connected to LED driver 1505 through terminal 1518. String of LEDs 2804 may receive regulated current from LED driver 1505 through terminal 1518.

String of LEDs 2806 may include LEDs C1 through LEDs C77. The LEDs included in string of LEDs 2806 may have a CCT of 6500° K. String of LEDs 2806 may be connected to LED driver 1507. String of LEDs 2806 may be connected to LED driver 1507 through terminal 1524. String of LEDs 2806 may receive regulated current from LED driver 1507 through terminal 1524.

Figure 29:
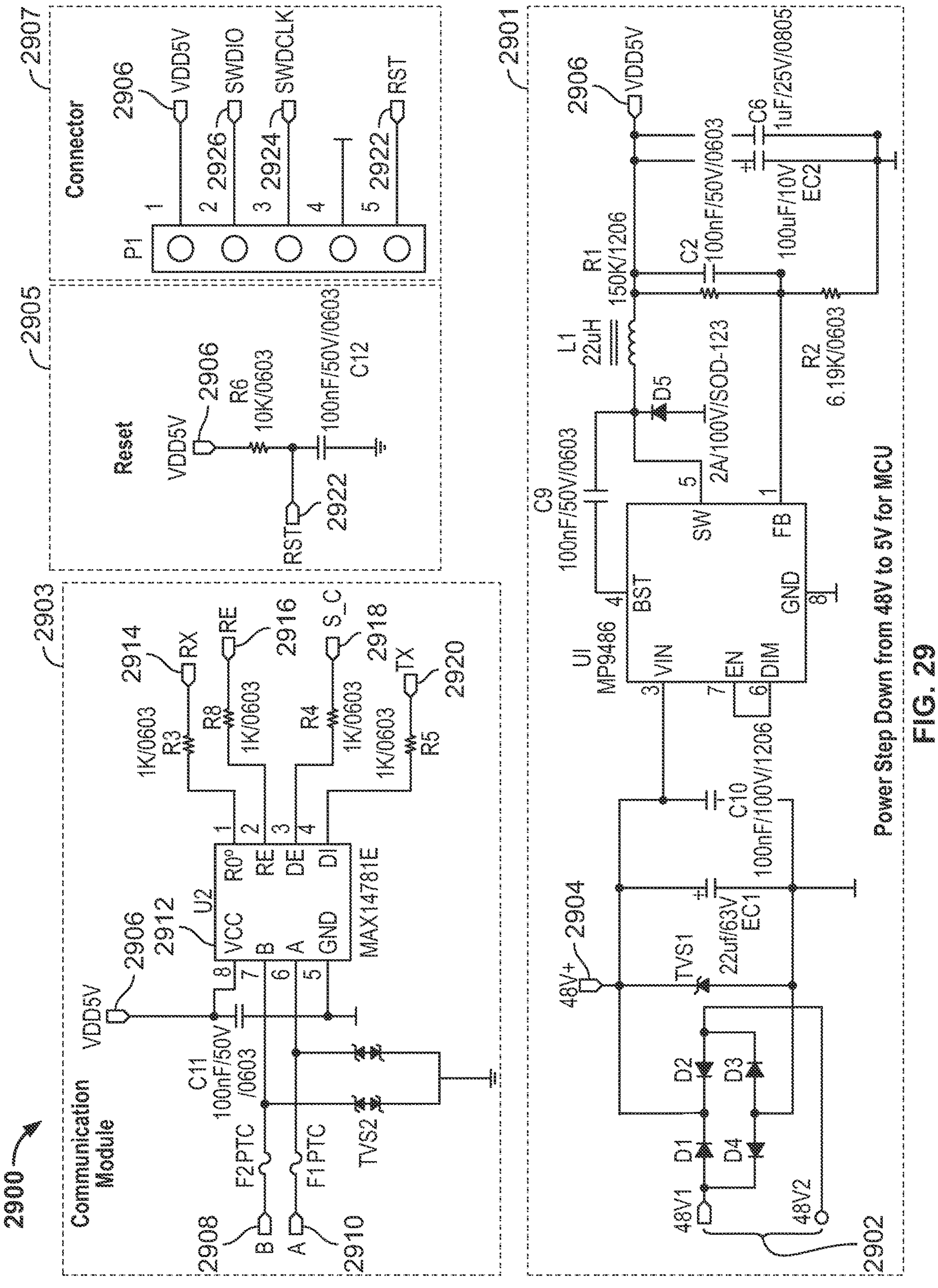
FIG. 29 shows schematically illustrative apparatus of a process in accordance with principles of the invention.
Figure 29:
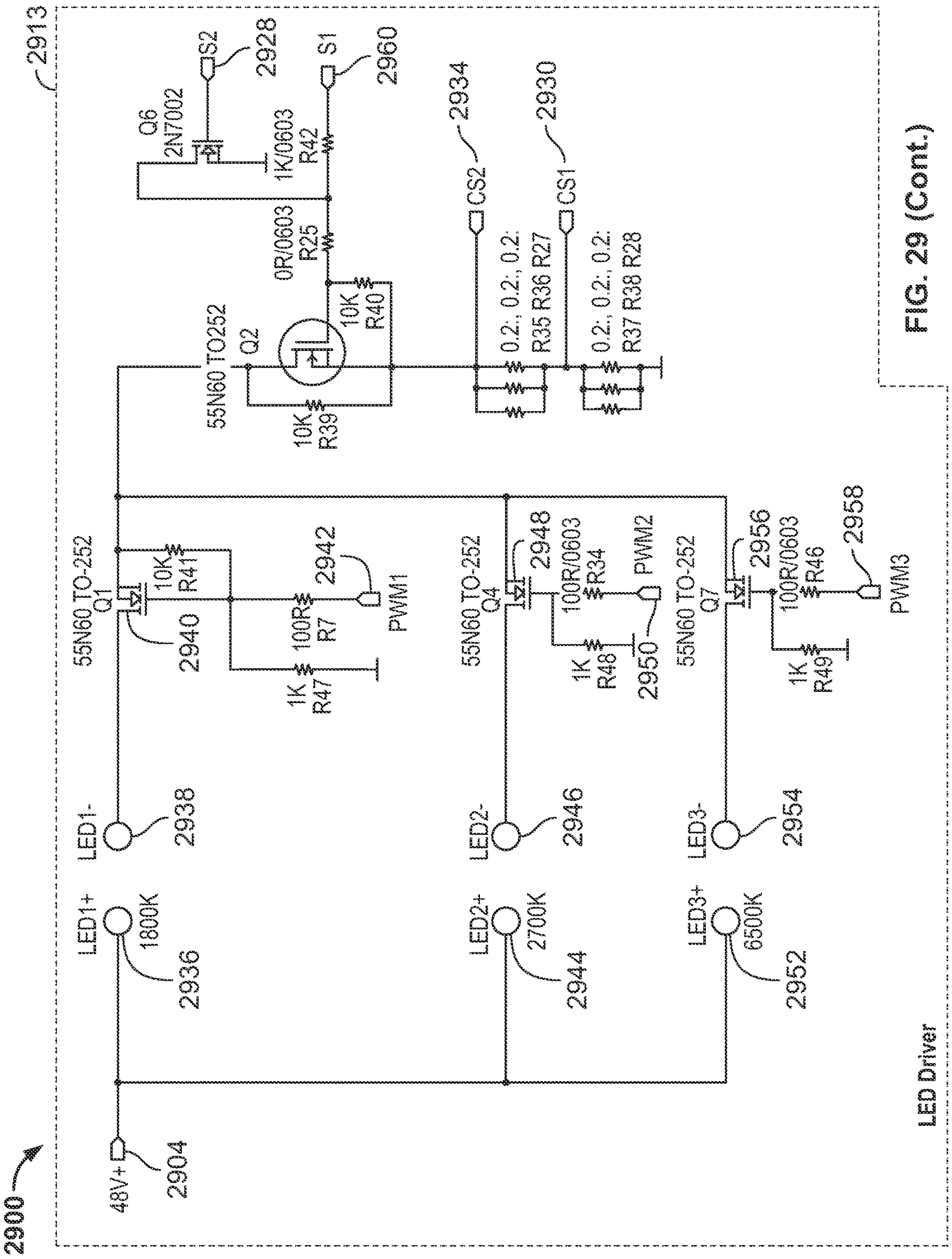
Figure 29:
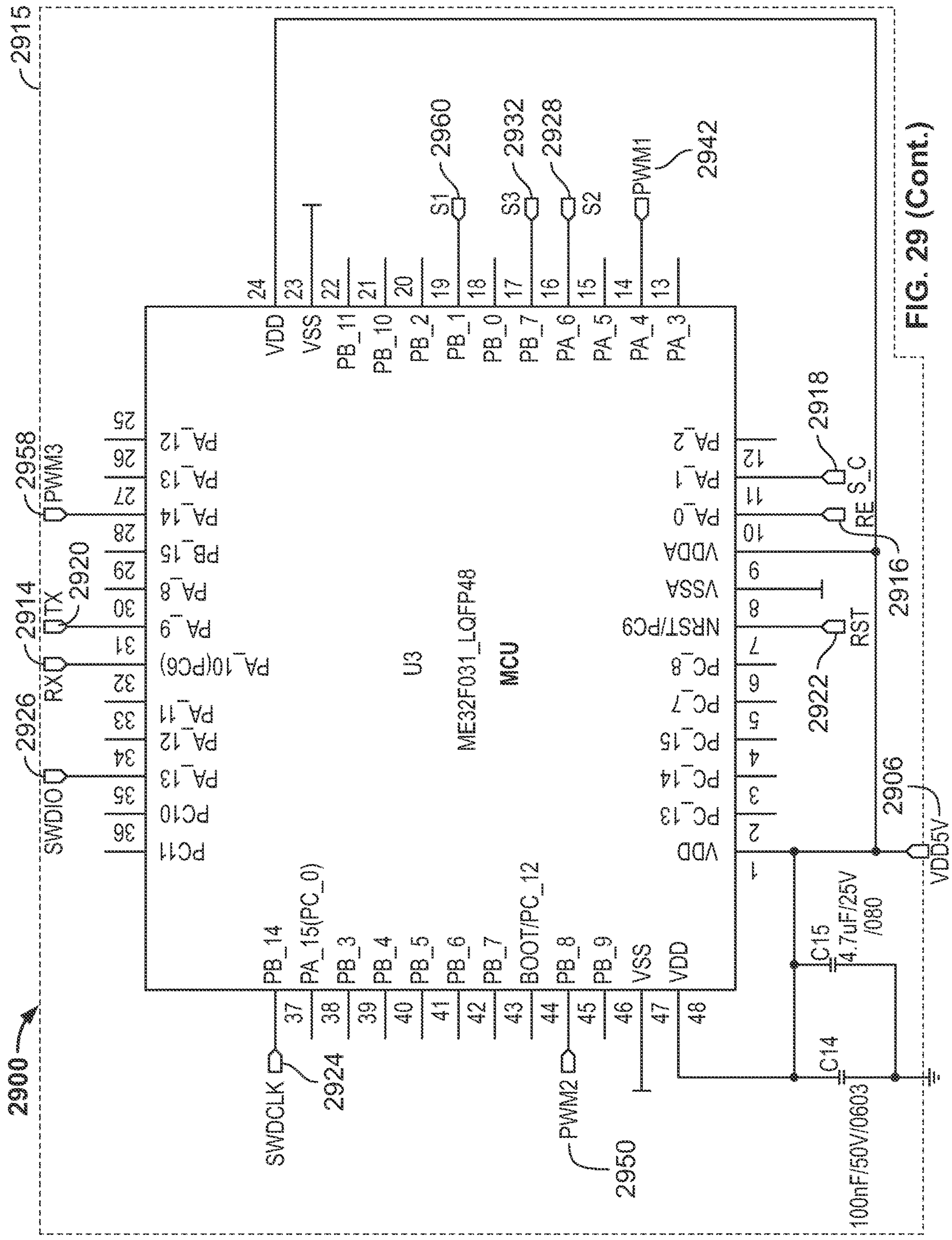
Figure 29:
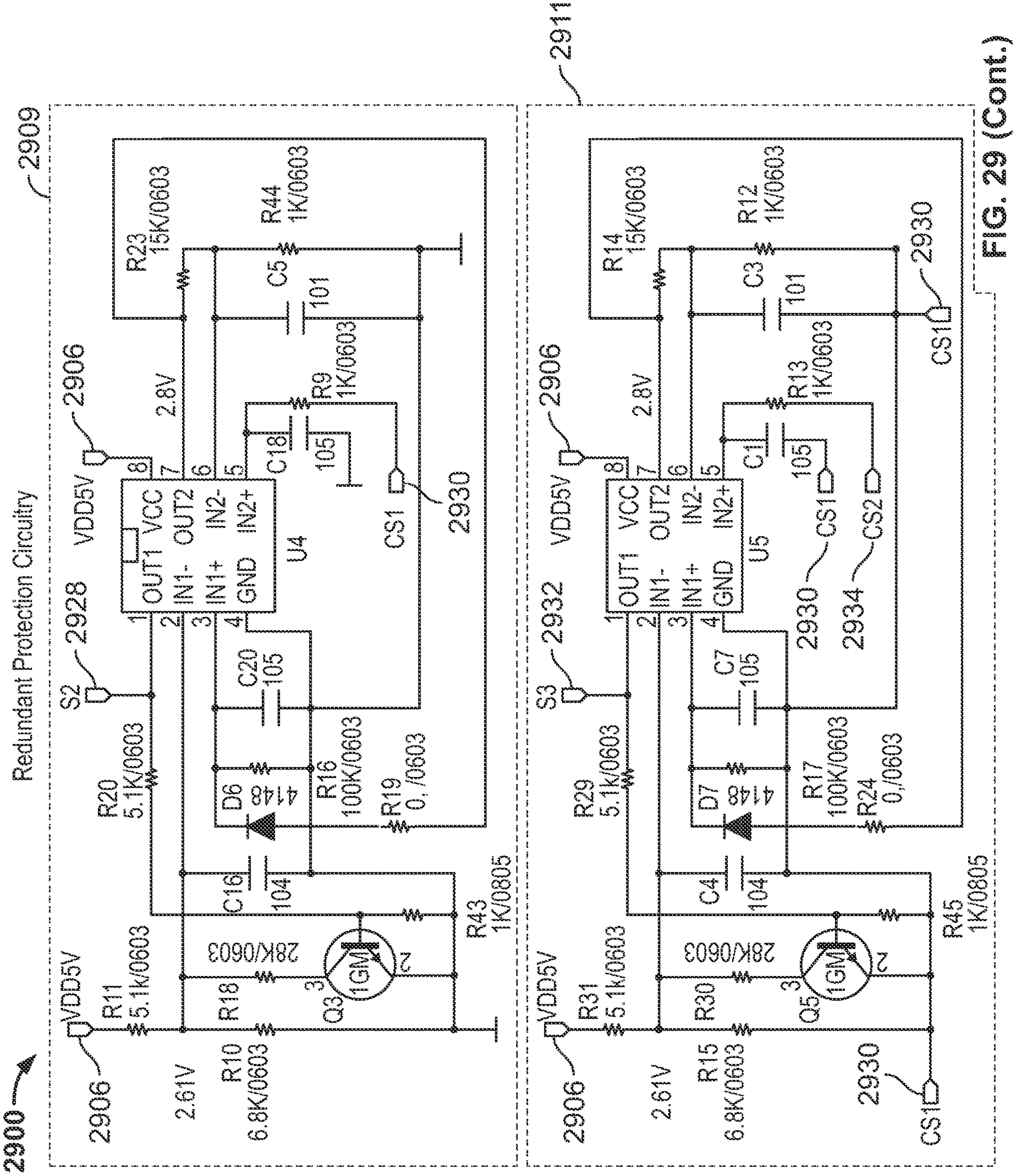

FIG. 29 shows illustrative circuit 2900. Circuit 2900 may have one or more features in common with one or more features of apparatus 100. Circuit 2900 may be included in one or more of lighting system controller 102, LED driver 104 and LED module 106.

Circuit 2900 may include power step down circuitry 2901. Power step down circuitry 2901 may include voltage input 2902. Voltage input 2902 may include an input voltage of 48V. Voltage input 2902 may include an input voltage of 48 VDC. Voltage input 2902 may include an input voltage of 48 VAC. Power step down circuitry 2901 may rectify input voltage 2902 to output a DC voltage. Power step down circuitry 2901 may step down input voltage 2902. Power step down circuitry 2901 may step down input voltage 2902 to output voltage 2906. Voltage 2906 may be 5 VDC. Input voltage 2902 may be stepped down from 48 VDC to 5 VDC. Input voltage 2902 may be stepped down to produce a suitable input voltage for microcontroller 2915.

Circuit 2900 may include communication module 2903. Communication module 2903 may be a two-wire communication system. Communication module 2903 may input signal 2908 (B) and signal 2910 (A). Signal 2908 and 2910 may be picked up from a communication bus. Communication module 2903 may allow for communication of data to microcontroller 2915.

Communication module 2903 may receive voltage 2906. Communication module 2903 may include IC 2912 (U5). IC 2912 may convert signal 2908 and signal 2910 into microcontroller readable signals. IC 2912 may receive voltage 2906, signal 2908 and signal 2910. IC 2912 may transmit signal 2908 and 2910 to microcontroller 2915.

Circuit 2900 may include reset circuitry 2905. Reset circuitry 2905 may receive voltage 2906. Reset circuitry 2905 may be in communication with microcontroller 2915. Reset circuitry 2905 may be in communication with microcontroller 2915 through RST terminal 2922. RST terminal 2922 may be a reset terminal. Reset circuitry 2905 may be used to reset microcontroller 2915. Reset circuitry 2905 may stop a program/protocol running on microcontroller 2915 and may start the program/protocol from the beginning.

Circuit 2900 may include connector 2907 (P1). Connector 2907 may receive voltage 2906. Connector 2907 may include SWDIO pin 2926. SWIDO pin 2926 may be a bidirectional data pin. SWIDO pin 2926 may transfer data. Connector 2907 may include SWDCLK pin 2924. SWDCLK pin 2924 may clock data. Connector 2907 may include reset terminal (RST) 2922. Reset terminal (RST) 2922 may connect connector 2907 with reset circuitry 2905.

Circuit 2900 may include redundant protection circuitries 2909 and 2911. Redundant protection circuitries 2909 and 2911 may be controlled by microcontroller 2915. Redundant protection circuitries 2909 and 2911 may sense a current. Redundant protection circuitries 2909 and 2911 may transmit information regarding the sensed current to microcontroller 2915. In the event that the sensed current is over a predetermined limit, microcontroller 2915 may send out a signal to MOSFETs 2940, 2948, and 2956 to be turned off. Turning off MOSFETs 2940, 2948, and 2956 may stop current from being transmitted to LED modules connected to LED driver 2913.

Redundant protection circuitries 2909 and 2911 may include current sensing terminals 2930 (CS1) and 2934 (CS2). Current sensing terminals 2930 and 2934 may sense a current. Current sensing terminals 2930 and 2934 may sense the current based on a voltage across a sense resistor. The sensed current may indicate an overcurrent condition. The sensed current may not indicate an overcurrent condition. Based on the sensed current, redundant protection circuitries 2909 and 2911 may output a voltage. The output voltage may be 5V and/or 0V.

When the sensed current does not indicate a overcurrent condition, redundant protection circuitries 2909 and 2911 may output 0V through terminals 2932 (S1) and 2928 (S3). Terminals 2932 and 2928 may connect to microcontroller 2915. When microcontroller 2915 does not sense voltage from terminals 2932 and 2928, terminal 2960 (S1) may output a 5V output. Terminal 2960 may output a 5V output to power LED driver 2913.

When the sensed current indicates an overcurrent condition, the current may trigger redundant protection circuitries 2909 and 2911. When the sensed current indicates an overcurrent condition, redundant protection circuitries 2909 and 2911 may output 5V through terminals 2932 (S1) and 2928 (S3). Terminals 2932 and 2928 may connect to microcontroller 2915. Microcontroller 2915 may sense 5V output from terminals 2932 and 2938. In response to detecting a change in voltage from terminals 2932 and 2938, microcontroller may output 0V through terminal 2960 (S1). Microcontroller 2915 may output 0V to shut down LED driver 2913.

Circuit 2900 may include LED driver 2913. LED driver 2913 may receive voltage 2904. Voltage 2904 may include a voltage of 48 VDC. LED driver 2913 may output current through high-end terminals 2936, 2944, and 2952 and low-end terminals 2938, 2946, and 2954. High-end terminal 2936 and low-end terminal 2938 may connect to an LED module. High-end terminal 2944 and low-end terminal 2946 may connect to an LED module. High-end terminal 2952 and low-end terminal 2954 may connect to an LED module. Each of the LED modules may include a plurality of LEDs. The plurality of LEDs may be connected in parallel. The plurality of LEDs may be connected in series.

LED driver 2913 may include MOSFETs 2940, 2948, and 2956. MOSFETs 2940, 2948, and 2956 may be turned on and off to control current flow from LED driver 2913 through the connected LEDs. MOSFET 2940 (Q1) may control current through the LEDs having high-end coupled to terminal 2936 and a low-end coupled to terminal 2938. MOSFET 2948 (Q2) may control current through the LEDs having a high-end coupled to terminal 2944 and a low-end coupled to terminal 2946. MOSFET 2956 (Q3) may control current through the LEDs having a high-end coupled to terminal 2952 and a low-end coupled to terminal 2954.

Microcontroller 2915 may adjust the currents in response to a dimming signal transmitted from the dimmer. Microcontroller 2915 may adjust the currents in response to a CCT partition set-point signal transmitted from the dimmer.

LED driver 2913 may be in electronic communication with microcontroller 2915. LED driver 2913 may be in electronic communication with microcontroller 2915 through terminals 2942 (PWM1), 2948 (PWM2), and terminal 2958 (PWM3).

Circuit 2900 may include microcontroller 2915. Microcontroller 2915 may be powered by voltage 2906. Microcontroller 2915 may throttle current to LED driver 2913 through the PWM terminals 2942, 2950, and 2958. The current may be throttled based on a received signal. Microcontroller 2915 may prevent current transmission to one or more LED modules. Microcontroller 2915 may limit current transmission to one or more LED modules. Microcontroller 2915 may increase current transmission to one or more LED modules. Microcontroller 2915 may include dimming circuitry to dim the LED modules. Microcontroller 2915 may include digital dimming signals. Microcontroller 2915 may transmit the dimming signals through PWM terminals 2942, 2950, and 2958. Microcontroller 2915 may control the color, intensity, dim-to-warm correlation of the light emitted by controlling the amount of current that is given to each LED module.

Signals 2908 and 2910 may correspond to a user-selected color mode. Signals 2908 and 2910 may correspond to a user-selected light intensity. Signals 2908 and 2910 may correspond to a user-selected dim-to-warm correlation. Microcontroller 2915 may control the color of the LEDs included in the LED module. Microcontroller 2915 may control the intensity of the LEDs included in the LED module. Microcontroller 2915 may control the dim-to-warm correlation of the LEDs in the LED module. Microcontroller 2915 may receive a translation of signals 2908 and 2910. The translation may be transmitted through pins 2914 (RX), pin 2916 (RE), pin 2918 (S_C), and pin 2920 (TX). The translation may be readable by microcontroller 2915.

Figure 30:
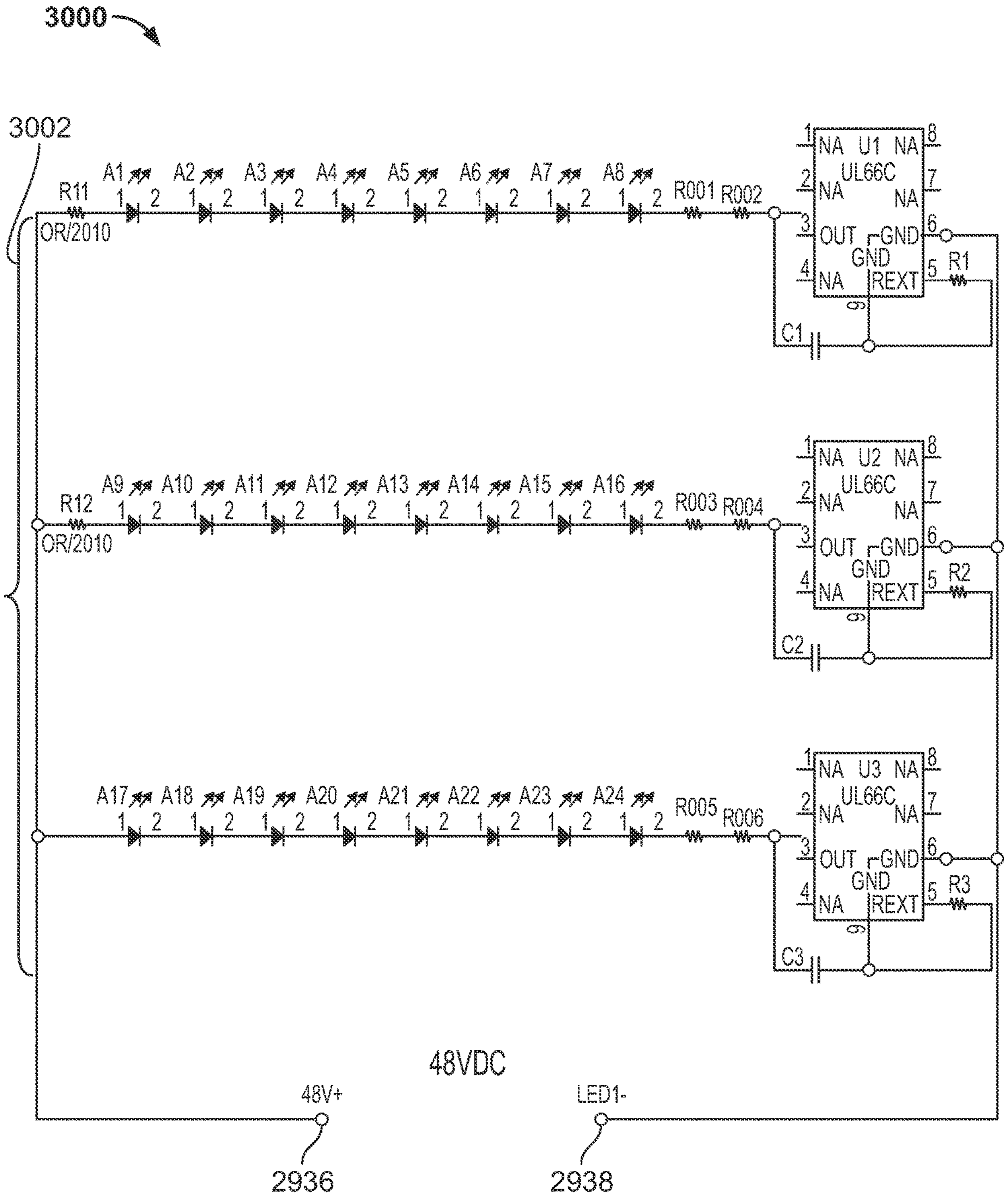
FIG. 30 shows schematically illustrative apparatus of a process in accordance with principles of the invention.
Figure 30:
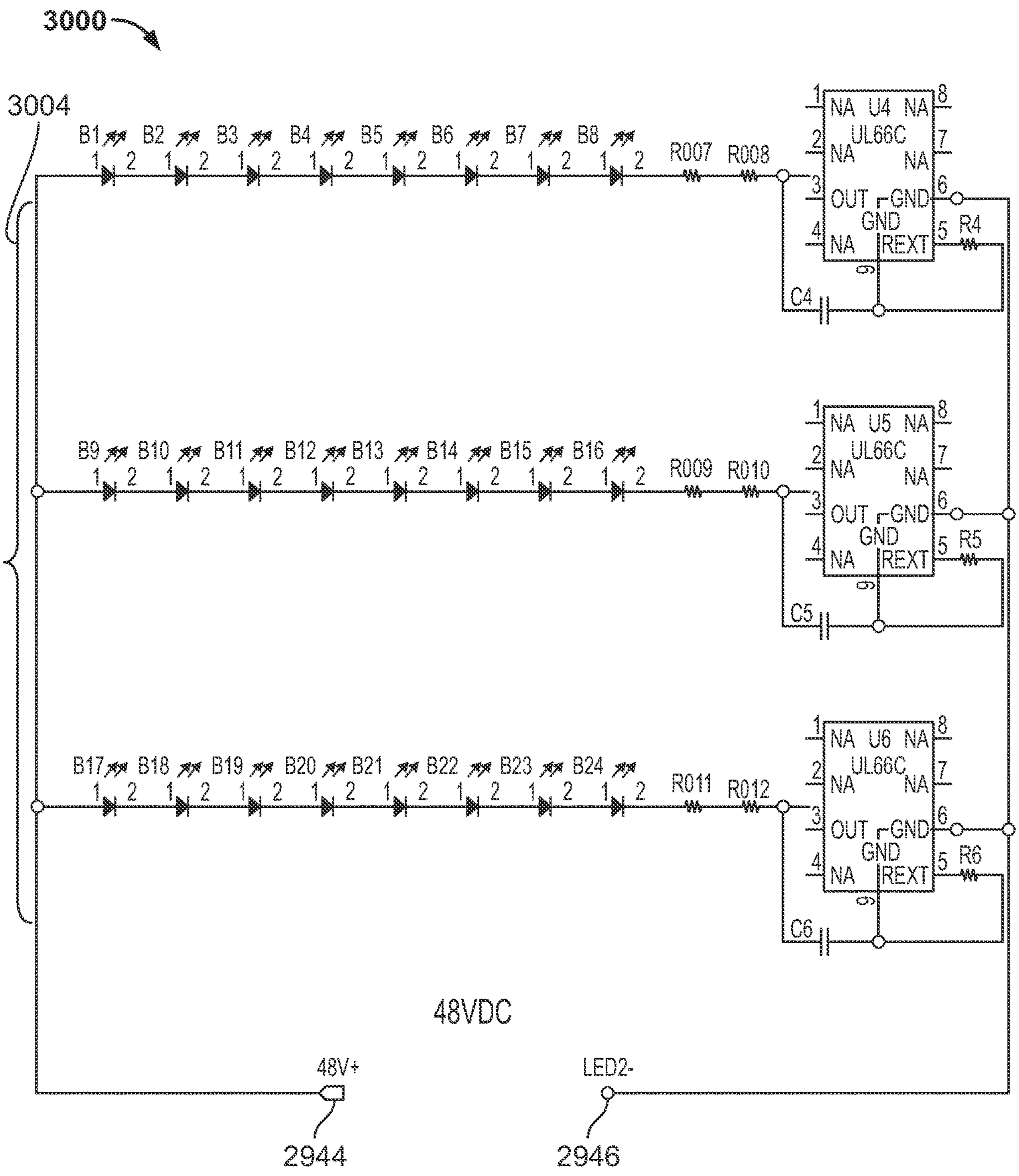
Figure 30:
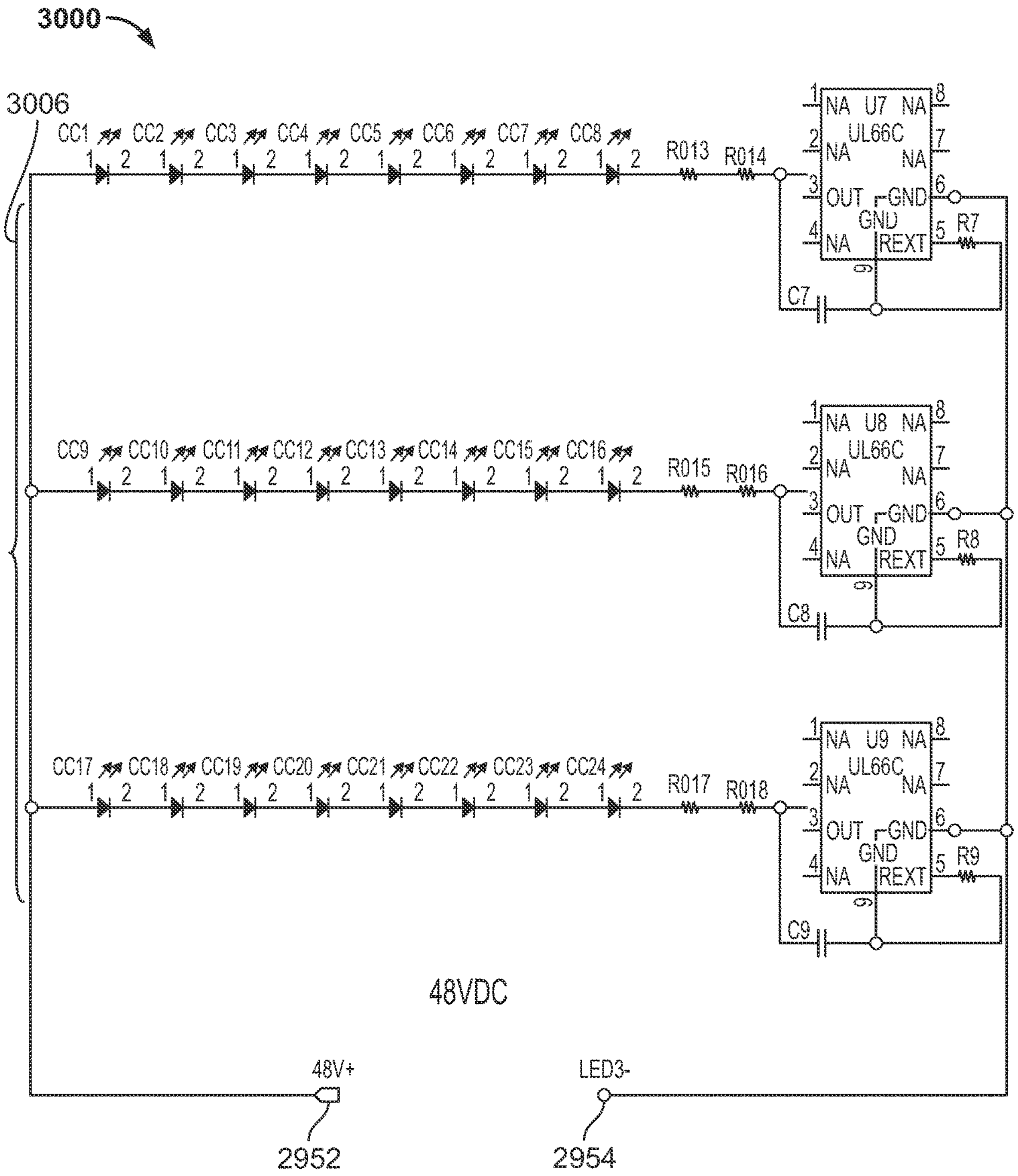

FIG. 30 shows illustrative LED module 3000. LED module 3000 may be in communication with one or more elements of circuit 2900. LED module 3000 may be used for indirect lighting. LED module 3000 may include an array of LED light sources. The array may include string of LEDs 3002. The array may include string of LEDs 3004. The array may include string of LEDs 3006. Each string of LEDs 3002, 3004 and 3006 may include a plurality of LEDs. The plurality of LEDs may be connected in series. The plurality of LEDs may be connected in parallel. The plurality of LEDs may be connected in a combination of series and parallel connections.

String of LEDs 3002 may include LEDs A1 through LEDs A24. String of LEDs 3002 may be connected to LED driver 2913. String of LEDs 3002 may be connected to LED driver 2913 through high-end terminal 2936 and low-end terminal 2938. String of LEDs 3002 may receive regulated current from LED driver 2913 through high-end terminal 2936 and low-end terminal 2938.

String of LEDs 3004 may include LEDs B1 through LEDs B24. String of LEDs 3004 may be connected to LED driver 2913. String of LEDs 3004 may be connected to LED driver 2913 through high-end terminal 2944 and low-end terminal 2946. String of LEDs 3004 may receive regulated current from LED driver 2913 through high-end terminal 2944 and low-end terminal 2946.

String of LEDs 3006 may include LEDs C1 through LEDs C24. String of LEDs 3006 may be connected to LED driver 2913. String of LEDs 3006 may be connected to LED driver 2913 through high-end terminal 2952 and low-end terminal 2954. String of LEDs 3006 may receive regulated current from LED driver 2913 through high-end terminal 2952 and low-end terminal 2954.

Figure 31:
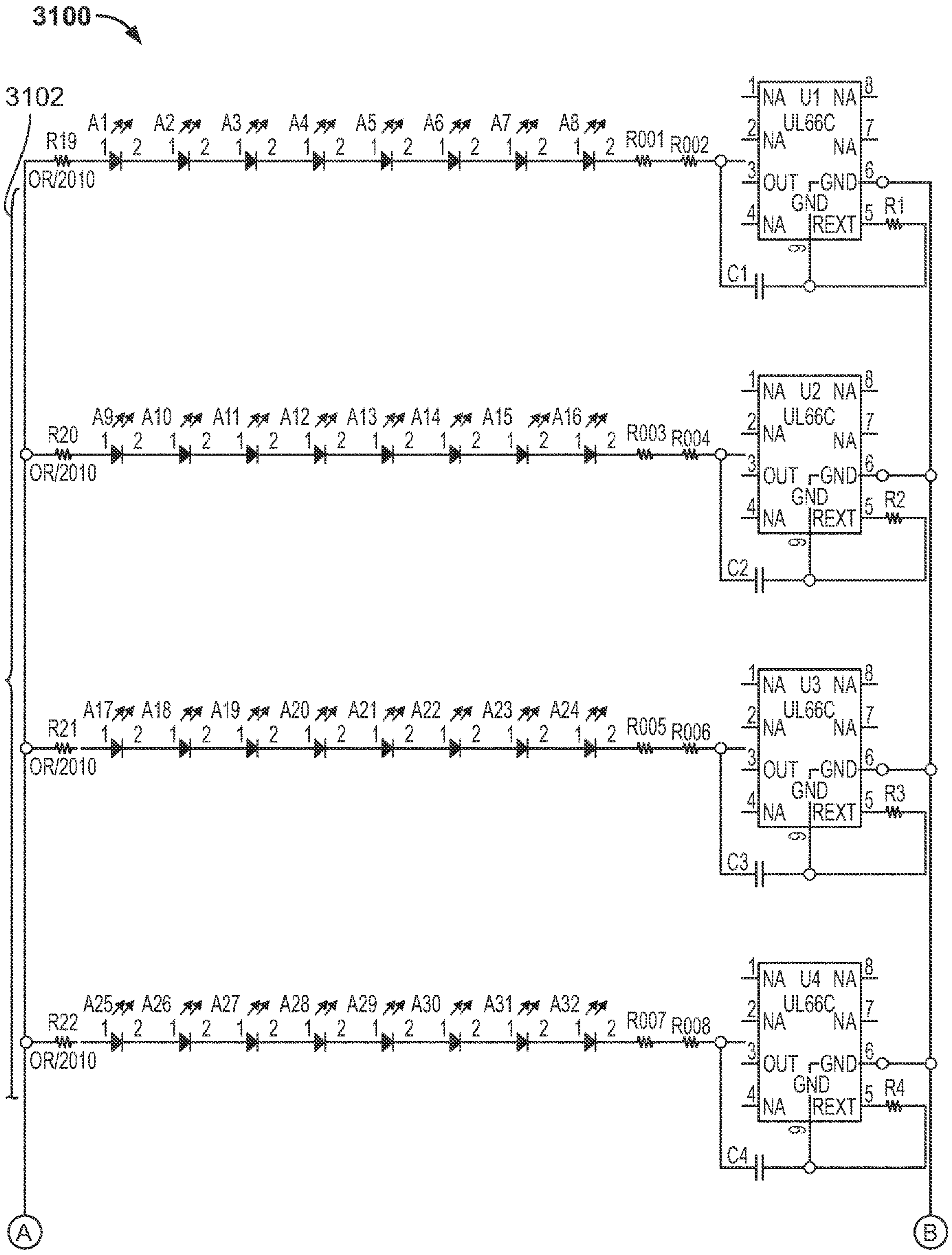
FIG. 31 shows schematically illustrative apparatus of a process in accordance with principles of the invention.
Figure 31:
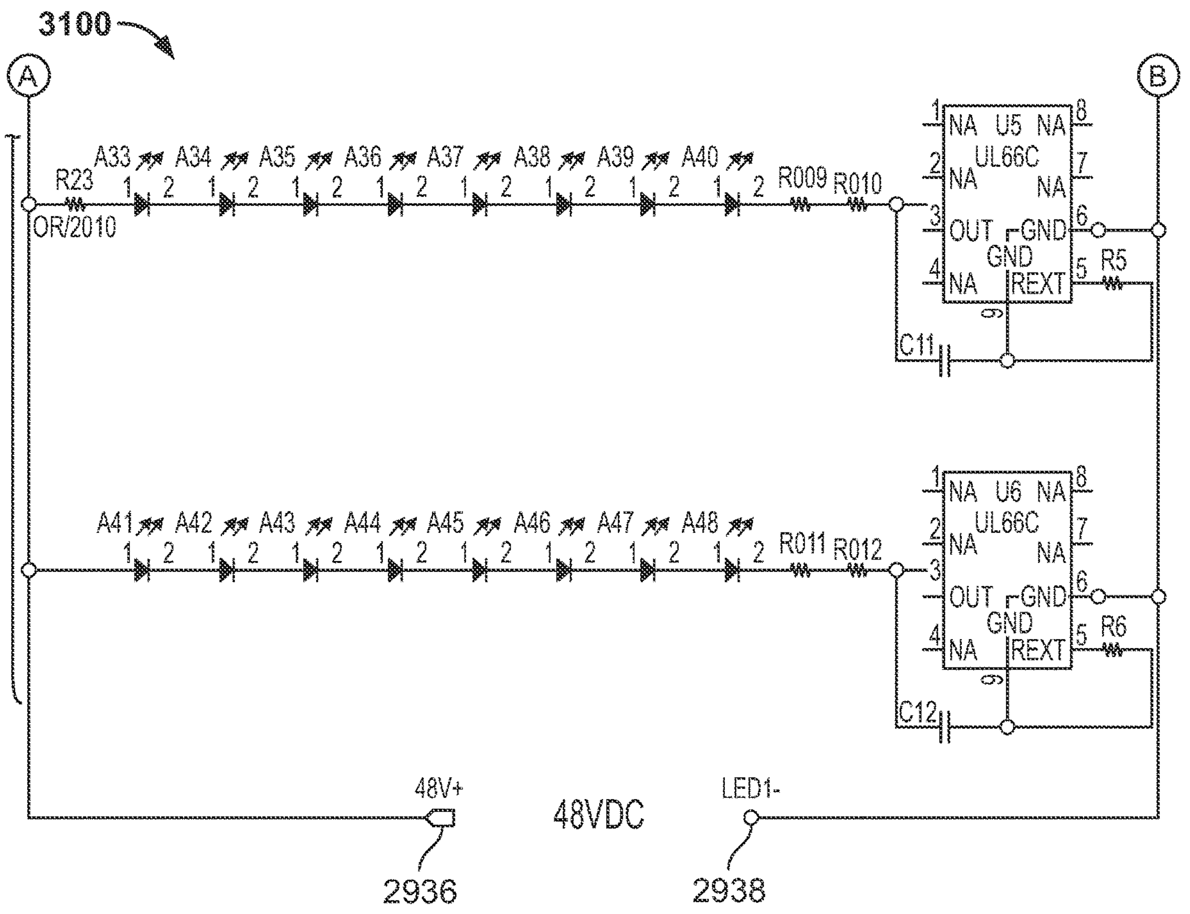
Figure 31:
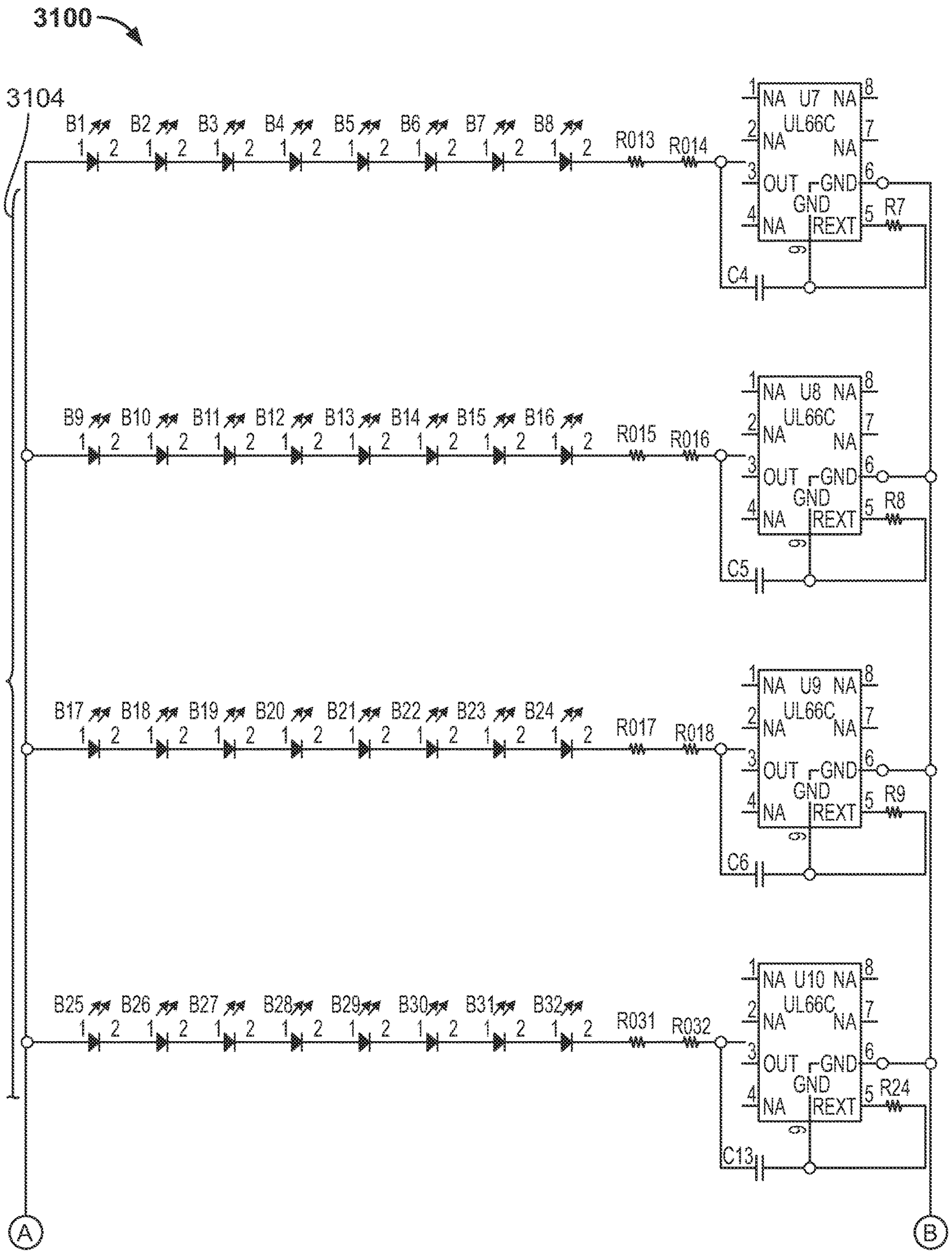
Figure 31:
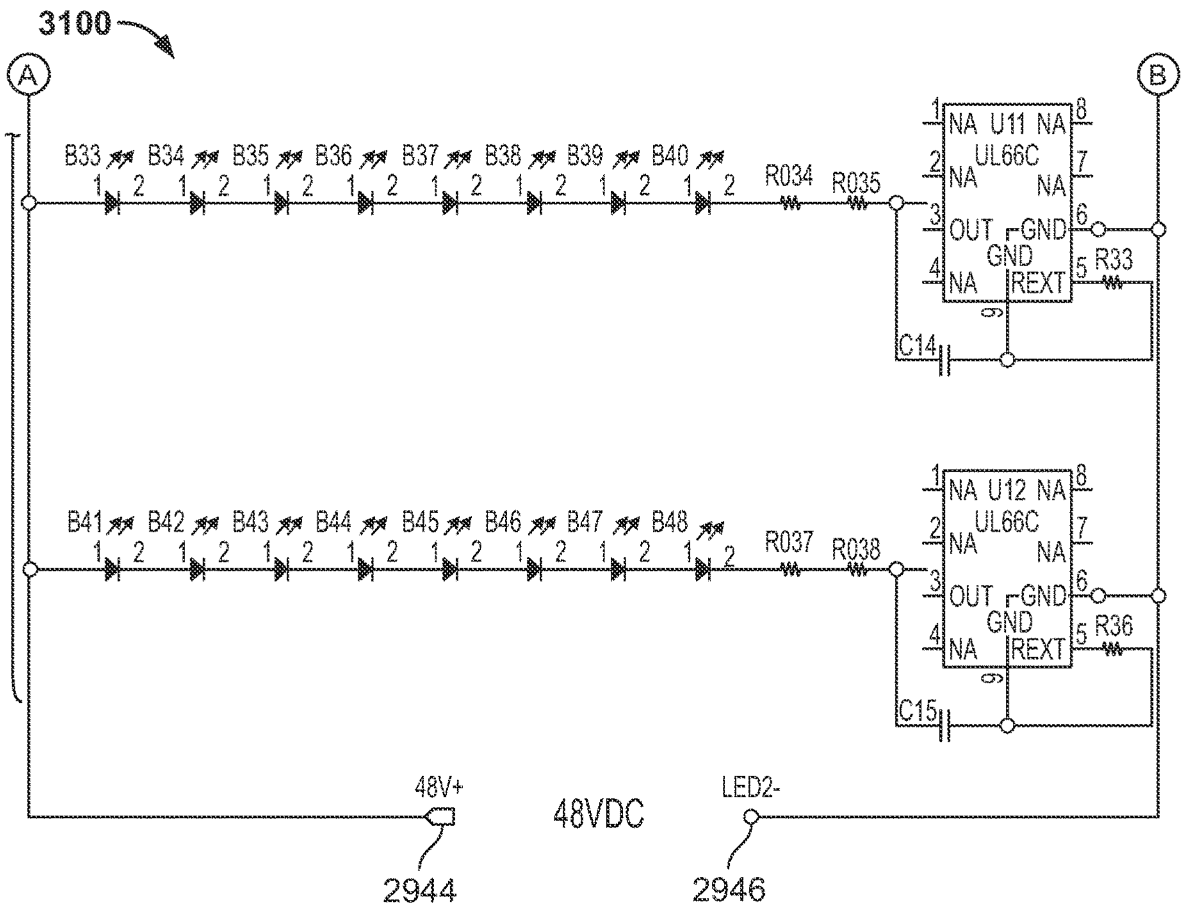
Figure 31:
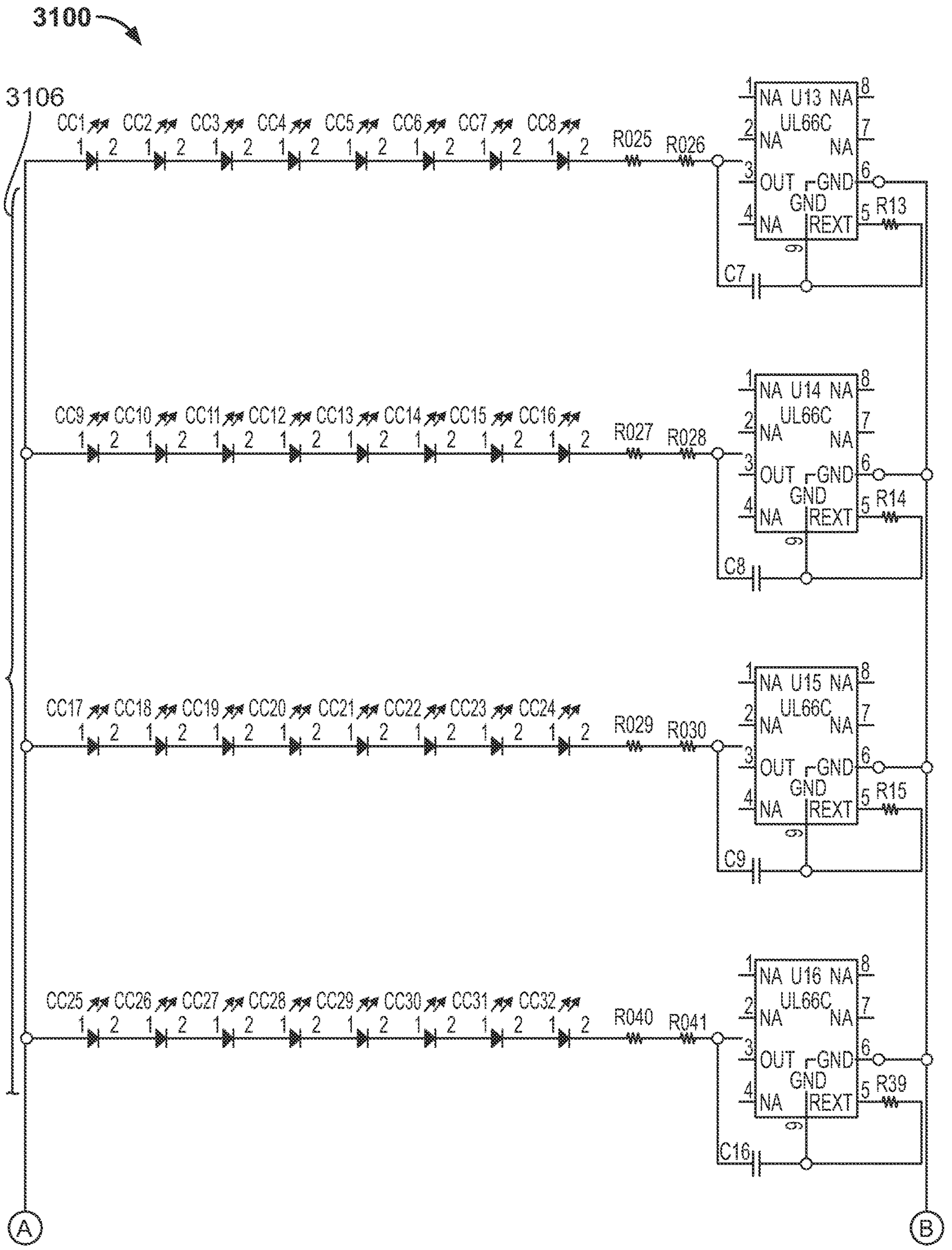
Figure 31:
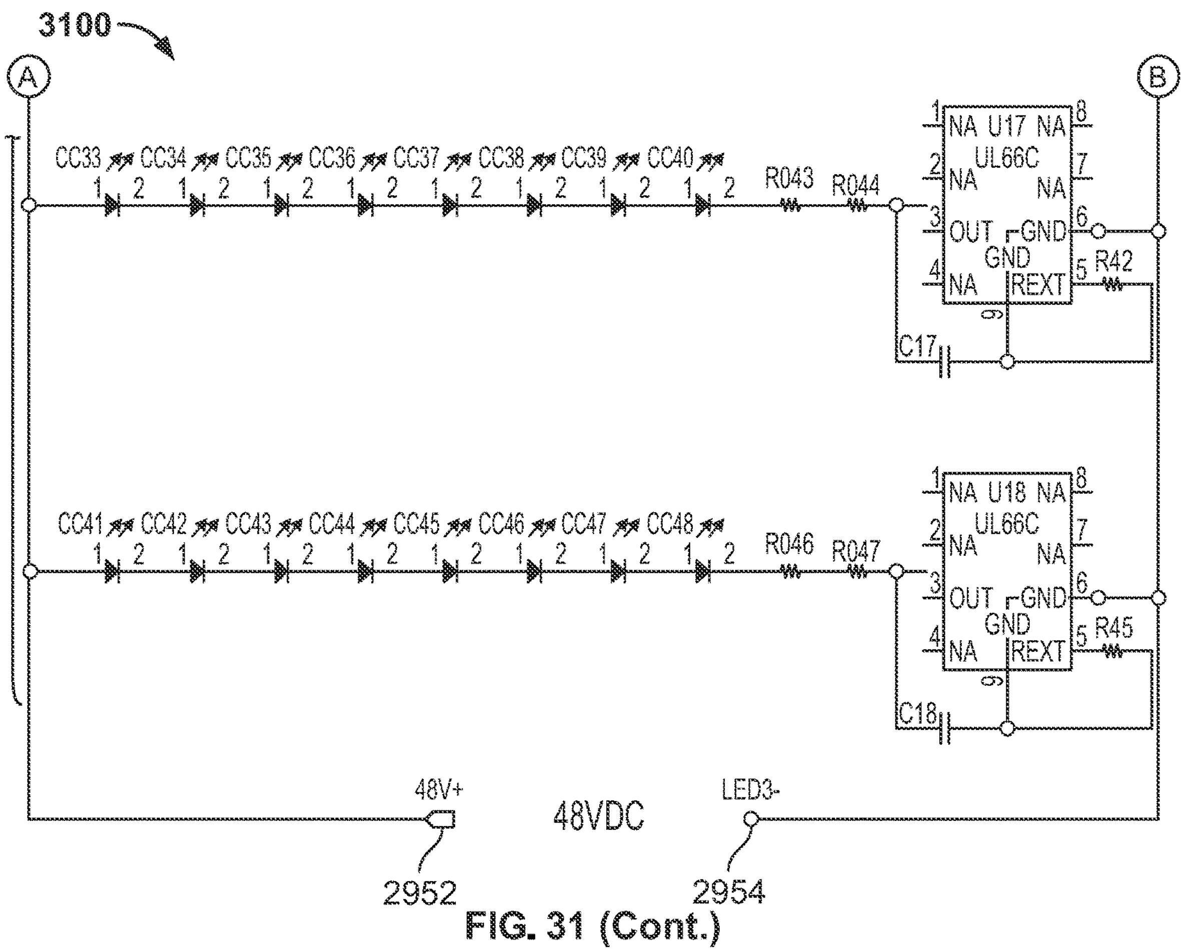

FIG. 31 shows illustrative LED module 3100. LED module 3100 may be in communication with one or more elements of circuit 2900. LED module 3100 may be used for indirect lighting. LED module 3100 may include an array of LED light sources. The array may include string of LEDs 3102. The array may include string of LEDs 3104. The array may include string of LEDs 3106. Each string of LEDs 3102, 3104 and 3106 may include a plurality of LEDs. The plurality of LEDs may be connected in series. The plurality of LEDs may be connected in parallel. The plurality of LEDs may be connected in a combination of series and parallel connections.

String of LEDs 3102 may include LEDs A1 through LEDs A48. String of LEDs 3102 may be connected to LED driver 2913. String of LEDs 3102 may be connected to LED driver 2913 through high-end terminal 2936 and low-end terminal 2938. String of LEDs 3102 may receive regulated current from LED driver 2913 through high-end terminal 2936 and low-end terminal 2938.

String of LEDs 3104 may include LEDs B1 through LEDs B48. String of LEDs 3104 may be connected to LED driver 2913. String of LEDs 3104 may be connected to LED driver 2913 through high-end terminal 2944 and low-end terminal 2946. String of LEDs 3104 may receive regulated current from LED driver 2913 through high-end terminal 2944 and low-end terminal 2946.

String of LEDs 3106 may include LEDs C1 through LEDs C48. String of LEDs 3106 may be connected to LED driver 2913. String of LEDs 3106 may be connected to LED driver 2913 through high-end terminal 2952 and low-end terminal 2954. String of LEDs 3106 may receive regulated current from LED driver 2913 through high-end terminal 2952 and low-end terminal 2954.

Figure 32:
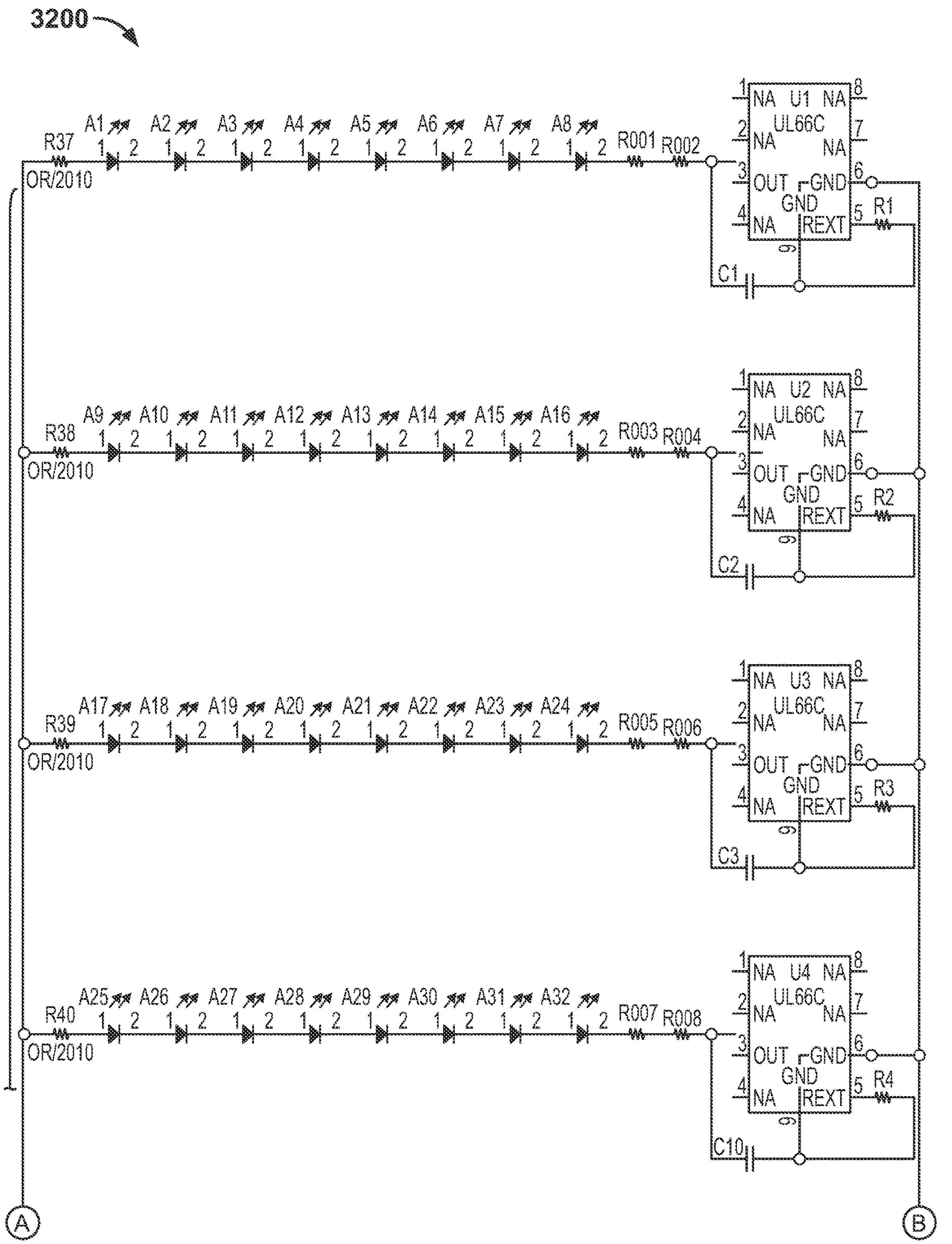
FIG. 32 shows schematically illustrative apparatus of a process in accordance with principles of the invention.
Figure 32:
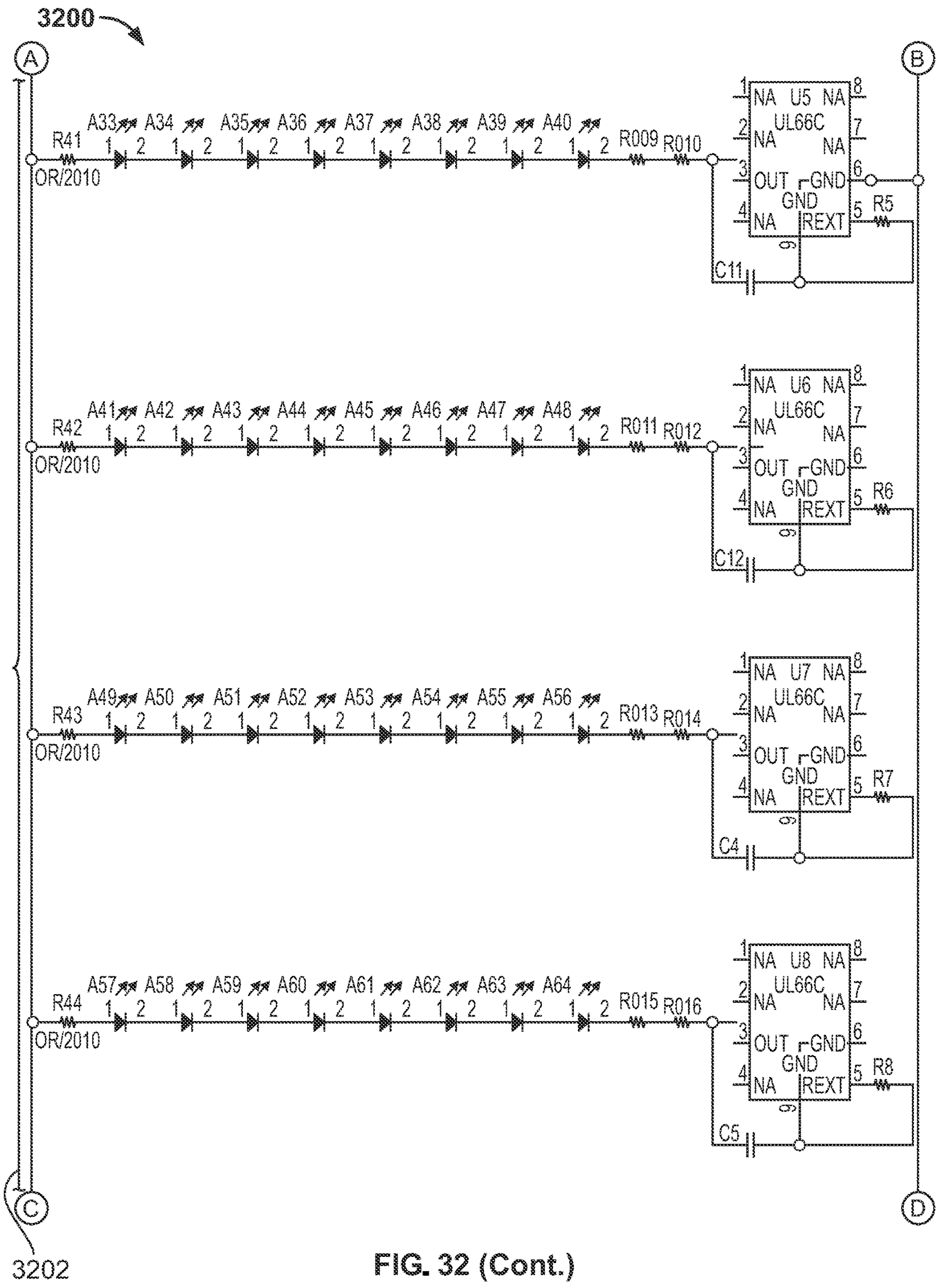
Figure 32:
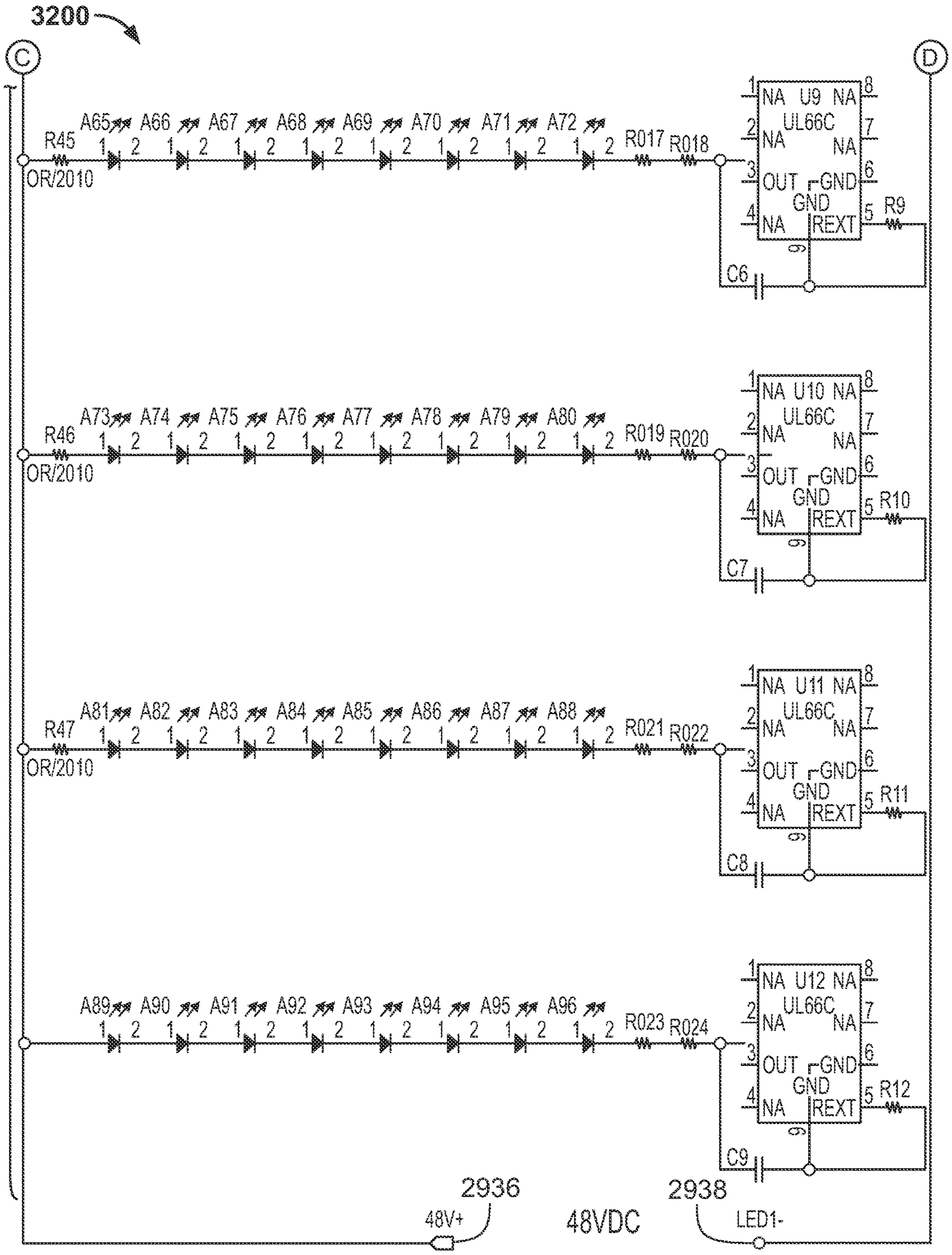
Figure 32:
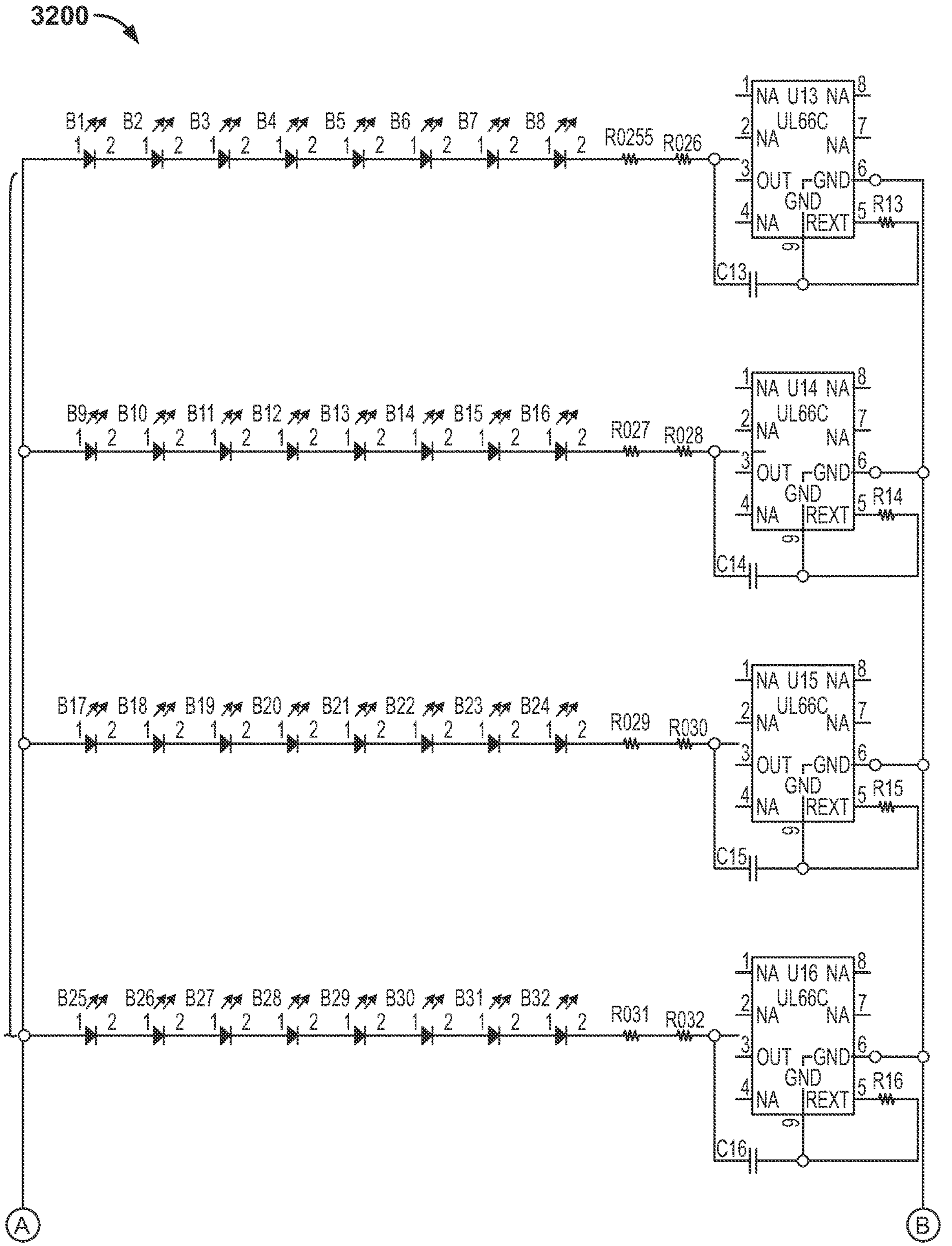
Figure 32:
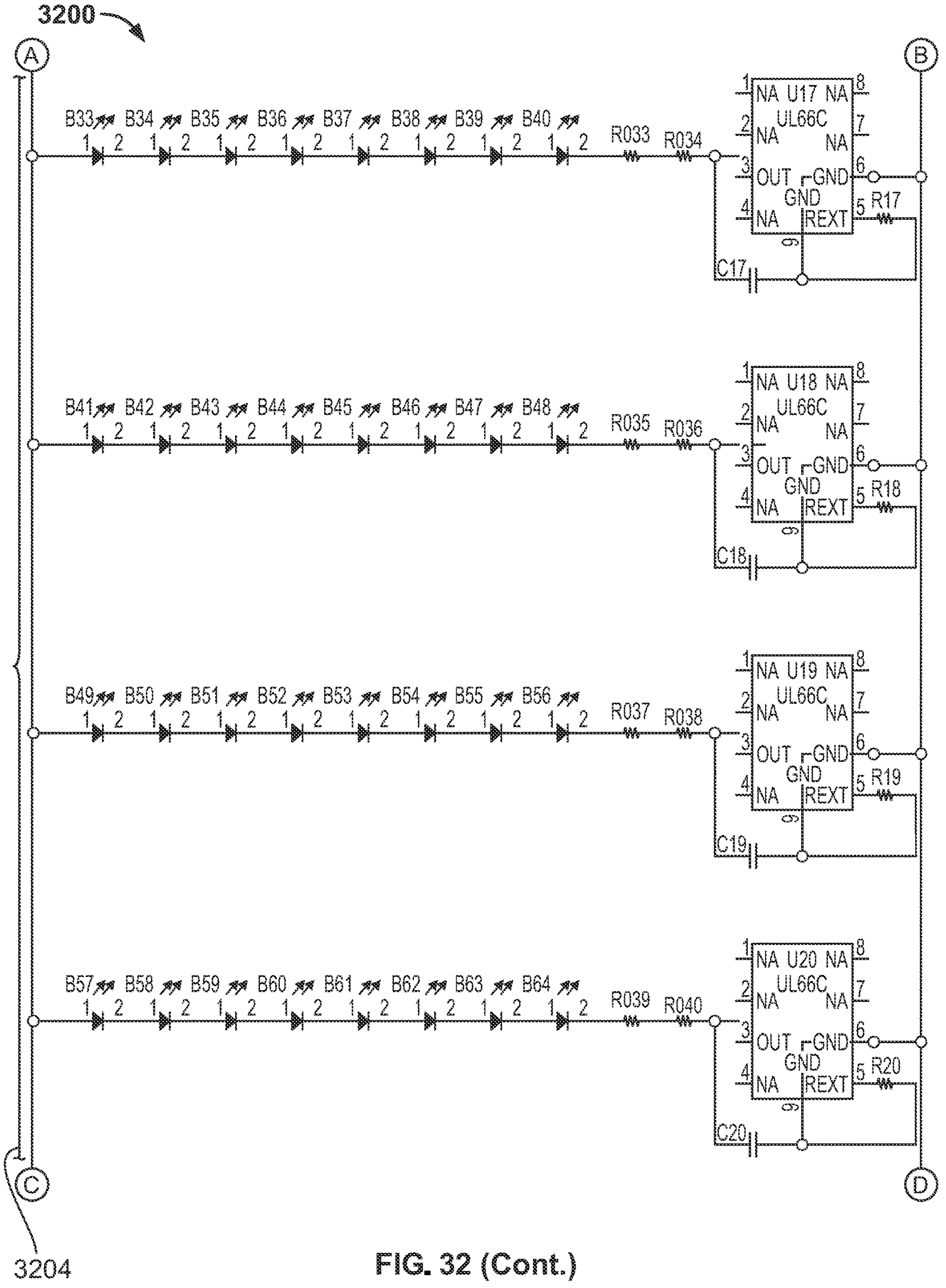
Figure 32:
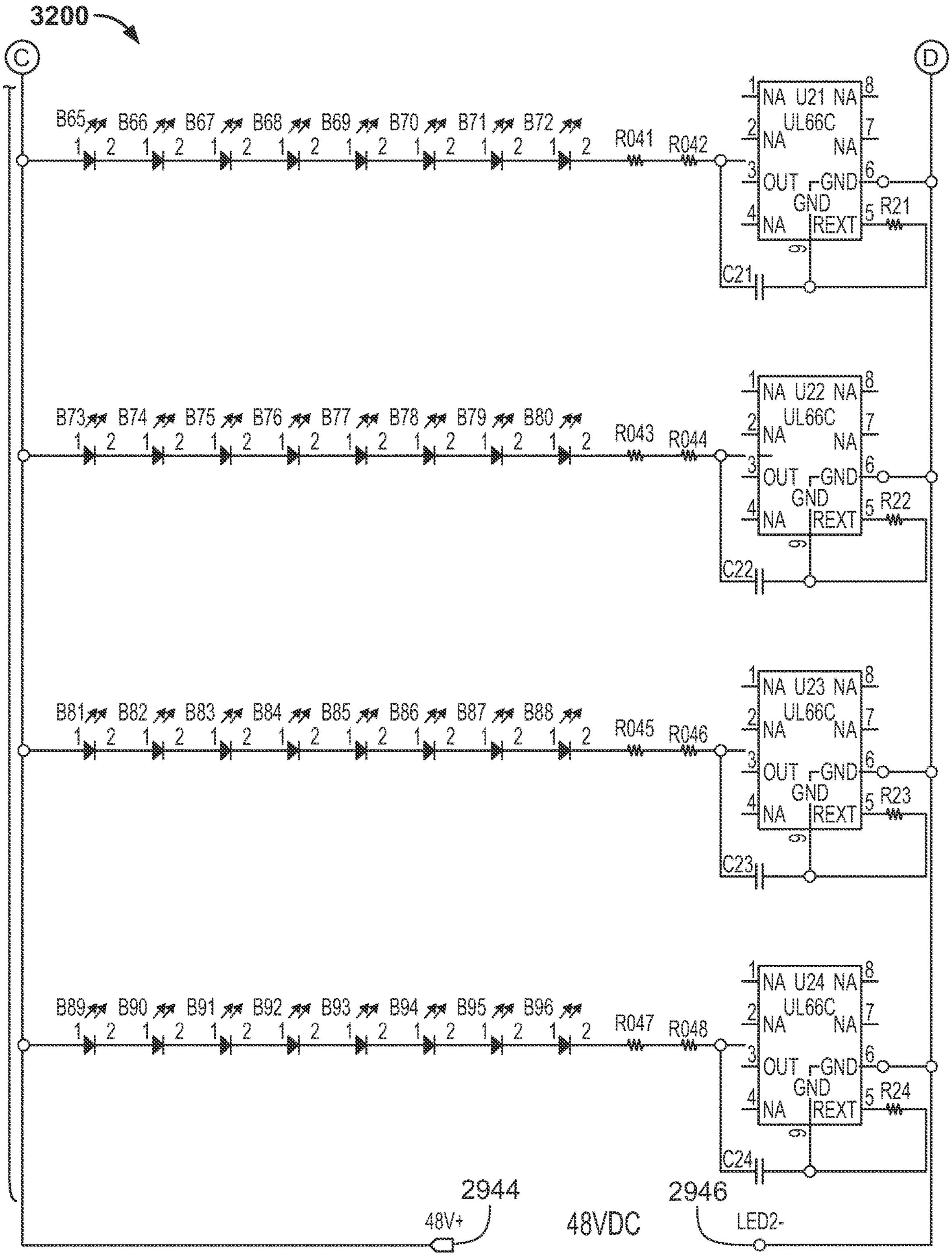
Figure 32:
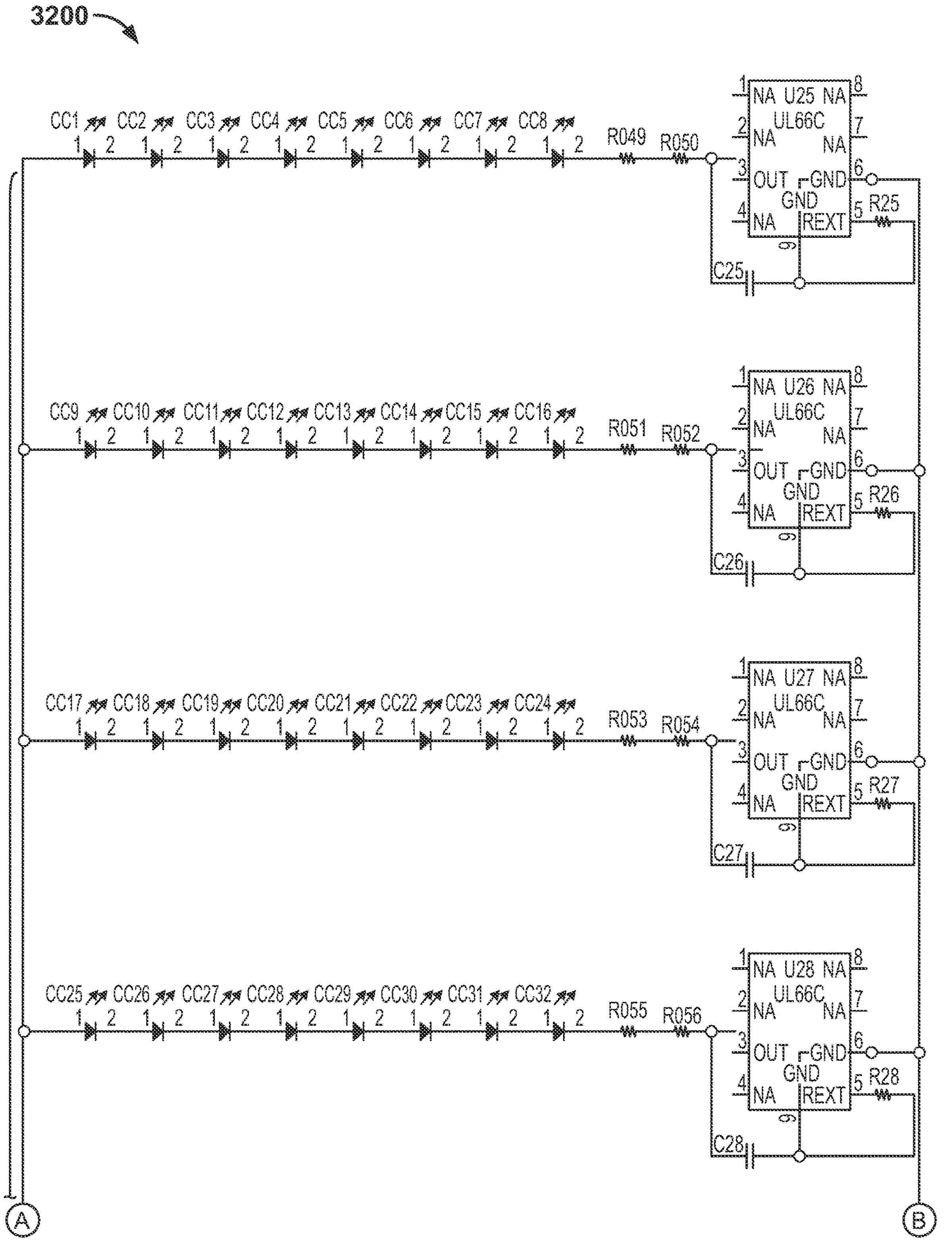
Figure 32:
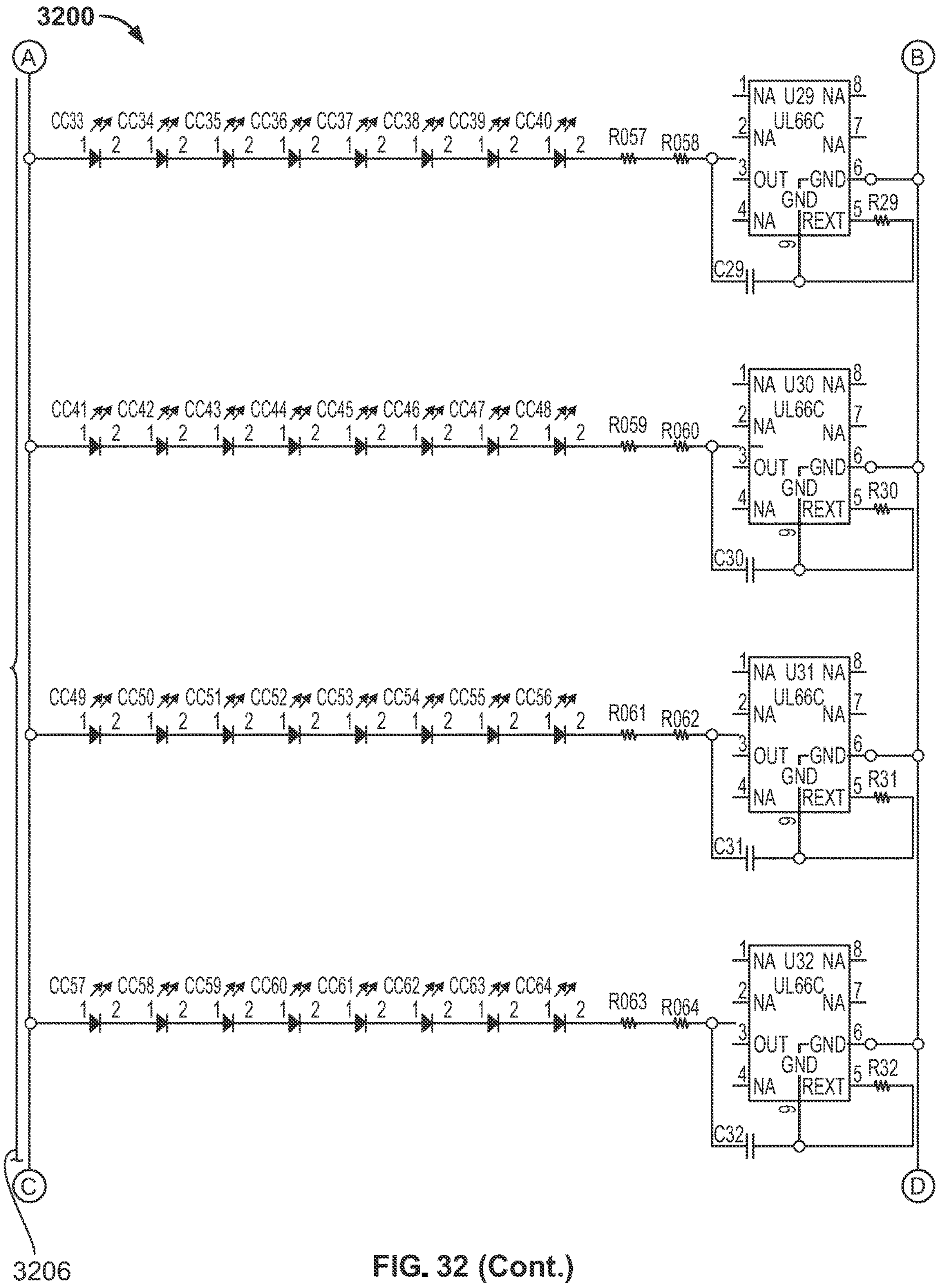
Figure 32:
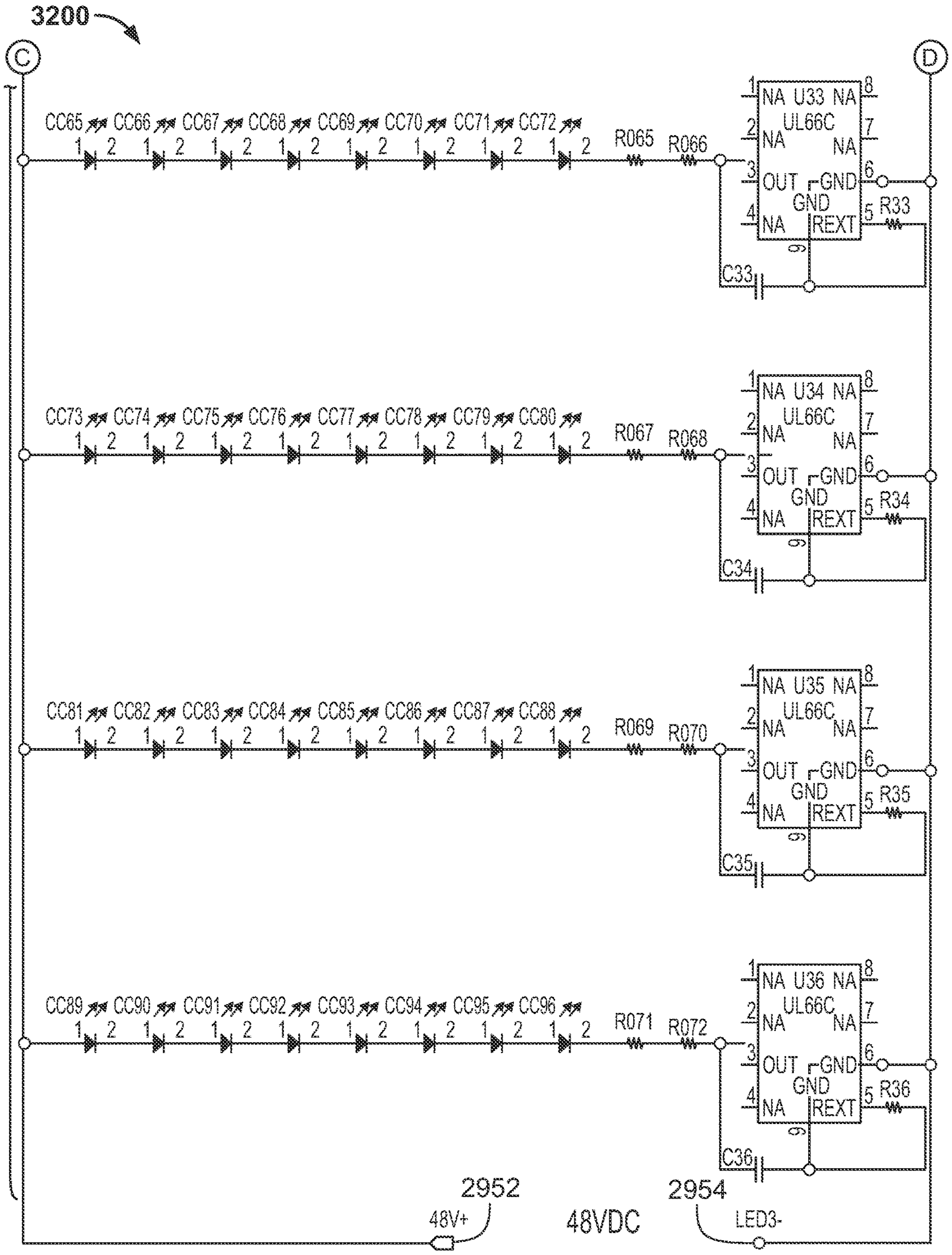

FIG. 32 shows illustrative LED module 3200. LED module 3200 may be in communication with one or more elements of circuit 2900. LED module 3200 may be used for indirect lighting. LED module 3200 may include an array of LED light sources. The array may include string of LEDs 3202. The array may include string of LEDs 3204. The array may include string of LEDs 3206. Each string of LEDs 3202, 3204 and 3206 may include a plurality of LEDs. The plurality of LEDs may be connected in series. The plurality of LEDs may be connected in parallel. The plurality of LEDs may be connected in a combination of series and parallel connections.

String of LEDs 3202 may include LEDs A1 through LEDs A96. String of LEDs 3202 may be connected to LED driver 2913. String of LEDs 3202 may be connected to LED driver 2913 through high-end terminal 2936 and low-end terminal 2938. String of LEDs 3202 may receive regulated current from LED driver 2913 through high-end terminal 2936 and low-end terminal 2938.

String of LEDs 3204 may include LEDs B1 through LEDs B96. String of LEDs 3204 may be connected to LED driver 2913. String of LEDs 3204 may be connected to LED driver 2913 through high-end terminal 2944 and low-end terminal 2946. String of LEDs 3204 may receive regulated current from LED driver 2913 through high-end terminal 2944 and low-end terminal 2946.

String of LEDs 3206 may include LEDs C1 through LEDs C96. String of LEDs 3206 may be connected to LED driver 2913. String of LEDs 3206 may be connected to LED driver 2913 through high-end terminal 2952 and low-end terminal 2954. String of LEDs 3206 may receive regulated current from LED driver 2913 through high-end terminal 2952 and low-end terminal 2954.

Table 8 lists illustrative driver circuit elements.

TABLE 8

Illustrative driver circuit elements

| Item description | Component tag |
|---|---|
| Double-sided PCB FR4 221*31.5*1.6 mm 5*1 Connected Board RoHS | |
| SMD Schottky Rectifier Bridge Stack 2A/100 V(MBS)MSS210 | BD1 |
| SMD TVS tube 60 V/400 W (SMA) SMAJ60A | TVS1 |
| X7R SMD Capacitor 10 nF/100 V ± 10% 125° C.(0603) | C3 |
| ¼ W SMD Resistor_8.2K ± 1%(1206) | R11, R17, R26 |
| X7R SMD Capacitor 1 uF/50 V, ±10%, 125° C.(0603) | C1, C9, C13 |
| SMD IC H5112A SOP8 RoHS | U1-U3 |
| 1/10 W SMD Resistor, 100 R ± 1% (0603) | R6, R21, R23 |
| SMD resistance, 1/4 W, 0.5 R ± 1% (120 6), ROHS | R1, R3, R25 |
| SMD Schottky diode, SS210, 2 A/100 V, DO-214AC | D1-D3 |
| SMD inductor 100 uH ± 20% 0.8 A 10.5*10.3*5.2 | L1-L3 |
| SMD IC XLSEMI XL7005A SOP8-EP RoHS | U4 |
| SMD Schottky diode MBRX2A0/DSS210 2 A/100VSOD-123 | D8 |
| X7R SMD Capacitor 100 nF/100 V, ±10%, 125° C.(1206) | C10 |
| 1/10 W SMD Resistor, 39K ± 1% (0603) | R13 |
| 1/10 W SMD Resistor, 120K ± 1% (0603) | R12 |
| SMD inductor 100 uH ± 10% 5.8*5.2*2.1 mm | L4 |
| X7R SMD Capacitance 100 nF/50 V, ±10%, 125° C.(0603) | C5, C6, C8, C11 |
| X7R SMD Capacitor 4.7 uF/25 V, ±10%, 125° C. (0805) | C7 |
| SMD IC MAX14781EESA + SO-8 | U5 |
| SMD bidirectional TVS tube 7 V/12 V(SOT-23) SM712 | TVS2 |
| SMD resettable fuse 0.05 A/60 V(1206) | F2, F3 |
| SMD IC MCU Silicon ME32F031C8T6 LQFP48 | U6 |
| ¼ W SMD Resistor, 10K ± 1% (1206) | R9 |
| Driver SMD assembly 700 mA | |
| S2SS conductive bullet needle Total length 13.5 mm stroke 3.5 | A, B, A1, B2, 48V1, 48V2, 48V3, 48V4 |
| Electrolytic capacitor 22 uF ± 20% 63 V 105° C. Φ5*11 mm 5000H | EC1 |
| Electrolytic capacitor 100 UF/10 V ± 20% 105° C. Φ5*11 tie 4000H | EC2 |
| Electrolytic capacitor 47 uF/50 V ± 20% 105° C. Φ6.5*11.5 taping | EC3-EC5 |
| 22# red Teflon wire length 80 ends dipping tin 5 | LED+ |
| 22# black Teflon wire length 80 ends dipped in tin 5 | R−, G−, B− |
| BFDF drive housing | |
| Strut driver firmware* | P1-U4 plug-in |

Table 9 lists LED module elements

TABLE 9

Illustrative LED Module elements:

| Item description | Component tag |
|---|---|
| Single-sided aluminum substrate 297.6*24.5*1.6 mm 1*4 continuous plate RoHS | |
| Bright 2835 fusion red light | A1-A48 |
| Bright 2835 fusion green | B1-B48 |
| Bright 2835 fusion blue | C1-C48 |

TABLE 9-continued

| Illustrative LED Module elements: | |
|---|---|
| Item description | Component tag |
| 1/8 W SMD Resistor, 0 R ± 5% (0805) | R01-R04 |
| 1/10 W SMD Resistor, 0 R ± 5% (0603) | R05-R010 |
| Single-sided aluminum substrate 602.4*24.5*1.6 mm 1*4 continuous plate RoHS | |
| Bright 2835 fusion red light | A1-A88 |
| Bright 2835 fusion green | B1-B88 |
| Bright 2835 fusion blue | C1-C88 |
| 1/8 W SMD Resistor, 0 R ± 5% (0805) | R03-R010 |
| 1/10 W SMD Resistor, 0 R ± 5% (0603) | R01-R02 |
| Single-sided aluminum substrate 1212*24.5*1.6 mm 1*4 plate RoHS | |
| Bright 2835 fusion red light | A1-A160 |
| Bright 2835 fusion green | B1-B160 |
| Bright 2835 fusion blue | C1-C160 |
| 1/8 W SMD Resistor, 0 R ± 5% (0805) | R03-R010 |
| 1/10 W SMD Resistor, 0 R ± 5% (0603) | R01-R02 |

LEDs may be LEDS sold under the tradename LUMILEDs. LEDs may be LEDs sold under the tradename LUMINEX.

All ranges and parameters disclosed herein shall be understood to encompass any and all subranges subsumed therein, every number between the endpoints, and the endpoints. For example, a stated range of "1 to 10" should be considered to include any and all subranges between (and inclusive of) the minimum value of 1 and the maximum value of 10; that is, all subranges beginning with a minimum value of 1 or more (e.g. 1 to 6.1), and ending with a maximum value of 10 or less (e.g., 2.3 to 10.4, 3 to 8, 4 to 7), and finally to each number 1, 2, 3, 4, 5, 6, 7, 8, 10, and 10 contained within the range.

Thus, apparatus and methods for LED lighting have been provided. Persons skilled in the art will appreciate that the present invention can be practiced by other than the described examples, which are presented for purposes of illustration rather than of limitation.

What is claimed is:

1. Apparatus for lighting comprising:
a digital user interface configured to receive from a user:
a mode selection;
a first input and a second input when the mode selection is a tunable color mode; and
only the first input when the mode selection is a dim-to-warm mode; and
a fixture including:
a first light-emitting diode ("LED") configured to emit light of a first color;
a second LED configured to emit light of a second color;
a base including contacts configured to receive from a fixture support:
DC power; and
communication signals; and
a microcontroller configured to:
cause the first and second LEDs to operate in correspondence with:
the tunable color mode; and
the dim-to-warm mode;
operate in correspondence with the tunable color mode or the dim-to-warm mode in response to a signal that includes an indicator of the mode selection; and
receive:
a first datum corresponding to the first input and a second datum corresponding to the second input when operating in the tunable color mode; and
the first datum when operating in the dim-to-warm mode.

2. The apparatus of claim 1 further comprising:
a third LED configured to emit light of a third color;
a fourth LED configured to emit light of a fourth color; and
a fifth LED configured to emit light of a fifth color.

3. The apparatus of claim 1 wherein the microcontroller in the tunable color mode is configured to provide, via at least the first and second LEDs, a light having a color that:
is a combination of at least the first color and the second color; and
corresponds to a user color command.

4. The apparatus of claim 3 wherein the combination comprises the first color.

5. The apparatus of claim 3 wherein the microcontroller, in the tunable color mode, is configured to provide the light at an intensity that corresponds to a user intensity command.

6. The apparatus of claim 3 wherein:
the user color command is a preset color command;
the microcontroller is configured to:
store the combination; and
cause at least the first and second LEDs to emit the combination in response to the preset color command.

7. The apparatus of claim 3 wherein:
the user color command includes a color identifier; and
the microcontroller is configured to:
translate the color identifier into a color; and
derive the combination from the color.

8. The apparatus of claim 1 wherein the microcontroller in the dim-to-warm mode is configured to provide, via at least the first and second LEDs, light having a color that:
is a combination of at least the first color and the second color; and
corresponds to a brightness of the fixture.

9. The apparatus of claim 8 wherein the microcontroller is configured to store a dim-to-warm correlation.

10. The apparatus of claim 9 wherein:
the dim-to-warm correlation is of a plurality of correlations; and the microcontroller is configured to use the dim-to-warm correlation in response to a user command selecting the dim-to-warm correlation from the plurality of correlations.

11. The apparatus of claim 9 wherein the combination corresponds to the dim-to-warm correlation.

12. The apparatus of claim 8 wherein the microcontroller is configured to:

receive:

a high-intensity CCT partition set-point; and a low-intensity CCT partition set-point; and calculate a dim-to-warm correlation.

13. The apparatus of claim 1 further comprising:

a central processing unit ("CPU") that is configured to:

receive the mode selection from the digital user interface; and transmit mode selection to the microcontroller.

14. Apparatus for lighting comprising:

a digital user interface configured to receive from a user:

a mode selection;

a first input and a second input when the mode selection is a tunable color mode; and only the first input when the mode selection is a dim-to-warm mode; and a fixture that:

includes:

a first light-emitting diode ("LED") configured to emit light of a first color; and a second LED configured to emit light of a second color; and is configured to be in communication with a microcontroller that is not in the fixture, the microcontroller is configured to:

cause the first and second LEDs to operate in correspondence with:

the tunable color mode; and the dim-to-warm mode;

operate the fixture in correspondence with the tunable color mode or the dim-to-warm mode in response to a signal that includes an indicator of the mode selection; and receive:

a first datum corresponding to the first input and a second datum corresponding to the second input when operating in the tunable color mode; and the first datum when operating in the dim-to-warm mode.

15. The apparatus of claim 14 wherein the microcontroller is further configured:

to provide to the fixture a voltage corresponding to a brightness level; and, in the tunable color mode, to provide via at least the first and second LEDs light having a color that:

is a combination of at least the first color and the second color; and corresponds to a user color command.

16. The apparatus of claim 15 wherein the microcontroller, in the tunable color mode, is configured to provide the light at an intensity that corresponds to a user intensity command.

17. The apparatus of claim 15 wherein:

the user color command is a preset color command;

the microcontroller is configured to:

store the combination; and operate at least the first and second LEDs to emit the combination in response to the preset color command.

18. The apparatus of claim 15 wherein:

the user color command includes a color identifier; and the microcontroller is configured to:

translate the color identifier into a color; and derive the combination from the color.

19. The apparatus of claim 14 wherein the microcontroller is further configured:

to provide to the fixture a voltage corresponding to a brightness level; and, in the dim-to-warm mode, to provide via at least the first and second LEDs light having a color that:

is a combination of at least the first color and the second color; and corresponds to a brightness of the fixture.

20. The apparatus of claim 19 wherein the combination corresponds to a black-body curve.

21. The apparatus of claim 19 wherein the microcontroller is configured to store a dim-to-warm correlation.

22. The apparatus of claim 21 wherein:

the dim-to-warm correlation is of a plurality of correlations; and the microcontroller is configured to use the dim-to-warm correlation in response to a user command selecting the dim-to-warm correlation from the plurality of correlations.

23. The apparatus of claim 21 wherein the combination corresponds to the dim-to-warm correlation.

24. The apparatus of claim 19 wherein the microcontroller is configured to:

receive:

a high-intensity CCT partition set-point; and a low-intensity CCT partition set-point; and calculate a dim-to-warm correlation.

25. The apparatus of claim 14 further comprising:

a central processing unit ("CPU") that is configured to:

receive the mode selection from the digital user interface; and transmit mode selection to the microcontroller.

26. A light fixture comprising:

a microcontroller configured to:

receive a signal, from a digital user interface, that includes:

an indicator of a mode selection;

a first datum; and a second datum;

cause an LED light source in the light fixture to emit light corresponding to:

the first datum and the second datum signal, when the indicator corresponds to a tunable color mode; and only the first datum and a preselected user parameter, when the indicator corresponds to a dim-to-warm mode;

wherein, the digital user interface is configured to receive:

a first input including the first datum and a second input including the second datum in the tunable color mode; and only the first input including the first datum in the dim-to-warm mode.

27. The fixture of claim 26 wherein:

the first datum corresponds to a dimming level; and the second datum corresponds to a CCT partition.

28. The fixture of claim 26 wherein the preselected user parameter is a low-intensity CCT partition set-point of a dimming correlation.

29. The fixture of claim 28 wherein the preselected user parameter is a high-intensity CCT partition set-point of a dimming correlation.

30. The fixture of claim 29 wherein the preselected user parameter fixes a CCT partition corresponding to a light level between:

the low-intensity CCT partition set-point; and the high-intensity CCT partition set-point.

* * * * *